United States Patent
Gotoh et al.

[11] Patent Number: 6,141,419
[45] Date of Patent: Oct. 31, 2000

[54] OPTICAL DISK, AN OPTICAL DISK BARCODE FORMING METHOD, AN OPTICAL DISK REPRODUCTION APPARATUS, A MARKING FORMING APPARATUS, A METHOD OF FORMING A LASER MARKING ON AN OPTICAL DISK, AND A METHOD OF MANUFACTURING AN OPTICAL DISK

[75] Inventors: Yoshiho Gotoh, Osaka; Mitsuaki Oshima; Shinichi Tanaka, both of Kyoto; Kenji Koishi, Sanda; Mitsuro Moriya, Ikoma, all of Japan

[73] Assignee: Matsushita Electric Industrial Co., Ltd., Osaka, Japan

[21] Appl. No.: 09/441,338

[22] Filed: Nov. 16, 1999

Related U.S. Application Data

[63] Continuation of application No. 08/649,411, May 16, 1996.

[30] Foreign Application Priority Data

| Oct. 9, 1995 | [JP] | Japan | 7-261247 |
| Jan. 23, 1996 | [JP] | Japan | 8-008910 |

[51] Int. Cl.[7] .................................................... H04L 9/00
[52] U.S. Cl. .................................................................. 380/4
[58] Field of Search .............................. 380/3, 4, 21, 28, 380/30; 369/272, 275.1, 275.2, 275.3, 275.4, 275.5, 284, 286, 44.11, 93, 100; 235/454, 462, 482

[56] References Cited

U.S. PATENT DOCUMENTS

| 4,677,604 | 6/1987 | Selby, III et al. . |
| 5,065,429 | 11/1991 | Lang . |
| 5,191,611 | 3/1993 | Lang . |
| 5,392,351 | 2/1995 | Hasebe et al. . |
| 5,400,403 | 3/1995 | Fahn et al. . |
| 5,430,281 | 7/1995 | Lentz et al. . |
| 5,457,668 | 10/1995 | Hibino et al. . |
| 5,457,746 | 10/1995 | Dolphin . |
| 5,489,768 | 2/1996 | Brownstein et al. . |
| 5,513,169 | 4/1996 | Fite et al. . |
| 5,587,984 | 12/1996 | Owa et al. . |
| 5,706,047 | 1/1998 | Lentz et al. . |
| 5,761,301 | 6/1998 | Oshima et al. . |
| 5,807,640 | 9/1998 | Ueno et al. . |
| 5,826,156 | 10/1998 | Natsume et al. . |

FOREIGN PATENT DOCUMENTS

| 0 549 488 | 6/1993 | European Pat. Off. . |
| 545472 | 6/1993 | European Pat. Off. . |
| 0 553 545 | 8/1993 | European Pat. Off. . |
| 0 741 382 | 11/1996 | European Pat. Off. . |
| 43 08 680 | 10/1993 | Germany . |
| 56-25242 | 3/1981 | Japan . |
| 58-211343 | 12/1983 | Japan . |
| 60-193143 | 10/1985 | Japan . |
| 61-71487 | 4/1986 | Japan . |
| 61-190734 | 8/1986 | Japan . |
| 63-46541 | 2/1988 | Japan . |

(List continued on next page.)

OTHER PUBLICATIONS

European Search Report corresponding to application No. 96915172.9 dated Oct. 22, 1997.

Japanese Search Report dated Sep. 3, 1996.

Japanese Search Report dated Jan. 30, 1996, application No. 95–02339.

European Search Report dated May 15, 1997, application No. 95–938017.

*Primary Examiner*—William Oen
*Attorney, Agent, or Firm*—Ratner & Prestia

[57] ABSTRACT

Disclosed is an optical disk barcode forming method wherein, as information to be barcoded, position information for piracy prevention, which is a form of ID, is coded as a barcode and is recorded by laser trimming on a reflective film in a PCA area of an optical disk. When playing back the thus manufactured optical disk on a reproduction apparatus, the barcode data can be played back using the same optical pickup.

8 Claims, 51 Drawing Sheets

FOREIGN PATENT DOCUMENTS

| | | |
|---|---|---|
| 63-164043 | 7/1988 | Japan . |
| 2-7243 | 1/1990 | Japan . |
| 2-44448 | 2/1990 | Japan . |
| 2-56750 | 2/1990 | Japan . |
| 04178967 | 6/1992 | Japan . |
| 4-162224 | 6/1992 | Japan . |
| 5-266576 | 10/1993 | Japan . |
| 5-325193 | 12/1993 | Japan . |
| 6-203412 | 7/1994 | Japan . |
| 7-325712 | 12/1995 | Japan . |
| 9101358 | 3/1993 | Netherlands . |

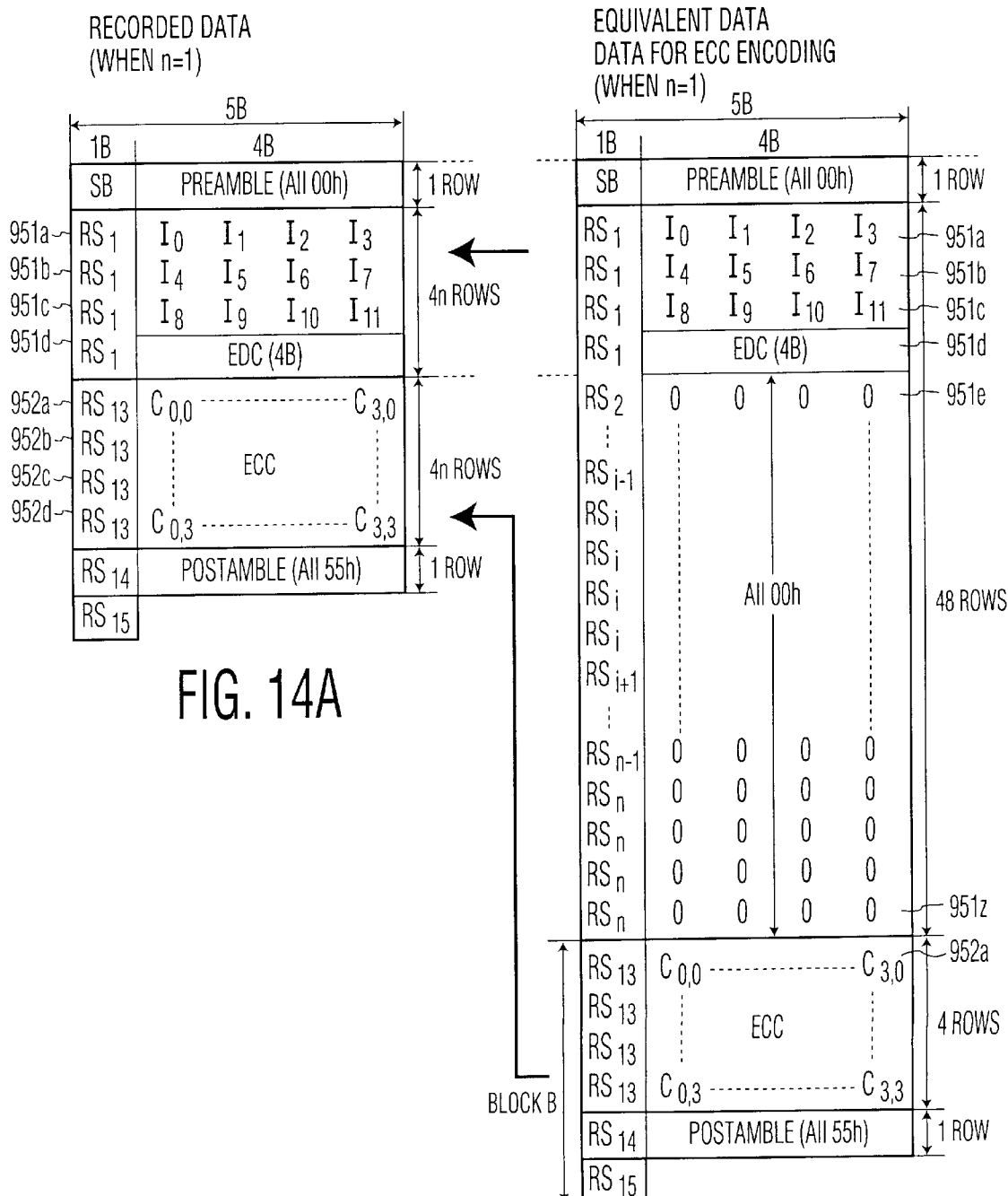

TYPICAL EQUATION
FOR EDC COMPUTATION
EDC (ERROR DETECTION CODE) :

$$EDC_{PCA}(x) = \sum_{i=0}^{31} b_i \cdot x^i$$

$$I_{PCA}(x) = \sum_{i=32}^{128n-31} b_i \cdot x^i$$

FIG. 14C

TYPICAL EQUATION
FOR EDC COMPUTATION
ECC (ERROR CORRECTION CODE) :

$$R_{PCA}(x) = \sum_{i=48}^{51} I_{j+4i} \cdot x^{51-i}$$

$$I_{PCA}(x) = \sum_{i=0}^{4n-2} I_{j+4i} \cdot x^{51-i} + D_j \cdot x^{52-4n},$$

FIG. 14D

FIG. 24A
RZ RECORDING MODULATION CLOCK BASED ON ROTATION PULSE
(1) RECORDED SIGNAL OF "00"
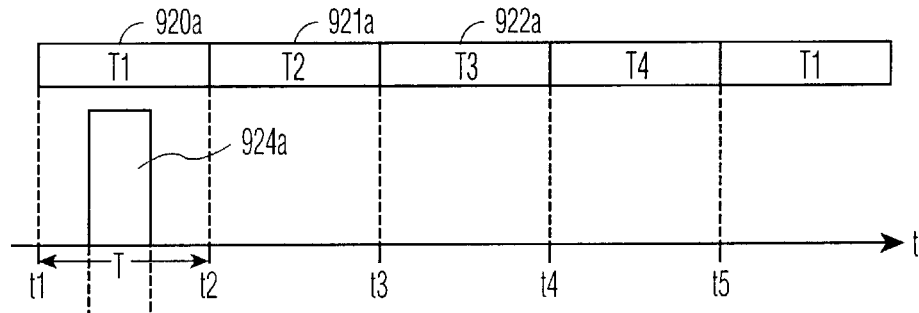
FIG. 24B
(2) TRIMMING PATTERN OF "00"
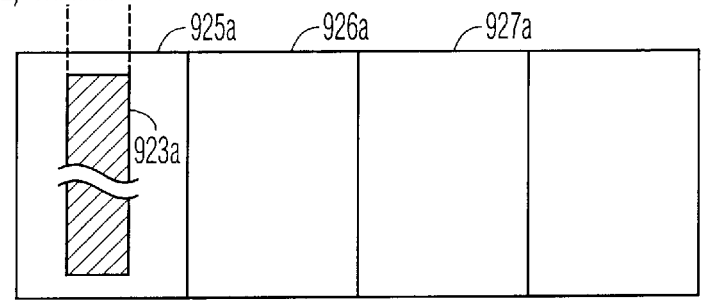
FIG. 24C
(3) RECORDED SIGNAL OF "01"
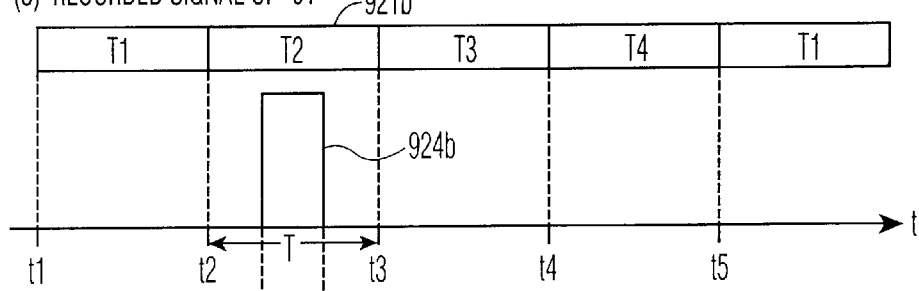
FIG. 24D
(4) TRIMMING PATTERN OF "01"
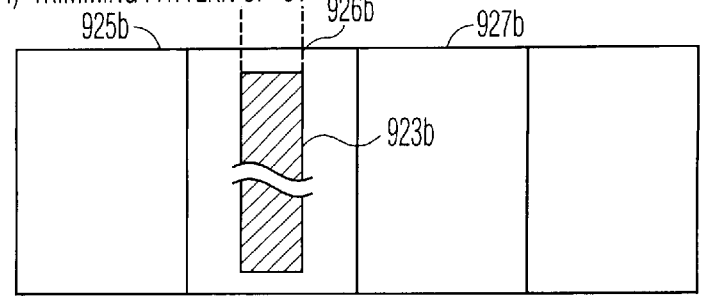
FIG. 24E

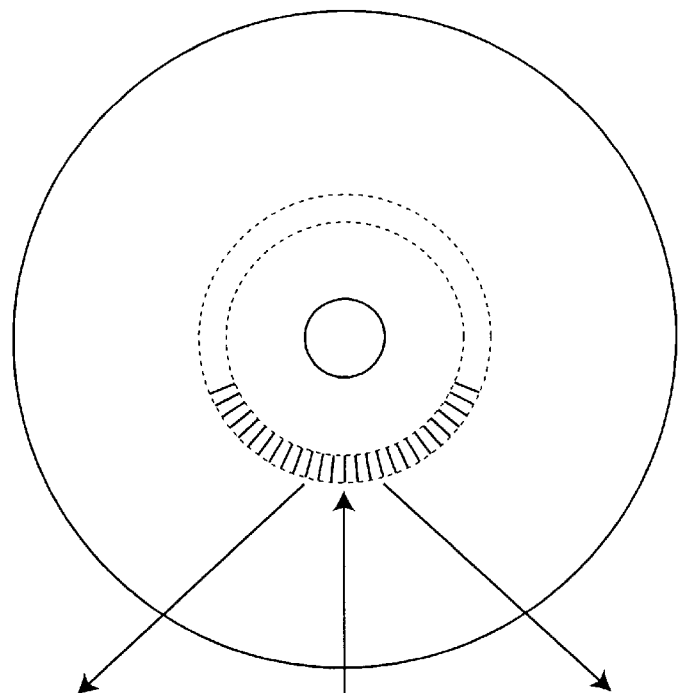
FIG. 27A (1) TOP PLAN VIEW
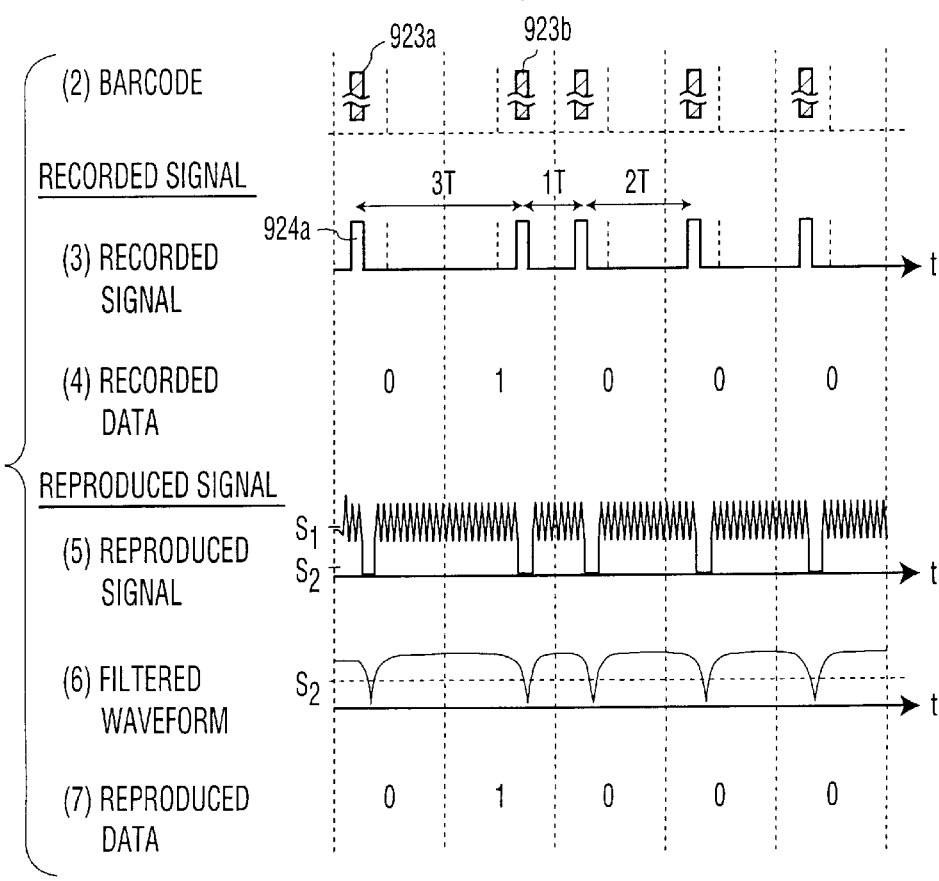
FIG. 27B

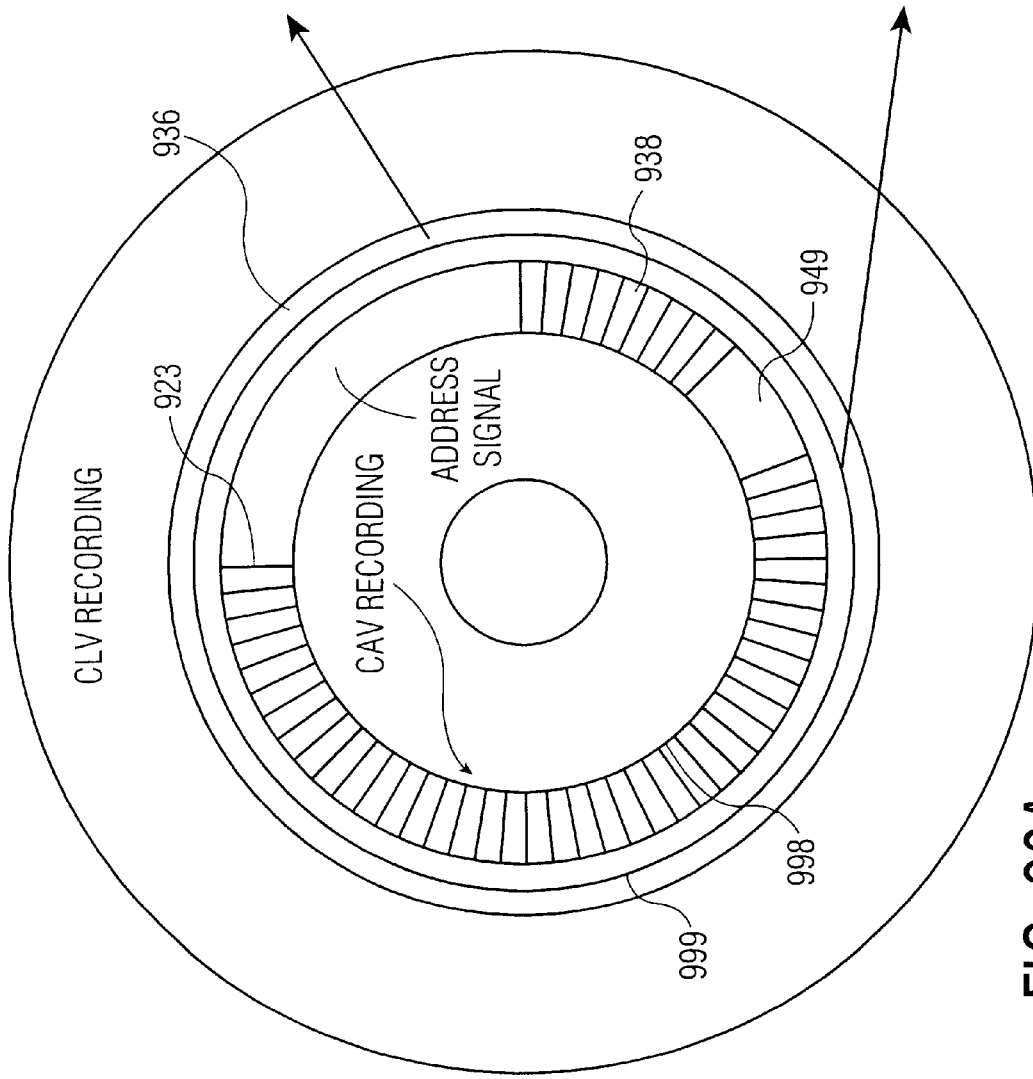
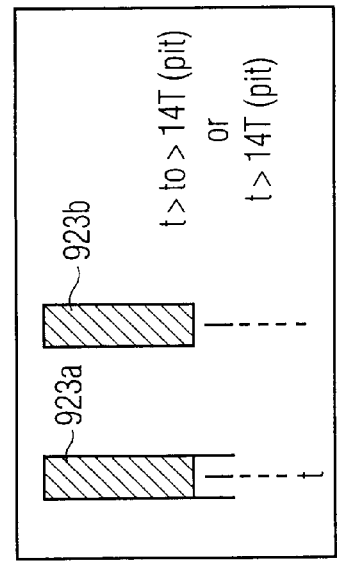
FIG. 30A
FIG. 30B
FIG. 30C

SYNCHRONIZATION CODE DATA  SYNCHRONIZATION CODE

| SYNC BYTE /RESYNC | BIT PATTERN | | | | | | | | | | | |
|---|---|---|---|---|---|---|---|---|---|---|---|---|
| | FIXED PATTERN | | | | | | | | SYNC CODE | | | |
| | (CHANNEL BIT) | | | | | | | | (DATA BIT) | | | |
| | $c_{15}$ | $c_{14}$ | $c_{13}$ | $c_{12}$ | $c_{11}$ | $c_{10}$ | $c_9$ | $c_8$ | $b_3$ | $b_2$ | $b_1$ | $b_0$ |
| SB | 0 | 1 | 0 | 0 | 0 | 1 | 1 | 0 | 0 | 0 | 0 | 0 |
| $RS_1$ | 0 | 1 | 0 | 0 | 0 | 1 | 1 | 0 | 0 | 0 | 0 | 1 |
| $RS_2$ | 0 | 1 | 0 | 0 | 0 | 1 | 1 | 0 | 0 | 0 | 1 | 0 |
| ⋮ | ⋮ | | ⋮ | | ⋮ | | ⋮ | | | ⋮ | | |
| $RS_i$ | 0 | 1 | 0 | 0 | 0 | 1 | 1 | 0 | i | | | |
| ⋮ | ⋮ | | ⋮ | | ⋮ | | ⋮ | | | ⋮ | | |
| $RS_{15}$ | 0 | 1 | 0 | 0 | 0 | 1 | 1 | 0 | 1 | 1 | 1 | 1 |

FIG. 34A

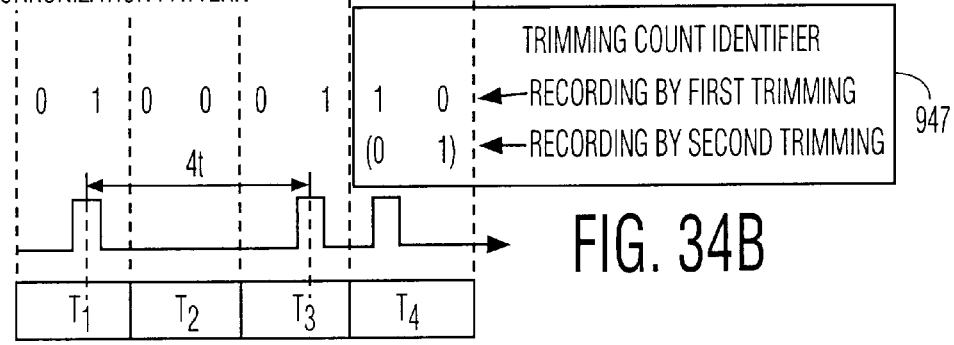

FIG. 34B

MAXIMUM CAPACITY

| | RECORDING CAPACITY | TOTAL BYTE COUNT | EFFICIENCY | RECORDING AREA ANGLE | UNRECORDED AREA ANGLE |
|---|---|---|---|---|---|
| MINIMUM | 12B | 41B | 29.3% | 51 DEGREES | 309 DEGREES |
| MAXIMUM | 188B | 271B | 69.4% | 336 DEGREES | 24 DEGREES |

FIG. 34C (1) TIME SLOT (2) CHANNEL BIT (3) RECORDING PULSE (4) EMITTING PULSE

OPTICAL DISK, AN OPTICAL DISK BARCODE FORMING METHOD, AN OPTICAL DISK REPRODUCTION APPARATUS, A MARKING FORMING APPARATUS, A METHOD OF FORMING A LASER MARKING ON AN OPTICAL DISK, AND A METHOD OF MANUFACTURING AN OPTICAL DISK

This application is a continuation of U.S. patent application Ser. No. 08/649,411, filed May 16, 1996.

BACKGROUND OF THE INVENTION

1. Field of the Invention

The present invention relates to an optical disk, an optical disk barcode forming method, an optical disk reproduction apparatus, a marking forming apparatus, a method of forming a laser marking or an optical disk, and a method of manufacturing an optical disk.

2. Related Art of the Invention

In the manufacturing process of optical disks, it has been commonly practiced to record a serial number, lot number, etc. on each optical disk in the form of a barcode.

Since such information cannot be written to a pit information area of the optical disk, it has been practiced to write the barcoded information to a non-information area, or unused space, on the optical disk.

When reproducing (playing back) such an optical disk, the pit information is read by an optical pickup; to read the barcoded information such as a serial number, etc. recorded in the non-information area, however, a separate reading device has been used.

In the above prior art optical disk, since information carrying a serial number and the like is not recorded in a pit area but recorded in a non-information area, as described above, a separate reading device has had to be provided in addition to the usual optical pickup, the resulting problem being increased complexity of the playback apparatus construction.

SUMMARY OF THE INVENTION

In view of the above problem with the prior art, it is an object of the present invention to provide an optical disk wherein data such as a disk ID number, etc. is converted into a barcode and recorded in a pit area in overwriting fashion, thereby permitting the use of a single optical pickup to read both the bit data and barcode data. It is another object of the invention to provide a barcode forming method, etc. for such an optical disk.

One aspect of the invenion is an optical disk on which data is recorded with CLV, wherein, in a prescribed region of a pre-pit signal area on said disk, all or part of a barcode is written in overwriting fashion by selectively removing a reflective film in said prescribed region.

Another aspect of the invention is an optical disk according to the first invention, wherein a control data area is provided for holding therein physical feature information concerning said optical disk, and an identifier for indicating the presence or absence of said barcode is recorded in said control data area.

Still another aspect of the invention is an optical disk according to the second invention, wherein a guard-band area where no data is recorded is provided between said control data area and said prescribed region of said pre-pit signal area.

Yet another aspect of the invention is an optical disk according to the first invention, wherein said barcode is formed in such a manner that two or more barcode signals cannot occur within one prescribed tire slot.

Still yet another aspect of the invention is an optical disk according to the first invention, wherein said barcode contains data at least including ID information uniquely given to said optical disk.

A further aspect of the invention is an optical disk according to the 5th invention, wherein said barcode contains data including, in addition to said ID information, a public key of a public key encryption function corresponding to said ID information, said public key is used to encrypt prescribed data, and the encrypted prescribed data is transmitted to an external party in order to obtain from said external party a password required to reproduce said optical disk.

A still further aspect of the invention is an optical disk according to the 5th invention, wherein said ID information is encrypted or applied a digital signature to.

A yet further aspect of the invention is an optical disk according to the 7th invention, wherein a secret key of a public key encryption function is used when applying encryption or a digital signature to said ID information.

A still yet further aspect of the invention is an optical disk according to any one of inventions from first to 8th, wherein said optical disk is constructed from two disk-substrates laminated together.

One aspect of the invention is an optical disk barcode forming method wherein pulsed laser light from a light source is made into a rectangular beam pattern by using a rectangular mask and said rectangular beam pattern is focused on a reflective film in a pre-pit signal region in a prescribed radius portion of an optical disk on which data is recorded, and at the same time, said optical disk is rotated, thereby forming a plurality of rectangular reflective-film-removed regions as a barcode in the same radius portion on said reflective film.

Another aspect of the invention is an optical disk barcode forming method according to the 10th invention, wherein said optical disk includes a control data area for holding therein physical feature information concerning said optical disk, and an identifier for indicating the presence or absence of said barcode is recorded in said control data area.

Still another aspect of the invention is an optical disk barcode forming method according to the 11th invention, wherein said barcode is formed in a manner that two or more barcode signals cannot occur within one such prescribed time slot.

Yet another aspect of the invention is an optical disk barcode forming method according to any one of inventions from 10th to 12th, wherein said optical disk is constructed from two disk-substrates laminated together.

Still yet another aspect of the invention is an optical disk reproduction apparatus wherein recorded contents of a recording area, recorded by forming pits on an optical disk, are reproduced by using a rotational phase control for a motor, while recorded contents of a different recording area other than said recording area, recorded by selectively forming low-reflectivity portions on a reflective film in said different recording area, are reproduced by using rotational speed control for said motor, and the recorded contents of said recording area and the recorded contents of said different recording area are both reproduced by using the same optical pickup.

A further aspect of the invention is an optical disk reproduction apparatus according to the 14th invention, wherein tracking control is not performed in said different recording area.

A still further aspect of the invention is an optical disk reproduction apparatus according to the 14th invention, wherein tracking control is, in effect, performed in said different recording area.

A yet further aspect of the invention is an optical disk reproduction apparatus according to the 16th invention, wherein a rotational speed is the rotational speed that would be achieved in said different recording area if said rotational phase control were applied.

A still further aspect of the invention is an optical disk reproduction apparatus according to the 14th invention, wherein the rotational speed of said motor in said rotational speed control is maintained at a prescribed value based on a result obtained by measuring a minimum-length pit in said different recording area.

A yet further aspect of the invention is an optical disk reproduction apparatus according to the 14th invention, wherein said low-reflectivity portions are a barcode formed by selectively removing said reflective film.

A still yet further aspect of the invention is an optical disk reproduction apparatus according to the 14th invention whererein said low-reflectivity portions are a barcode, said different recording area is also such area to which contents are recorded with pits, and when reproducing the recorded contents of said different recording area, a high-frequency-component signal generated during reproduction of said pits Which are formed in said different recording area is reduced or eliminated by a low-pass filter, thereby making it possible to separate a signal which is reproduced from said barcode.

One aspect of the invention is an optical disk reproduction apparatus according to the 14th invention, wherein said low-reflectivity portions are a barcode, and when reproducing the recorded contents of said different recording area, the width of a signal obtained by reading said barcode is increased to a prescribed width and then measured with sampling pulses from a control section.

Another aspect of the invention is an optical disk reproduction apparatus according to any one of inventions from 14th to 21st, wherein said optical disk is constructed from two disk-substrates laminated together.

Still another aspect of the invention is an optical disk reproduction apparatus according to the 14th invention, wherein said optical disk includes a control data area for holding therein physical feature information concerning said optical disk, and an identifier for indicating the presence or absence of said barcode is recorded in said control data area.

Yet another aspect of the invention is an optical disk reproduction apparatus according to claim 23, wherein, after reading recorded contents of said control data area and judging the presence or absence of said barcode, it is determined whether an optical pickup should be moved to an inner portion or an outer portion of said optical disk.

Still yet another aspect of the invention is a marking forming apparatus which comprises:

marking forming means for applying a marking on a reflective film formed on a disk;

marking position detecting means for detecting a position of said marking; and position information writing means for converting at least said detected position information or information concerning said position information into a barcode, and for selectively removing said reflective film to write said barcode to an optical disk on which data is recorded with CLV, wherein all or part of said barcode is written in overwriting fashion to a prescribed region of a pre-pit signal area on said optical disk.

A further aspect of the invention is a marking forming apparatus according to the 25th invention, wherein said disk is constructed from two disk-substrates laminated together.

A still further aspect of the invention is a marking forming means according to the 25th invention, wherein said position information writing means includes encrypting means for encrypting at least said detected position information or information concerning said position information, and writes contents thus encrypted to said disk.

A yet further aspect of the invention is a marking forming apparatus according to the 25th invention, wherein said position information writing means includes digital signature means for applying a digital signature to at least said detected position information or information concerning said position information, and the writing at least said detected position information or information concerning said position information means writing information concerning a result of said digital signature application to said disk.

A still yet further aspect of the invention is a reproduction apparatus which comprises:

position information reading means for reading position information of a marking or information concerning said position information, said position information or said information being formed by (1) applying a marking on a reflective film formed on a disk, (2) detecting position of the marking, (3) converting detected said position information or said information into a barcode, and (4) writing the barcode with selectively removing said reflective film on said optical disk on which data is recorded with CLV;

marking reading means for reading information concerning a physical position of said marking;

comparing/judging means for performing comparison and judgement by using a result of reading by said position information reading means and a result of reading by said marking reading means; and reproducing means for reproducing data recorded on said optical disk in accordance with a result of the comparison and judgement performed by said comparing/judging means, wherein all or part of said barcode is written in overwriting fashion to a prescribed region of a pre-pit signal area on said optical disk.

One aspect of the invention is a reproduction apparatus according to the 29th invention, wherein at least said detected position information or information concerning said position information is written to said disk by position information writing means.

Another aspect of the invention is a reproduction apparatus according to the 30th invention, wherein said position information writing means includes encrypting means for encrypting at least said detected position information or information concerning said position information, and said position information reading means includes decrypting means corresponding to said encrypting means, and by using said decrypting means, decrypts said encrypted position information or information concerning said position information.

Still another aspect of the invention is a reproduction apparatus according to the 30th invention, wherein said position information writing means includes digital signature means for applying a digital signature to at least said detected position information or information concerning said position information, and writes information concerning a result of said digital signature application to said disk, and said position information reading means includes
authenticating means corresponding to said digital signature means, and
position information extracting means for obtaining said position information from an authentication process performed by said authenticating means and/or from said information concerning the result of said digital signature application, when an output indicating correctness of said authentication result is produced from said authenticating means, said comparing/judging means performs the comparison and judgement by using the position information obtained by said position information extracting means and the result of reading by said marking reading means, and when said output indicating correctness is not produced, the reproduction is not performed.

Yet another aspect of the invention is a method of manufacturing a disk, which comprises the steps of:

forming at least one disk;

forming a reflective film to said formed disk;

applying at least one marking to said reflective film;

detecting at least one position of said marking; and encrypting said detected position information and writing said encrypted information onto said disk, wherein, when encrypting and writing, at least said encrypted information is converted into a barcode, and said barcode is written by selectively removing said reflective film on said disk on which data is recorded with CLV, and all or part of said barcode is written in overwriting fashion to a prescribed region of a pre-pit signal area on said disk.

Still yet another aspect of the invention is a method of manufacturing a disk, which comprises the steps of:

forming at least one disk;

forming a reflective film to said formed disk;

applying at least one marking to said reflective film;

detecting at least one position of said marking; and applying a digital signature to said detected position information and writing onto said disk, wherein, when applying said digital signature and writing, at least a result of said digital signature is converted into a barcode, and said barcode is written by selectively removing said reflective film on said disk on which data is recorded with CLV, all or part of said barcode being written in overwriting fashion to a prescribed region of a pre-pit signal area on said disk.

A further aspect of the invention is a disk wherein a marking is formed by a laser to a reflective film of said disk holding data written thereon, at least position information of said marking or information concerning said position information is encrypted or applied a digital signature, at least said encrypted information or digital signature-appended information is converted into a barcode, and said barcode is written by selectively removing said reflective film on said disk on which data is recorded with CLV, all or part of said barcode being written in overwriting fashion to a prescribed region of a pre-pit signal area on said disk.

BRIEF DESCRIPTION OF THE DRAWINGS

FIG. 14(a) is a diagram showing part (b) of FIG. 33 in further detail, (b) is a diagram showing an equivalent data structure for ECC encoding/decoding, (c) is a diagram showing a mathematical equation for EDC computation, and (d) is a diagram showing a mathematical equation for ECC computation;

FIG. 24 is a diagram showing a signal waveform and a trimming pattern in RZ recording according to the embodiment;

FIG. 27 is a diagram showing a top plan view of disk stripes, along with signal waveforms, according to the embodiment;

FIG. 30 is a diagram showing the arrangement of stripes on a disk and the contents of control data according to the embodiment;

FIG. 34 is a diagram showing the data structure of a synchronization code;

DESCRIPTION OF THE REFERENCE NUMERALS

Figure 1:
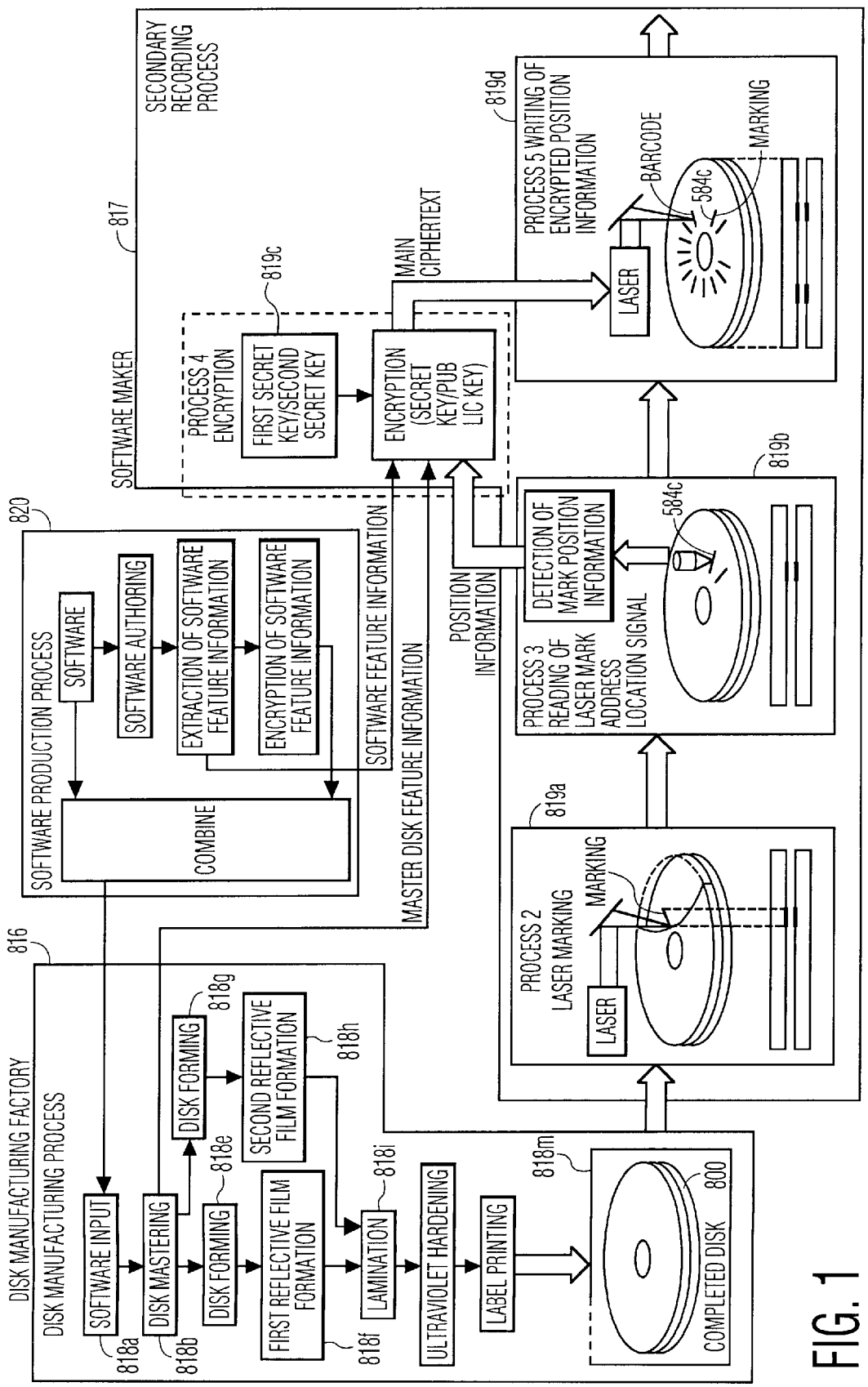
FIG. 1 is a diagram showing a disk manufacturing process and a secondary recording process according to the present embodiment.

584. LOW-REFLECTIVITY PORTION, 586. LOW REFLECTIVITY LIGHT AMOUNT DETECTOR, 587. LIGHT AMOUNT LEVEL COMPARATOR, 588. LIGHT AMOUNT REFERENCE VALUE, 599. LOW REFLECTIVITY PORTION START/END POSITION DETECTOR, 600 LOW-REFLECTIVITY PORTION POSITION DETECTOR, 601. LOW-REFLECTIVITY PORTION ANGULAR POSITION SIGNAL OUTPUT SECTION, 602. LOW-REFLECTIVITY PORTION ANGULAR POSITION DETECTOR, 605. LOW-REFLECTIVITY PORTION START POINT, 606. LOW-REFLECTIVITY PORTION END POINT, 607. TIME DELAY CORRECTOR, 816. DISK MANUFACTURING F PROCESS, 817. SECONDARY RECORDING PROCESS, 818. DISK MANUFACTURING PROCESS STEPS, 819. SECONDARY RECORDING PROCESS STEPS, 820. SOFTWARE PRODUCTION PROCESS STEPS, 830. ENCODING MEANS, 831. PUBLIC KEY ENCRYPTION, 833. FIRST SECRET KEY, 834. SECOND SECRET KEY, 835. COMBINING SECTION, 836. RECORDING CIRCUIT, 837. ERROR-CORRECTION ENCODER, 838. REED-SOLOMON ENCODER, 839. INTERLEAVER, 840. PULSE INTERVAL MODULATOR, 841. CLOCK SIGNAL GENERATOR, 908. ID GENERATOR, 909. INPUT SECTION, 910. RZ MODULATOR, 913. CLOCK SIGNAL GENERATOR, 915. MOTOR, 915. ROTATION SENSOR, 916. COLLIMATOR, 917. CYLINDRICAL LENS, 918. MASK, 919. CONVERGING LENS, 920. FIRST TIME SLOT, 921. SECOND TIME SLOT, 922. THIRD TIME

SLOT, 923. STRIPE, 924. PULSE, 925. FIRST RECORDING REGION, 926. SECOND RECORDING REGION, 927. ECC ENCODER, 928. ECC DECODER, 929. LASER POWER SUPPLY CIRCUIT, 930. STEPS (IN CAV PLAYBACK FLOWCHART), 931. BEAM DEFLECTOR, 932. SLIT, 933. STRIPE, 934. SUB-STRIPE, 935. DEFLECTION SIGNAL GENERATOR, 936. CONTROL DATA AREA, 937. STRIPE PRESENCE/ABSENCE IDENTIFIER, 938. ADDITIONAL STRIPE PORTION, 939. ADDITIONAL STRIPE PRESENCE/ABSENCE IDENTIFIER, 940. STEPS (FOR STRIPE PRESENCE/ABSENCE IDENTIFIER PLAYBACK FLOWCHART), 941. OPTICAL MARKING (PINHOLE), 942. PE-RZ DEMODULATOR, 943. LPF, 944. ADDRESS AREA, 945. MAIN BEAM, 946. SUB-BEAM, 948. STRIPE REVERSE-SIDE RECORD IDENTIFIER, 949. STRIPE GAP PORTION, 950. SCANNING MEANS, 951. DATA ROW, 952. ECC ROW, 953. EDGE-SPACING DETECTING MEANS, 954. COMPARING MEANS, 955. MEMORY MEANS, 956. OSCILLATOR, 957. CONTROLLER, 958. MOTOR DRIVE CIRCUIT, 959. BARCODE READING MEANS, 963. MODE SWITCH, 964. HEAD MOVING MEANS, 965. FREQUENCY COMPARATOR, 966. OSCILLATOR, 967. FREQUENCY COMPARATOR, 968. OSCILLATOR, 969. MOTOR

DESCRIPTION OF THE PREFERRED EMBODIMENTS

The preferred embodiments of the present invention will be described below with reference to the accompanying drawings. In the description hereinafter given, position information for piracy prevention, which is a form of ID, is taken as an example of information to be barcoded.

In the first-half part (I) of the description, a detailed explanation will be given of the piracy prevention position information as a form of ID, followed by a brief explanation of how the information is converted into a barcode to complete an optical disk and how the optical disk is played back. In the second-half part (II), the technique for barcoding the piracy prevention position information will be described in further detail and in a concrete manner. More specifically, the first-half part (I) deals with (A) Manufacturing a disk, (B) Forming a marking by using laser light, (C) Reading the position information of the marking, (D) Encrypting the position information, converting the encrypted position information into a barcode, and writing the barcode in a pre-pit area of the optical disk in overwriting fashion, and (E) Playing back the optical disk on a player. The second-half part (II) first describes (A) Usefulness of the barcode for a laminated-type optical disk, then proceeds to (B) Barcoding the position information of the marking as a disk-unique ID, (C) Features of the barcode-recorded optical disk format, methods of tracking control, and methods of rotational speed control during reading of the barcode, and (D) Playing back the barcode-recorded optical disk. The second-half part (II) further deals in detail with (E) Manufacturing techniques for implementing the barcode recording method, followed by a brief explanation of a barcode playback apparatus (player). Finally, a description is given of (F) An example of the above barcode encryption and another application example of the barcode. (I)

Before proceeding to the description of the above (A) to (E), we will first describe a general process flow from disk manufacturing to the completion of an optical disk by using the flowchart of FIG. 1.

In this patent specification, laser trimming is also referred to as laser marking, while a nonreflective optical marking portion is simply referred to as the barcode, stripe, marking, or optical marking or, sometimes, as the physical ID unique to a disk.

First, the software company performs software authoring in software production process 820. The completed software is delivered from the software company to the disk manufacturing factory. In disk manufacturing process 816 at the disk manufacturing factory, the completed software is input in step 818*a*, a master disk is produced (step 818*b*), disks are pressed (steps 818*e*, 818*g*), reflective films are formed on the respective disks (steps 818*f*, 818*h*), the two disks are laminated together (step 818*i*), and a ROM disk such as a DVD or CD is completed (step 818*m*, etc.).

Figure 2:
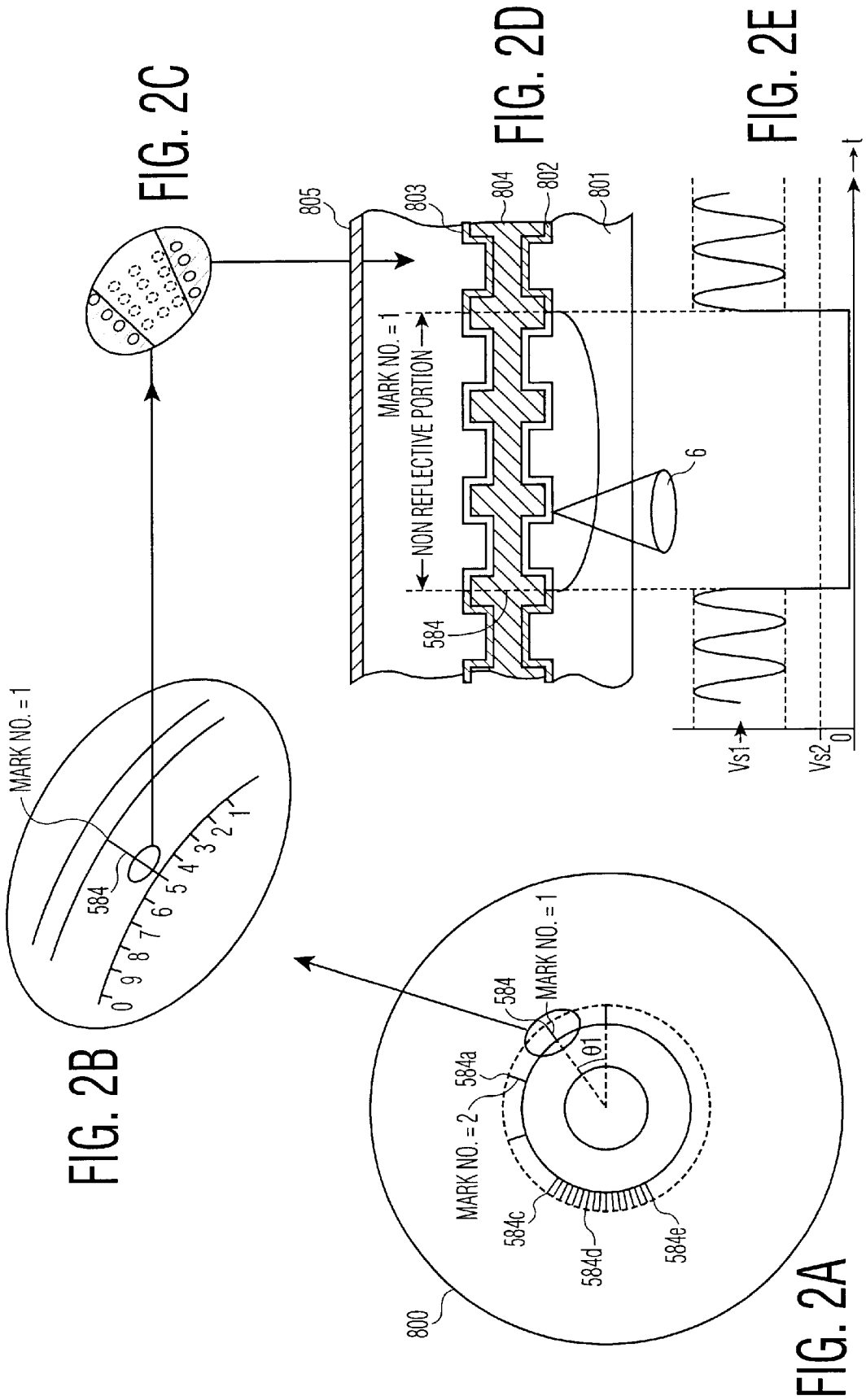
FIG. 2(a) is a top plan view of a disk according to the embodiment, (b) is a top plan view of the disk according to the embodiment, (c) is a top plan view of the disk according to the embodiment, (d) is a transverse sectional view of the disk according to the embodiment, and (e) is a waveform diagram of a reproduced signal according to the embodiment.

The thus completed disk 800 is delivered to the software maker or to a factory under control of the software maker, where, in secondary recording process 817, an anti-piracy marking 584, such the one shown in FIG. 2, is formed (step 819*a*), and accurate position information of this mark is read by a measuring means (step 819*b*) to obtain the position information which serves as the physical feature information of the disk. This physical feature information of the disk is encrypted in step 819*c*. The encrypted information is converted to a PE-RZ-modulated signal which is then recorded in step 819*d* as a barcode signal on the disk by using a laser. The disk physical feature information may be combined together with software feature information for encryption in step 819*c*.

The above processes will be described in further detail. That is, a disk fabrication process, a marking formation process, a marking position reading process, and an encrypted information writing process for an optical disk according to the present invention will be described in detail with reference to FIGS. 4 and 5 and FIGS. 8 to 12. A supplementary explanation will also be given dealing with a disk having two reflective layers with reference to FIGS. 6 and 7. In the following description, the marking formation process and the marking position reading process are collectively called the secondary recording process.

(A) First, the disk fabrication process will be described. In the disk fabrication process 806 shown in FIG. 4, first a transparent substrate 801 is pressed in step (1). In step (2), a metal such as aluminum or gold is sputtered to form a reflective layer 802. An adhesive layer 804 formed from an ultraviolet curing resin is applied by spin coating to a substrate 803 formed in a different processing step, and the substrate 803 is bonded to the transparent substrate 801 having the reflective layer 802, and they are rotated at high speed to make the bonding spacing uniform. By exposure to external ultraviolet radiation, the resin hardens, thus firmly bonding the two substrates together. In step (4), a printed layer 805 where a CD or DVD title is printed, is printed by screen printing or offset printing. Thus, in step (4), the ordinary laminated-type optical ROM disk is completed.

Figure 4:
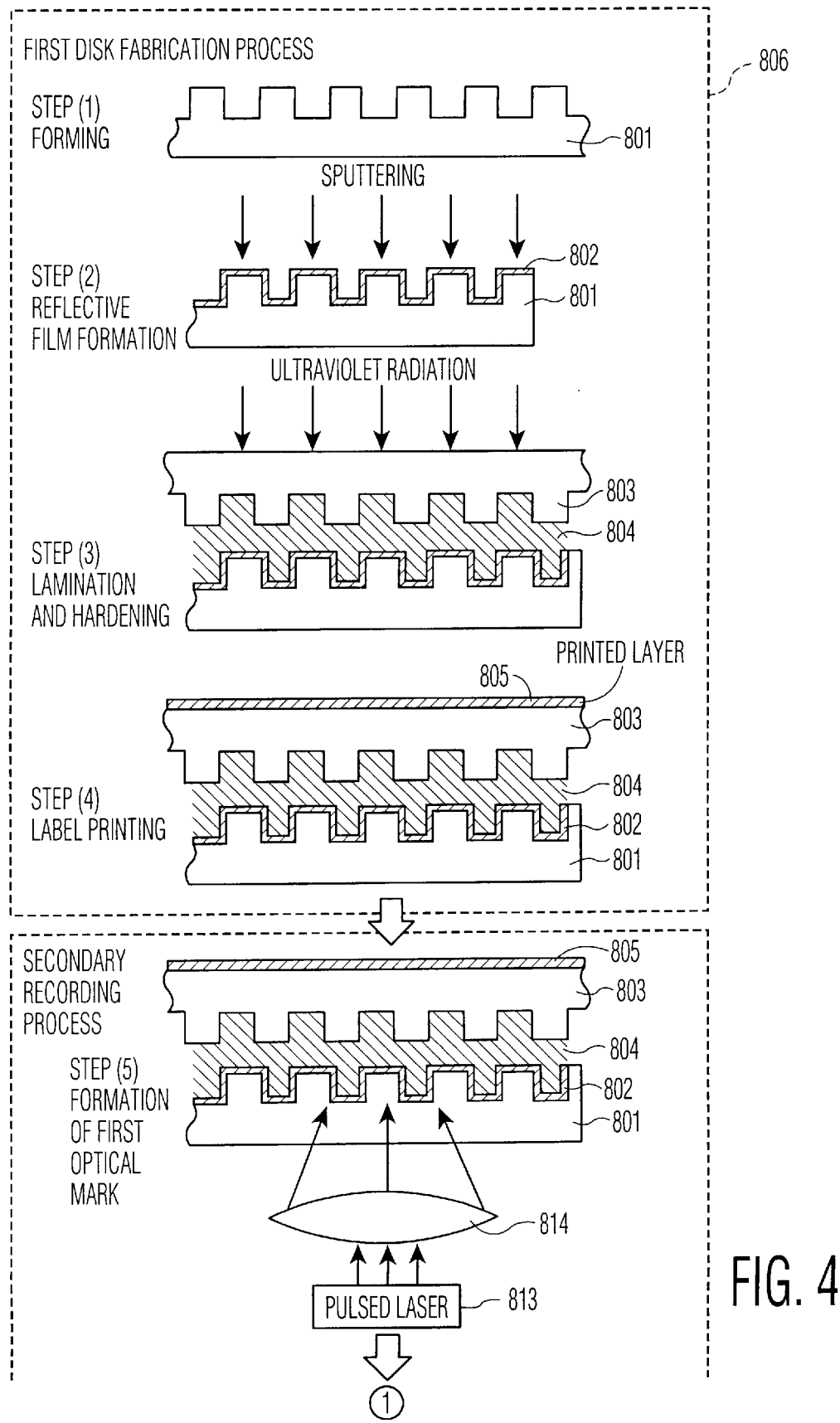
FIG. 4 is a diagram showing a disk fabrication process and a secondary recording process (part 1) according to the present embodiment.

(B) Next, the marking formation process will be described with reference to FIGS. 4 and 5. In FIG. 4, a laser beam from a pulsed laser 813 such as a YAG laser is focused through a converging lens 814 onto the reflective layer 802, to form a nonreflective portion 815 as shown in step (6) in FIG. 5. That is, a distinct waveform, such as the waveform (A) shown in step (7), is reproduced from the nonreflective portion 815 formed in step (6) in FIG. 5. By slicing this waveform, a marking detection signal such as shown by waveform (B) is obtained, from which hierarchial marking position information comprising an address, such as shown in signal (d), and an address, a frame synchronizing signal number, and a reproduced clock count, such as shown in signal (e), can be measured.

At the rising edge of the thus obtained marking detection signal, a specific address (indicated by address n in FIG. 5(d)) is read by the optical pickup from within the plurality of addresses shown in FIG. 5(d). FIG. 5(b) shows the physical location of the specific address in schematic form. On the other hand, FIG. 5(e) shows the logical structure of the data. As shown in FIG. 5(e), there are m frame synchronization signals under address n, and k reproduced clock pulses under each frame synchronization signal. Therefore, the position of the marking measured by the optical pickup can be represented by address, frame synchronization signal number, and reproduced clock count.

Figure 6:
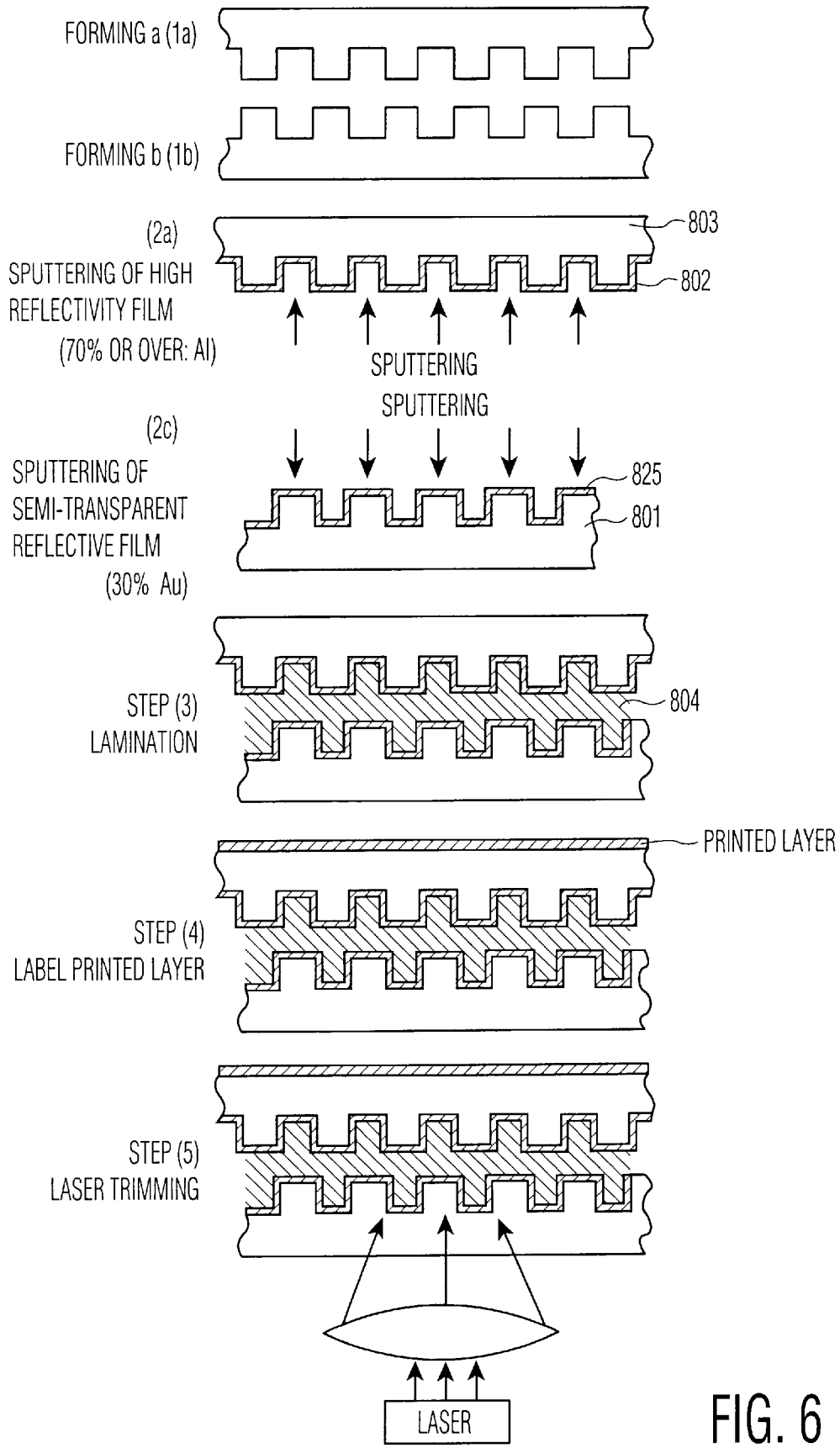
FIG. 6 is a diagram showing a two-layer disk fabrication process (part 1) according to the present embodiment.

As previously stated, a supplementary explanation will be given below of an alternative type of disk (a two-layer laminated disk) with reference to FIGS. 6 and 7.

Figure 5:
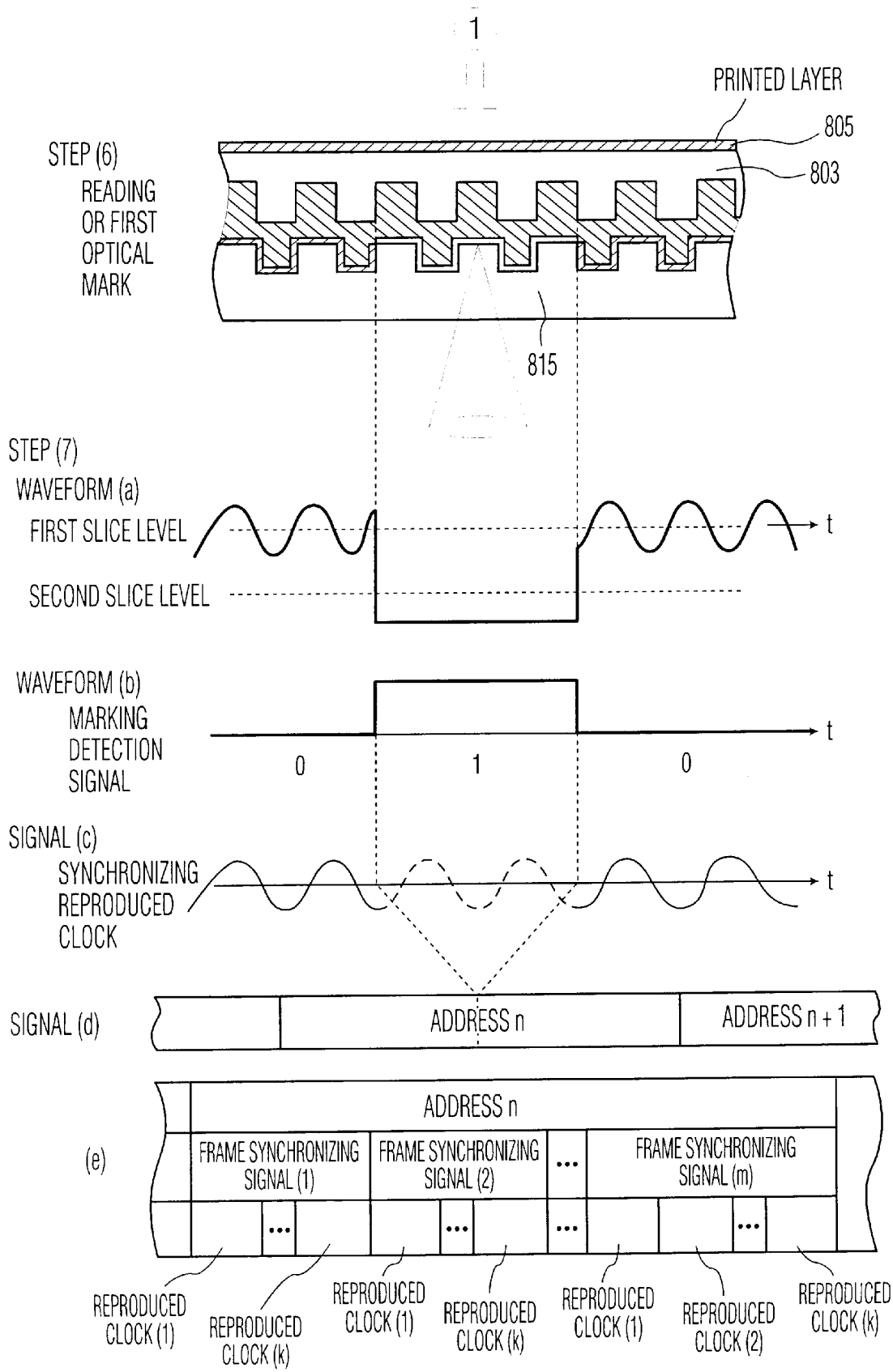
FIG. 5 is a diagram showing the disk fabrication process and the secondary recording process (part 2) according to the present embodiment.

FIGS. 4 and 5 showed a disk generally known as a single-layer laminated disk which has a reflective layer only on one substrate 801. On the other hand, FIGS. 6 and 7 show a disk generally known as a two-layer laminated disk which has reflective layers on both substrates 801 and 803. For laser trimming, the processing steps (5) and (6) are fundamentally the same for both types of disks, except with significant differences which are briefly described below. First, while the single-layer disk uses a reflective layer formed from an aluminum film having reflectivity as high as 70% or over, in the two-layer disk the reflective layer 801 formed on the reading-side substrate 801 is a semi-transparent gold (Au) film having a reflectivity of 30%, white the reflective layer 802 formed on the print-side substrate 803 is the same as that used in the single-layer disk. Second, as compared with the single-layer disk, the two-layer disk is required to have high optical accuracy; for example, the adhesive layer 804 must be optically transparent and be uniform in thickness, and the optical transparency must not be lost due to laser trimming.

Figure 7:
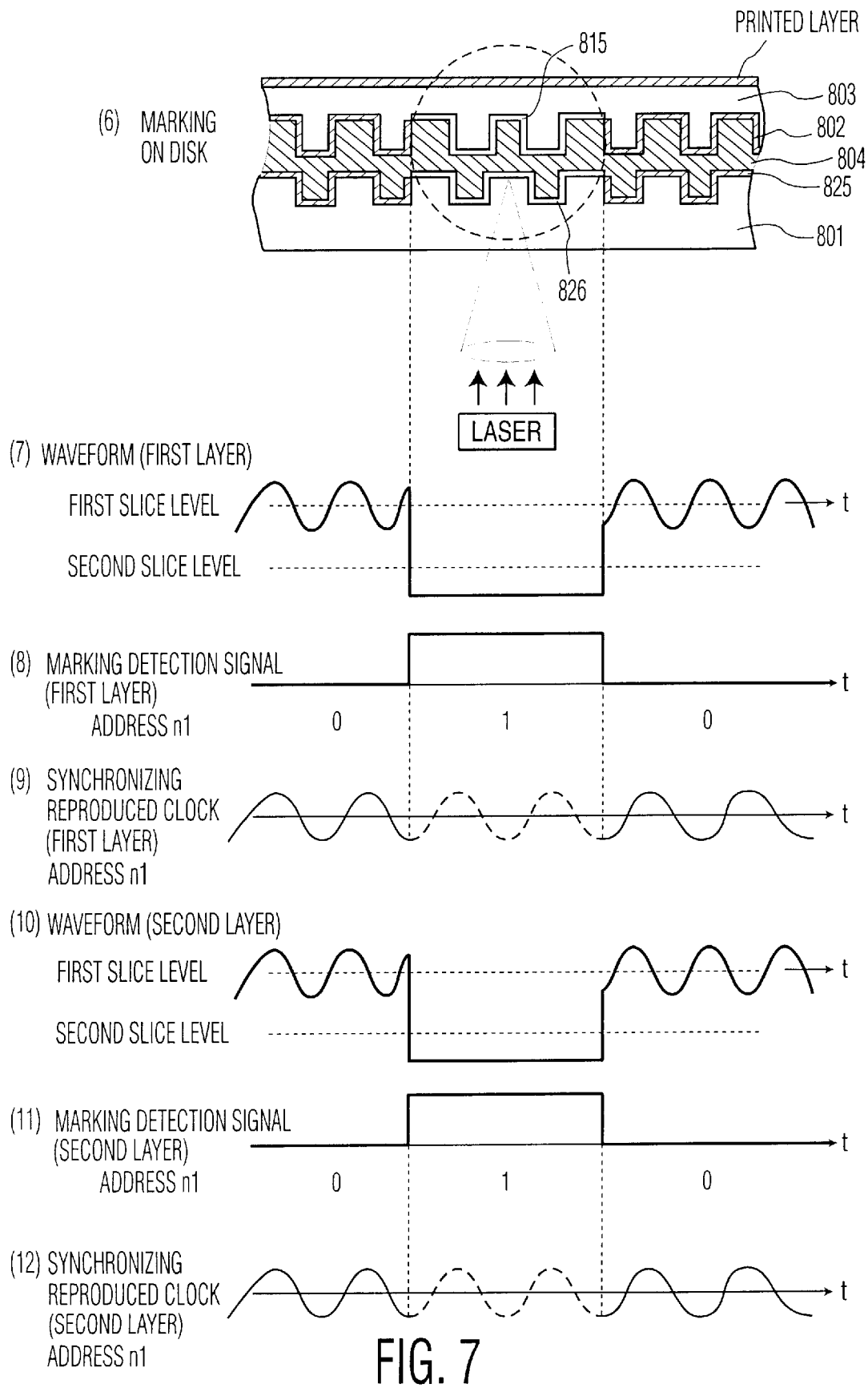
FIG. 7 is a diagram showing the two-layer disk fabrication process (part 2) according to the present embodiment.

Parts (7), (8), and (9) of FIG. 7 show the signal waveforms obtained from the first layer of the two-recording-layer disk. Likewise, parts (10), (11), and (12) of FIG. 7 show the signal waveforms obtained from the second layer of the two-recording-layer disk. The contents of these signal waveforms are essentially the same as those of the waveforms described with reference to parts (a) to (c) of FIG. 5. The waveform from the second layer is similar to that from the first layer, though the signal level is lower than from the first layer. However, since the first and second layers are bonded together, relative positional accuracy between them is random and can be controlled only with an accuracy of a few hundred microns. As will be described later, since the laser beam passes through the two reflective films, to make an illegal disk the position informations on the first and second layers for the first mark, for example, have to be made to match the same value on the legitimate disk. But making them match would require a near-submicron accuracy in laminating, and consequently, making illegal disks of the two-layer type is practically impossible.

Figure 8A:
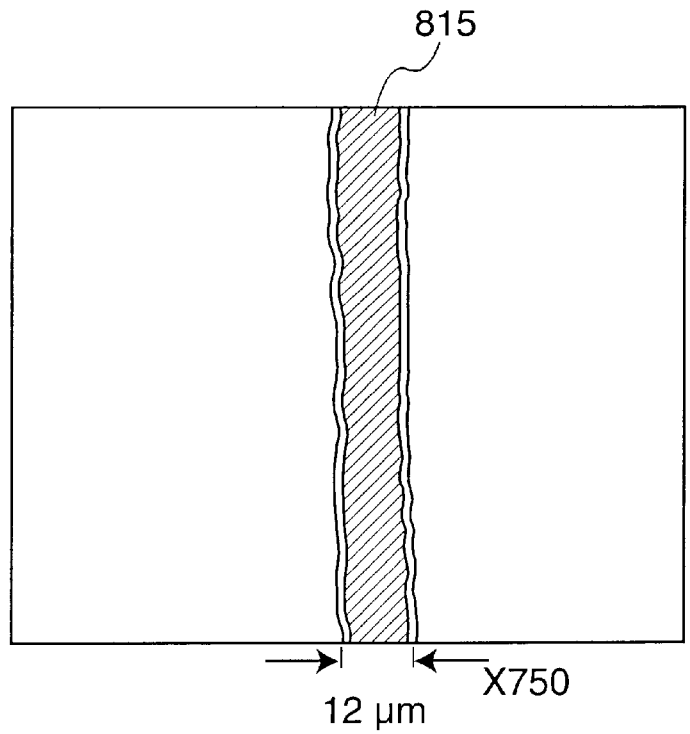
FIG. 8(a) is an enlarged view of a nonreflective portion of a laminated type according to the present embodiment, and (b) is an enlarged view of a nonreflective portion of a single-plate type according to the present embodiment.

The technique for forming the nonreflective optical marking portion will be described in further detail in sections (a) to (d) below with reference to FIGS. 8 to 12, etc., dealing with the laminated type in comparison with a single-plate type. FIGS. 8(a) and (b) are micrographs showing plan views of nonreflective optical marking portions, and FIG. 10(a) is a simplified schematic cross-sectional view of a nonreflective portion of the two-layer laminated disk.

Figure 10A:
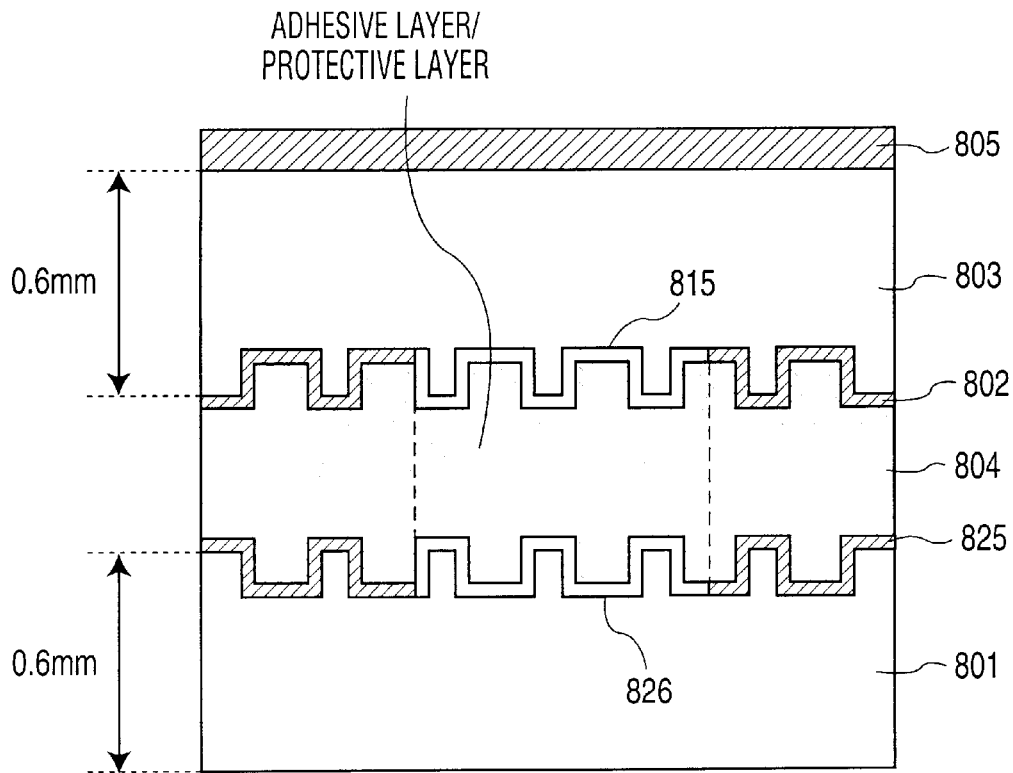
FIG. 10(a) is a cross-sectional view of a nonreflective portion of the laminated type according to the present embodiment, and (b) is a cross-sectional view of a nonreflective portion of the single-plate type according to the present embodiment.
Figure 11:
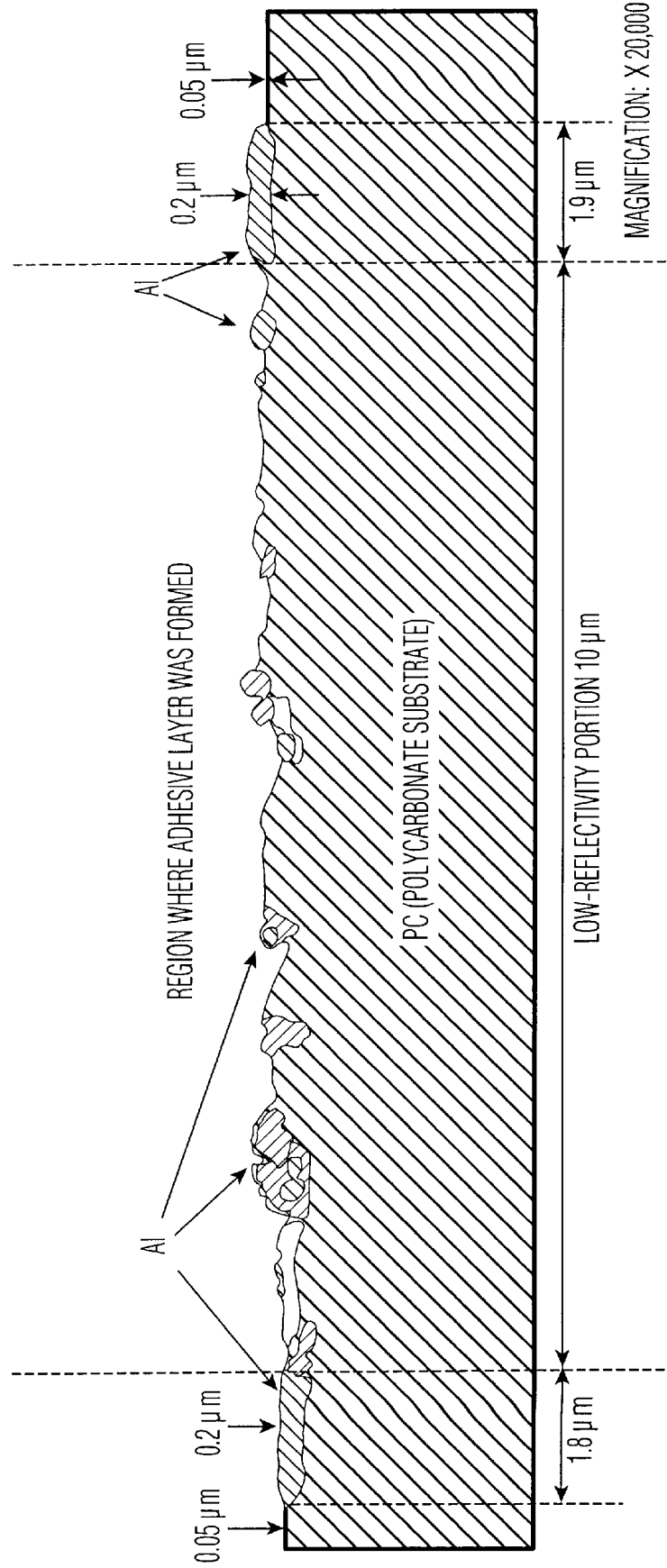
FIG. 11 is a schematic diagram, based on an observation through a transmission electron microscope, illustrating a cross section of the nonreflective portion according to the present embodiment.

(a) Using a 5 μj/pulse YAG laser, a laser beam was applied to a 500 angstrom aluminum layer lying 0.6 mm below the surface of a 1.2 mm thick ROM disk consisting of two 0.6 mm thick disks laminated together, and, as a result, a 12 μm wide slit-like nonreflective portion 815 was formed, as shown in the X 750 micrograph of FIG. 8(a). In this X 750 micrograph, no aluminum residues were observed on the nonreflective portion 815. Thick swollen aluminum layers, 2000 angstroms thick and 2 μm wide, were observed along boundaries between the nonreflective portion 815 and reflective portions. As shown in FIG. 10(a), it was confirmed that no significant damage had occurred inside. In this case, the application of the pulsed laser presumably melted the aluminum reflective layer, causing a phenomenon of molten aluminum buildup along the boundaries on both sides due to the surface tension. We call this a hot melt surface tension (HMST) recording method. This is a characteristic phenomenon observed only on a laminated disk 800. FIG. 11 is a schematic diagram, based on an observation through a transmission electron microscope (TEM), illustrating a cross section of the nonreflective portion formed by the above laser trimming process. And FIG. 11 shows that the adhesive layer of the disk has been removed by using solvent.

In the figure, if-the aluminum film swollen portion is 1.3 μm wide and 0.20 μm thick, the amount of increased aluminum in that portion is $1.3 \times (0.20-0.05)=0.195$ g m². The amount of aluminum originally deposited in a half portion (5 μm) of the laser exposed region (10 μm) was $5 \times 0.05=0.250$ μm². The difference is calculated as $0.250-0.195=0.055$ μm². In terms of length, this is equivalent to $0.055/0.05=1.1$ μm. This means that an aluminum layer of 0.05 μm thickness and 1.1 μm length remained, and therefore, it can be safely said that almost all aluminum was drawn to the film swollen portion. Thus, the result of the analysis of the figure also verifies the explanation about the above-described characteristic phenomenon.

Figure 8B:
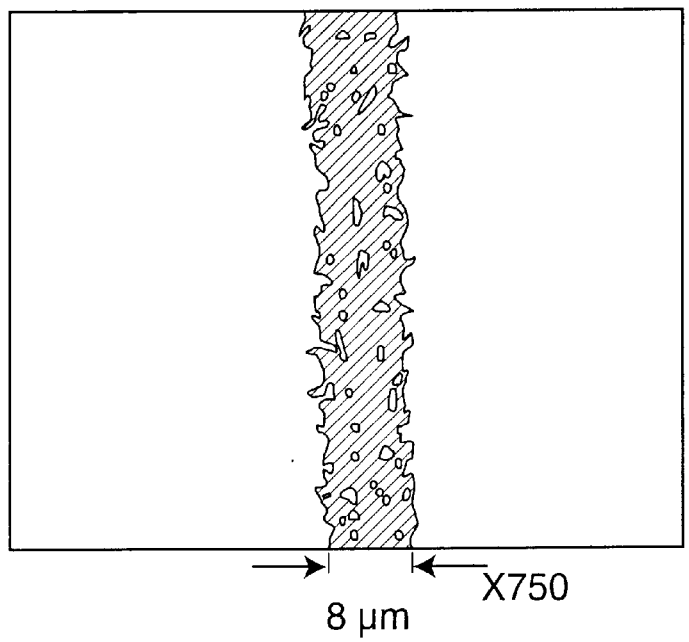
Figure 10B:
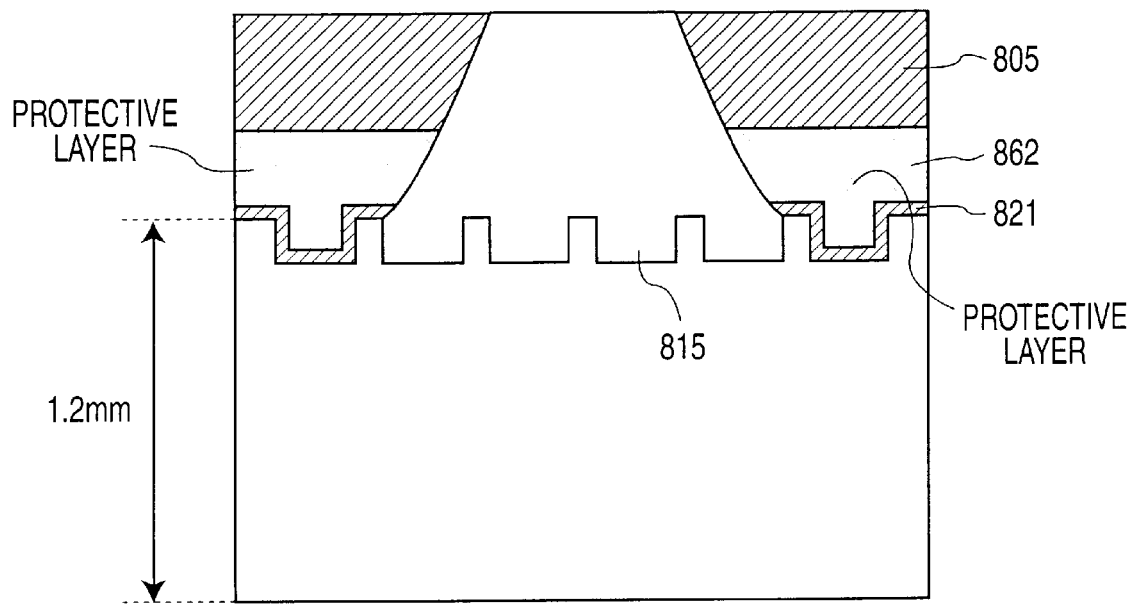

(b) We will next deal with the case of a single-plate optical disk (an optical disk comprising a single disk). An experiment was conducted by applying laser pulses of the same power to a 0.05 μm thick aluminum reflective film formed on a single-sided molded disk, of which result is shown in FIG. 8(b). As shown in the figure, aluminum residues were observed, and since these aluminum residues cause reproduction noise, it can be seen that the single-plate type is not suitable for secondary recording of optical disk information of which a high density and a low error rate are demanded. Furthermore, unlike the laminated disk, in the case of the single-plate disk, the protective layer 862 is inevitably damaged, as shown in FIG. 10(b), when the nonreflective portion is subjected to laser trimming. The degree of damage depends on the laser power, but the damage cannot be avoided even if the laser power is controlled accurately. Moreover, according to our experiment, the printed layer 805 formed by screen printing to a thickness of a few hundred microns on the protective layer 862 was damaged when its thermal absorptance was high. In the case of the single-plate disk, to address the problem of protective layer damage, either the protective layer has to be applied once again or the laser cut operation should be performed before depositing the protective layer. In any case, the single-plate type may present a problem in that the laser cut process has to be incorporated in the pressing process. This limits the application of the single-plate disk despite its usefulness.

Figure 12A:
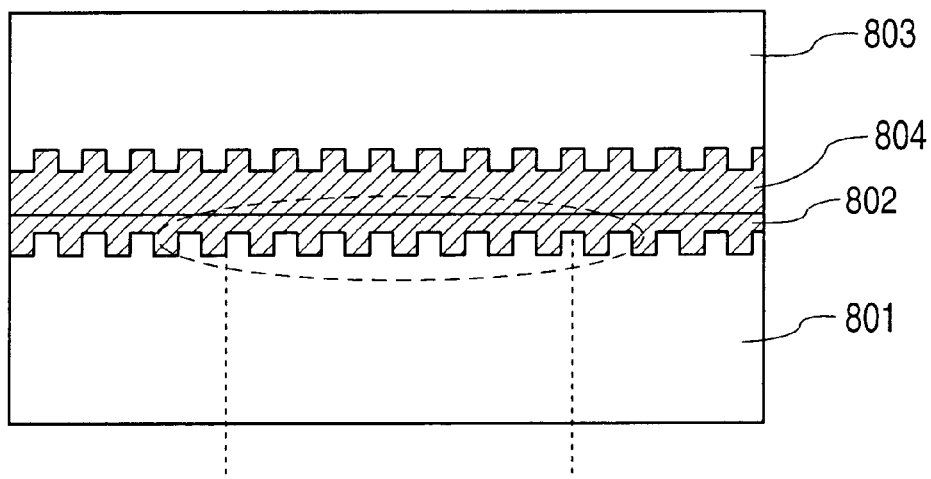
FIG. 12(a) is a cross-sectional view of a disk according to the present embodiment, and (b) is a crosssectional view of the nonreflective portion of the disk according to the present embodiment.
Figure 12B:
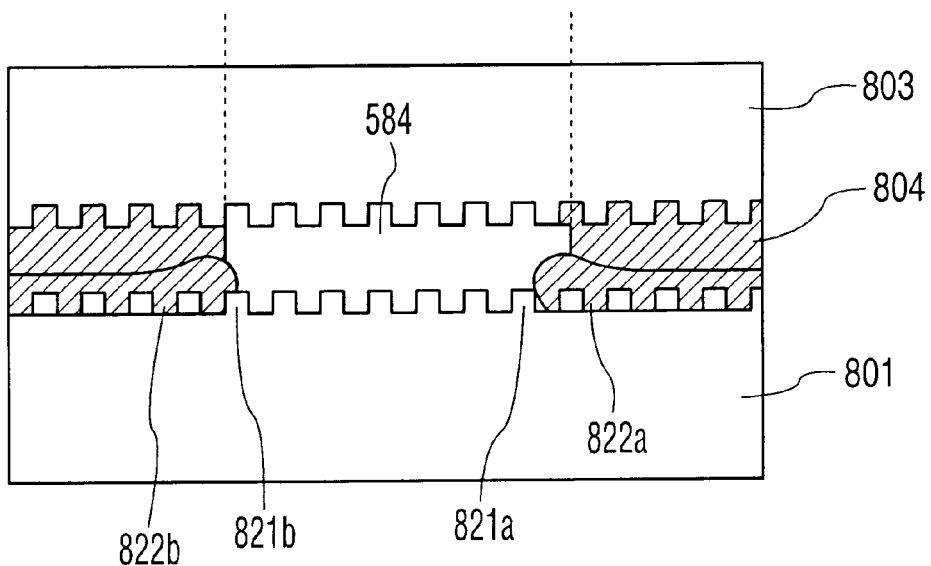

(c) A comparison between single-plate disk and laminated disk has been described above, using a two-layer laminated disk as an example. As is apparent from the above description, the same effect as obtained with the two-layer laminated disk can be obtained with the single-layer laminated disk. Using FIGS. 12(a), 12(b), etc., a further description will be given dealing with the single-layer laminated disk type. As shown in FIG. 12(a), the reflective layer 802 has the transparent substrate 801 of polycarbonate on one side, and the hardened adhesive layer 804 and a substrate on the other side, the reflective layer 802 thus being hermetically sealed therebetween. In this condition, pulsed laser light is focused thereon for heating; in the case of our experiment, heat of 5 µJ/pulse is applied to a circular spot of 10 to 20 µm diameter on the reflective layer 802 for a short period of 70 ns. As a result, the temperature instantly rises to 600° C., the melting point, melting state is caused. By heat transfer, a small portion of the transparent substrate 801 near the spot is melted, and also a portion of the adhesive layer 804 is melted. The molted aluminum in this state is caused by surface tension to build up along boundaries 821a and 821b, with tension being applied to both sides, thus forming buildups 822a and 822b of hardened aluminum, as shown in FIG. 12(b). The nonreflective portion 584 free from aluminum residues is thus formed. This shows that a clearly defined nonreflective portion 584 can be obtained by laser-trimming the laminated disk as shown in FIGS. 10(a) and 12(a). Exposure of the reflective layer to the outside environment due to a damaged protective layer, which was the case with the single-plate type, was not observed even when the laser power was increased more than 10 times the optimum value. After the laser trimming, the nonreflective layer 584 has the structure shown in FIG. 12(b) where it is sandwiched between the two transparent substrates 801, 803 and sealed with the adhesive layer 804 against the outside environment, thus producing the effect of protecting the structure from environmental effects.

(d) Another benefit of laminating two disks together will be described next. When secondary recording is made in the form of a barcode, an illegal manufacturer can expose the aluminum layer by removing the protective layer in the case of a single-plate disk, as shown in FIG. 10(b). This gives rise to a possibility that nonencrypted data may be tampered with by redepositing an aluminum layer over the barcode portion on a legitimate disk and then laser-trimming a different barcode. For example, if the ID number is recorded in plaintext or separately from main ciphertext, in the case of a single-plate disk it is possible to alter the ID number, enabling illegal use of the software by using a different password. However, if the secondary recording is made on the laminated disk as shown in FIG. 10(a), it is difficult to separate the laminated disk into two sides. In addition, when removing one side from the other, the aluminum reflective film is partially destroyed. When the anti-piracy marking is destroyed, the disk will be judged as being a pirated disk and will not run. Accordingly, when making illegal alterations to the laminated disk, the yield is low and thus illegal alterations are suppressed for economic reasons. Particularly, in the case of the two-layer laminated disk, since the polycarbonate material has temperature/humidity expansion coefficients, it is nearly impossible to laminate the two disks, once separated, by aligning the anti-piracy markings on the first and second layers with an accuracy of a few microns, and to mass produce disks. Thus, the two-layer type provides a greater effectiveness in piracy prevention. It was thus found that a clearly defined slit of a nonreflective portion 584 can be obtained by laser-trimming the laminated disk 800.

The technique for forming the nonreflective optical marking portion has been described in (a) to (d) above.

(C) Next, the process of reading the position of the thus formed marking will be described.

Figure 15:
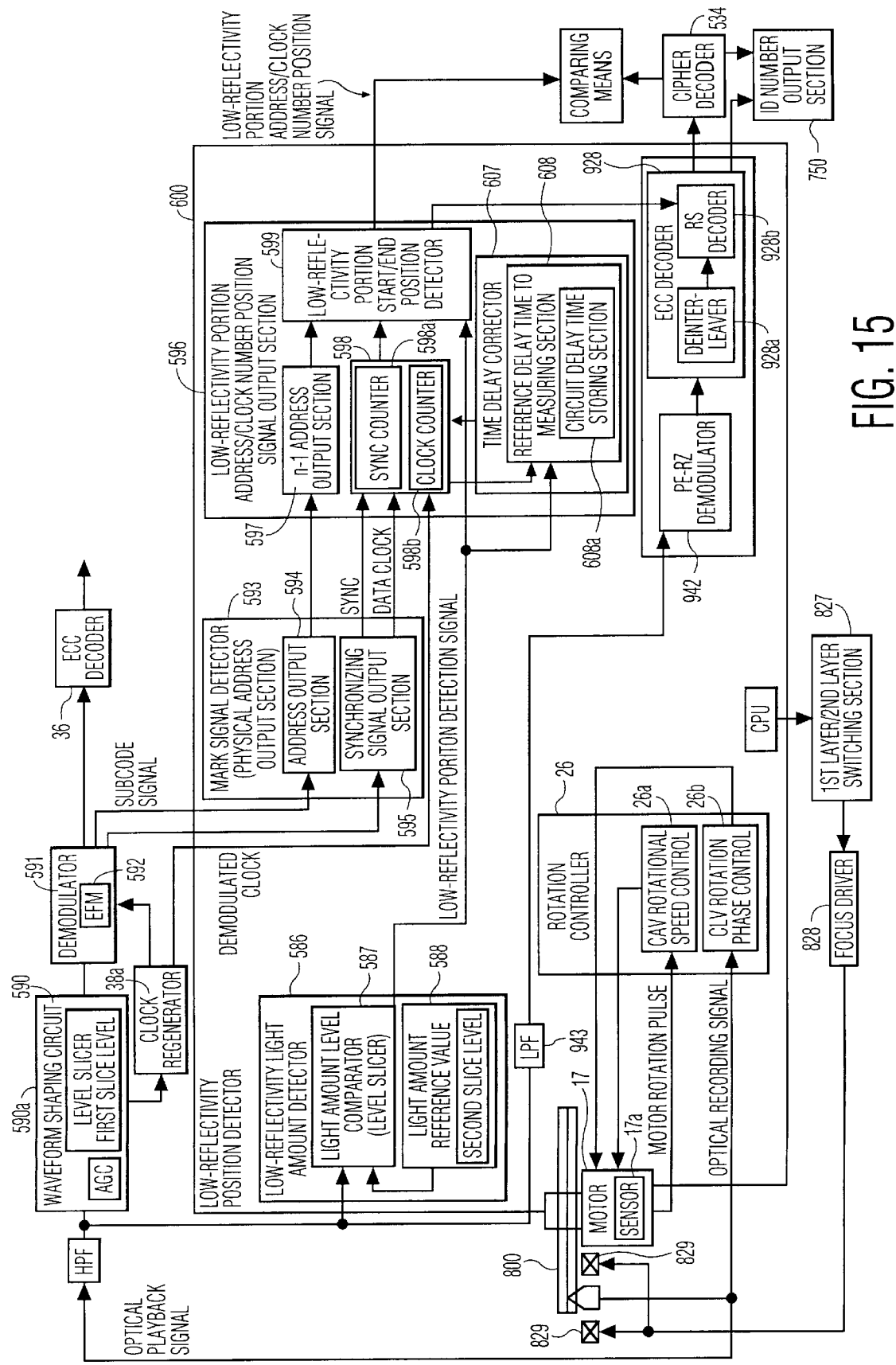
FIG. 15 is a block diagram of a low-reflectivity position detector according to the embodiment.
Figure 16:
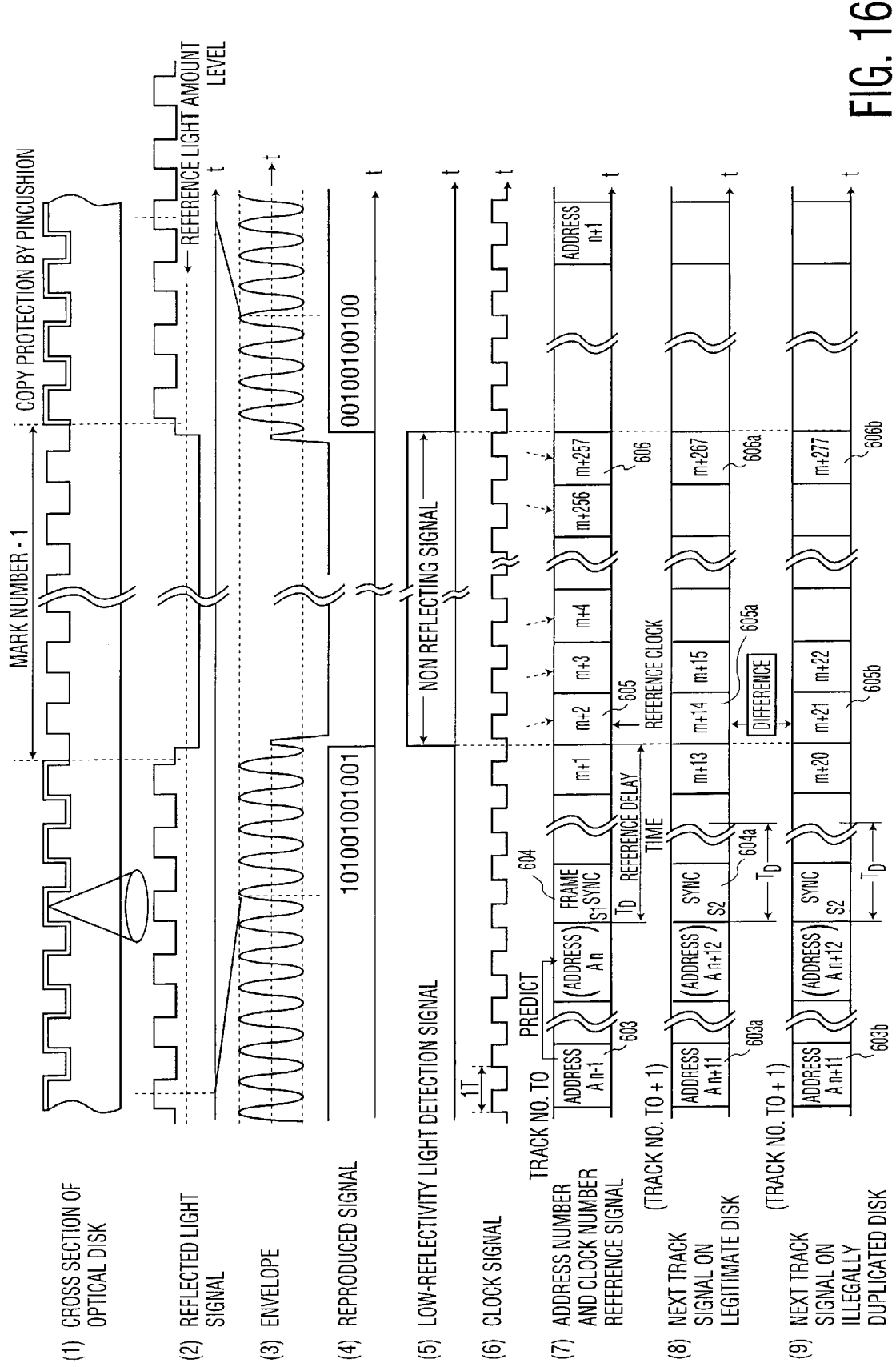
FIG. 16 is a diagram illustrating the principle of detecting address/clock positions of a low-reflectivity portion according to the embodiment.

FIG. 15 is a block diagram showing a low reflectivity light amount detector 586 for detecting the nonreflective optical marking portion, along with its adjacent circuitry, in an optical disk manufacturing process. FIG. 16 is a diagram illustrating the principle of detecting address/clock positions of the low reflectivity portion. For convenience of explanation, the following description deals with the operating principle when a read operation is performed on a nonreflective portion formed on an optical disk constructed from a single disk. It will be recognized that the same operating principle also applies to an optical disk constructed from two disks laminated together.

Figure 9A:
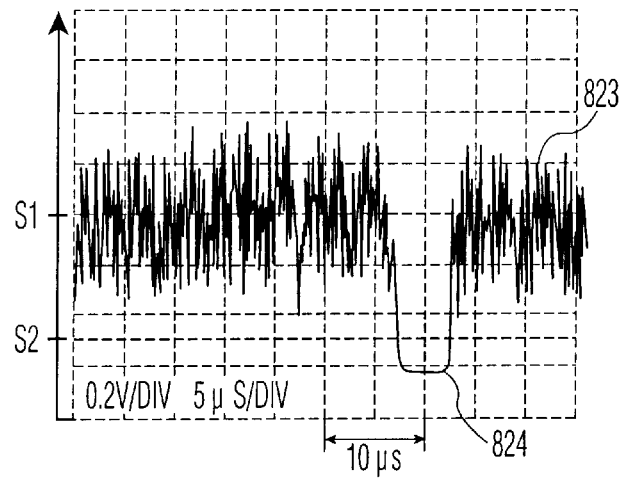
FIG. 9(a) is a reproduced-waveform diagram for a nonreflective portion according to the present embodiment, (b) is a reproduced-waveform diagram for a nonreflective portion according to the present embodiment, (c) is a reproduced-waveform diagram for a nonreflective portion according to the present embodiment, and (d) is a plan view of a master disk produced by a master disk method.

As shown in FIG. 15, the disk 800 is loaded into a marking reading apparatus equipped with a low reflectivity position detector 600 to read the marking, and in this case, since a signal waveform 823 due to the presence and absence of pits and a signal waveform 824 due to the presence of the nonreflective portion 584 are significantly different in signal level, as shown in the waveform diagram of FIG. 9(a), they can be clearly distinguished using a simple circuit.

Figure 9B:
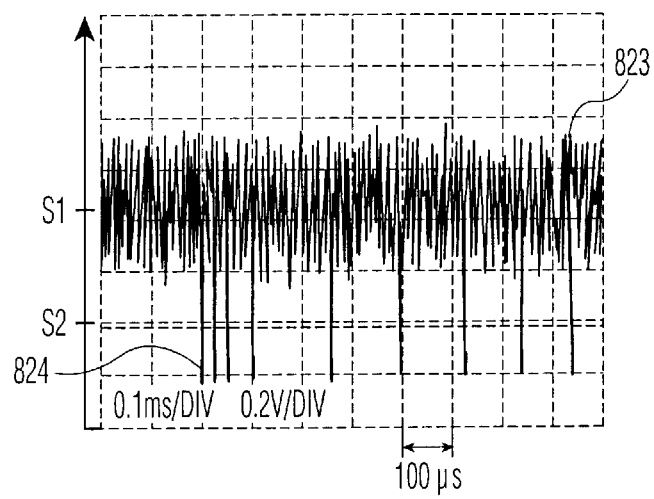

FIG. 9(a) is a diagram showing the waveform of a playback signal from a PCA area, described later, containing the nonreflective portion 584 formed by laser light. FIG. 9(b) is a diagram showing the waveform of FIG. 9(a) but with a different time axis.

Figure 9C:
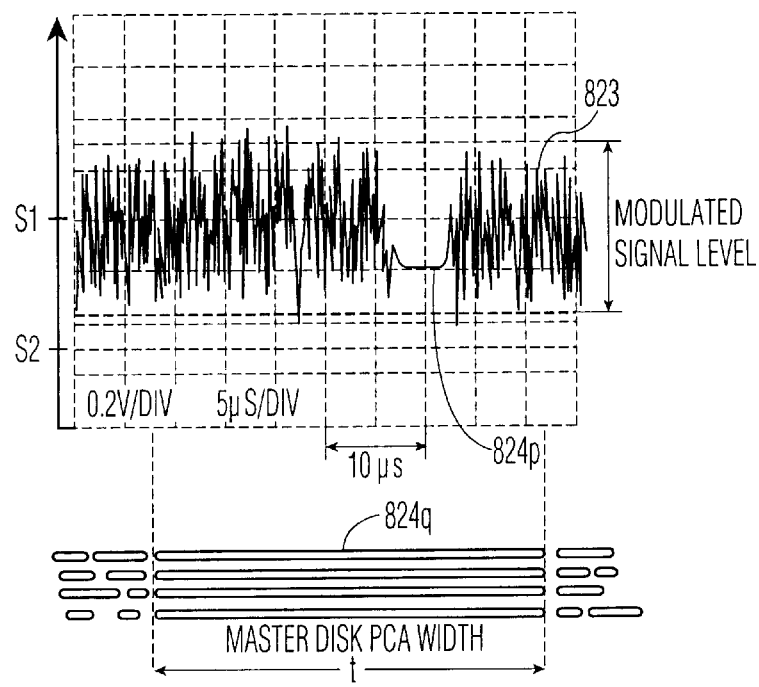

By removing the reflective film by laser light, as described above, a waveform easily distinguishable from that of a pit signal is obtained. Rather than forming an anti-piracy identification mark by removing the reflective film by laser light, as described above, the anti-piracy mark may be formed by changing the shape of pits on the master disk. This method will be described below. FIG. 9(c) shows the waveform of a playback signal when the anti-piracy identification mark was formed by making pits longer than other data pits on the master disk. It can be seen from the diagram that the waveform 824p of the anti-piracy identification mark is distinguishable from the waveform of other pit data. In this way, a waveform similar to that obtained from the PCA area described later can be obtained by forming longer pits on the master disk: in this case, however, the waveform is a little difficult to distinguish as compared to the waveforms shown in parts (a) and (b) of FIG. 9.

Figure 9D:

By removing the reflective film by laser light, as described above, a waveform easily distinguishable from that of a pit signal is obtained. Rather than forming the barcode of the invention by removing the reflective film by laser light, as described above, the barcode may be formed by changing the shape of pits on the master disk. This master disk method will be described below. FIG. 9(d) is a plan view showing a portion of a master disk wherein pits 824q in a few hundred tracks on the master disk are made longer than other data pits and made equal to the barcode bar width t(=10 µm). Since reflectivity drops in this longer-bit area, a waveform 824p as shown in FIG. 9(c) is obtained. It can be seen from the diagram that the waveform 824p by the master disk method is distinguishable from the waveform of other pit data. In this way, a waveform similar to that obtained from the PCA area described later can be obtained by the master disk method; in this case, however, the waveform is a little difficult to distinguish as compared to the waveforms shown in parts (a) and (b) of FIG. 9.

As shown in FIG. 16(1), the start and end positions of the nonreflective portion 564 having the above waveform can be easily detected by the low reflectivity light amount detector 586 shown in the block diagram of FIG. 15. Using the reproduced clock signal as the reference signal, position information is obtained in a low reflectivity position information output section 596. FIG. 16(1) shows a cross-sectional view of the optical disk.

As shown in FIG. 15, a comparator 587 in the low reflectivity light amount detector 586 detects the low reflectivity light portion by detecting an analog light reproduced signal having a lower signal level than a light amount reference value 588. During the detection period, a low reflectivity portion detection signal of the waveform shown in FIG. 16(5) is output. The addresses and clock positions of the start position and end position of this signal are measured.

The reproduced light signal is waveshaped by a waveform shaping circuit 590 having an AGC 590a, for conversion into a digital signal. A clock regenerator 38a regenerates a clock signal from the waveshaped signal. An EFM demodulator 592 in a demodulating section 591 demodulates the signal, and an ECC corrects errors and outputs a digital signal. The EFM-demodulated signal is also fed to a physical address output section 593 where an address of MSF, from Q bits of a subcode in the case of a CD, is output from an address output section 594 and a synchronizing signal, such as a frame synchronizing signal, is output from a synchronizing signal output section 595. From the clock regenerator 38a, a demodulated clock is output.

In a low reflectivity portion address/clock signal position signal output section 596, a low reflectivity portion start/end position detector 599 accurately measures the start posistion and end position of the low reflectivity portion 584 by using an (n−1) address output section 597 and an address signal as well as a clock counter 598 and a synchronizing clock signal or the demodulated clock. This method will be described in detail by using the waveform diagrams shown in FIG. 16. As shown in the cross-sectional view of the optical disk in FIG. 16(1), the low reflectivity portion 584 of mark number 1 is formed partially. A reflection selope signal such as shown in FIG. 16(3), is output, the signal level from the reflective portion being lower than the light amount reference value 588. This is detected by the light level comparator 587, and a low reflectivity light detection signal, such as shown in FIG. 16(5), is output from the low reflectivity light amount detector 586. As shown by a reproduced digital signal in FIG. 16(4), no digital signal is output from the mark region since it does not have a reflective layer.

Next, to obtain the start and end positions of the low reflectivity light detection signal, the demodulated clock or synchronizing clock shown in FIG. 16(6) is used along with address information. First, a reference clock 605 at address n in FIG. 16(7) is measured. When the address immediately preceding the address n is detected by the (n−1) address output section 597, it is found that the next sync 604 is a sync at address n. The number of clocks from the synch 604 to the reference clock 605, which is the start position of the low reflectivity light detection signal, is counted by the clock counter 598. This clock count is defined as a reference delay time TD which is measured by a reference delay time TD measuring section 608 for storage therein.

The circuit delay time varies with reproduction apparatus used for reading, which means that the reference delay time TD varies depending on the reproduction apparatus used. Therefore, using the TD, a time delay corrector 607 applies time correction, and the resulting effect is that the start clock count for the low reflectivity portion can be measured accurately if reproduction apparatus of different designs are used for reading. Next, by finding the clock count and the start and end addresses for the optical mark No. 1 in the next track, clock m+14 at address n+12 is obtained, as shown in FIG. 16(8). Since TD=m+2, the clock count is corrected to 12, but for convenience of explanation, n+14 is used. We will describe another method, which eliminates the effects of varying delay times without having to obtain the reference delay time TD in the reproduction apparatus used for reading. This method can check whether the disk is a legitimate disk or not by checking whether the positional relationship of mark 1 at address n in FIG. 16(8) relative to another mark 2 matches or not. That is, TD is ignored as a variable, and the difference between the position, A1=a1+TD, of mark 1 measured and the position, A2=a2+TD, of mark 2 measured is obtained, which is given as A1−A2=a1−a2. At the same time, it is checked whether this difference matches the difference, a1−a2, between the position a1 of the decrypted mark 1 and the position information a2 of the mark 2, thereby judging whether the disk is a legitimate disk or not. The effect of this method is that the positions can be checked after compensating for variations of the reference delay time TD by using a simpler constitution.

(D) Next, the encrypted information writing process will be described. The position information read in the process (C) is first converted into ciphertext or "signed" with a digital signature. Then, the marking position information thus encrypted or signed is converted into a barcode as an ID unique to the optical disk, and the barcode is recorded in overwriting fashion in a prescribed region of a pre-pit area on the optical disk. Barcode patterns 584c 584e in FIG. 2(a) indicate the barcode written to the prescribed region of the pre-pit area, that is, in the innermost portion of the pre-pit area.

Figure 3:
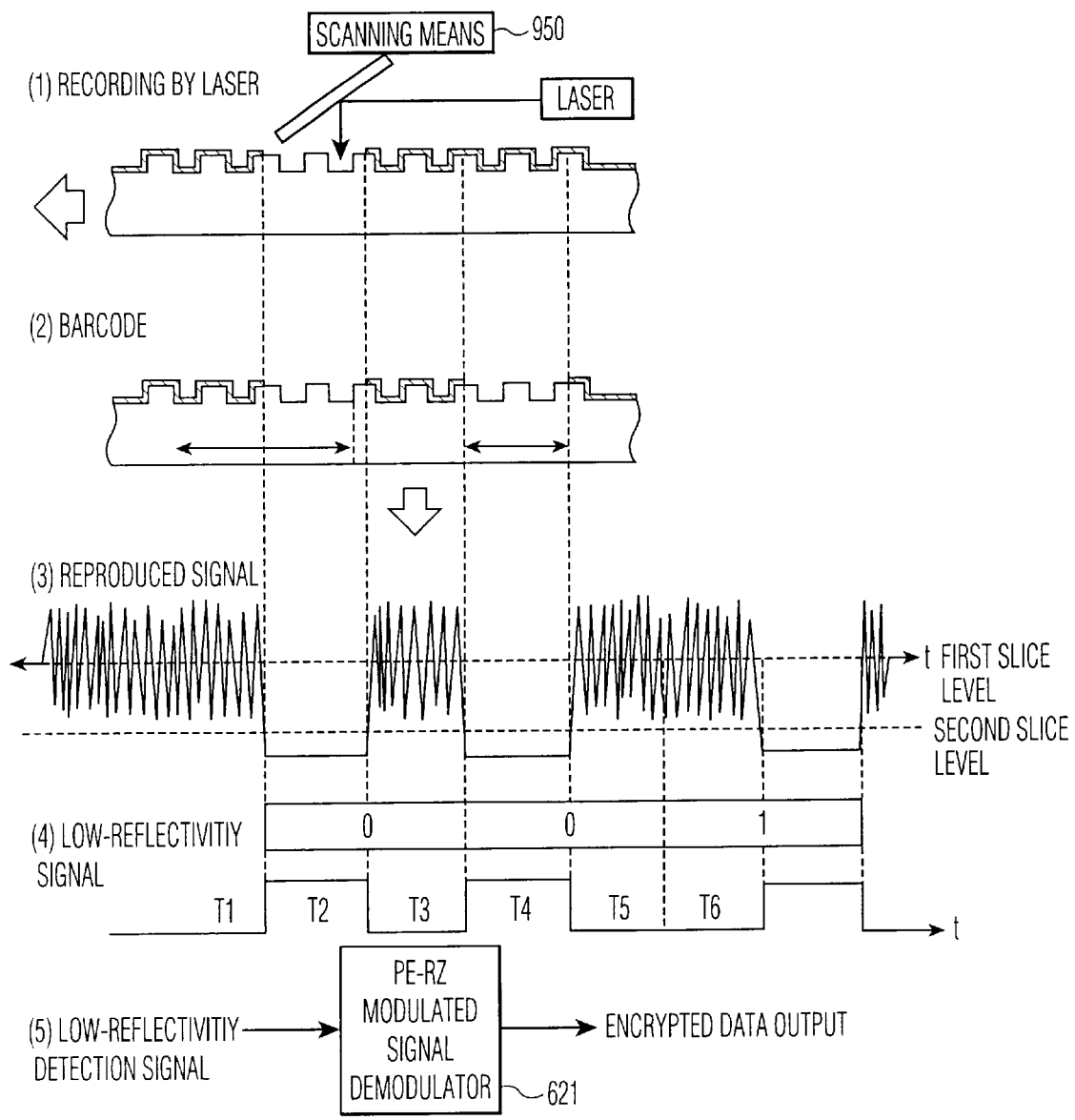
FIG. 3 is a flowchart illustrating a process of recording encrypted position information on a disk in the form of a barcode according to the present embodiment.

Parts (1) to (5) of FIG. 3 show the process from the recording of the barcode to the demodulation of the barcode detection signal by a PE-RZ modulated signal demodulator. In part (1) of FIG. 3, the reflective layer is trimmed by a pulsed laser, and a barcode-like trimming pattern, such as shown in part (2) of the figure, is formed. At the playback apparatus (player), an envelope waveform some portions of which are missing, as shown in part (3) of the figure, is obtained. The missing portions result in the generation of a low level signal that cannot occur with a signal generated from an ordinary pit. Therefore, this signal is sliced by a second slice level comparator to obtain a low-reflectivity portion detection signal as shown in part (4) of the figure. In part (5) of the figure, the playback signal of the barcode is demodulated from this low-reflectivity portion detection signal by the PE-RZ modulated signal demodulator 621 which will be described in detail in the second-half part (II). It will be appreciated that, instead of the PE-RZ modulated signal demodulator 621, a pulse-width modulated signal demodulator (PWM) demodulator) may be used, in which case also, a similar effect can be obtained.

When applying the above encryption or digital signature, a secret key of a public key encryption function is used. As an example of the encryption, FIGS. 18A and 18B show an encryption process using an RSA function.

Figure 18A:
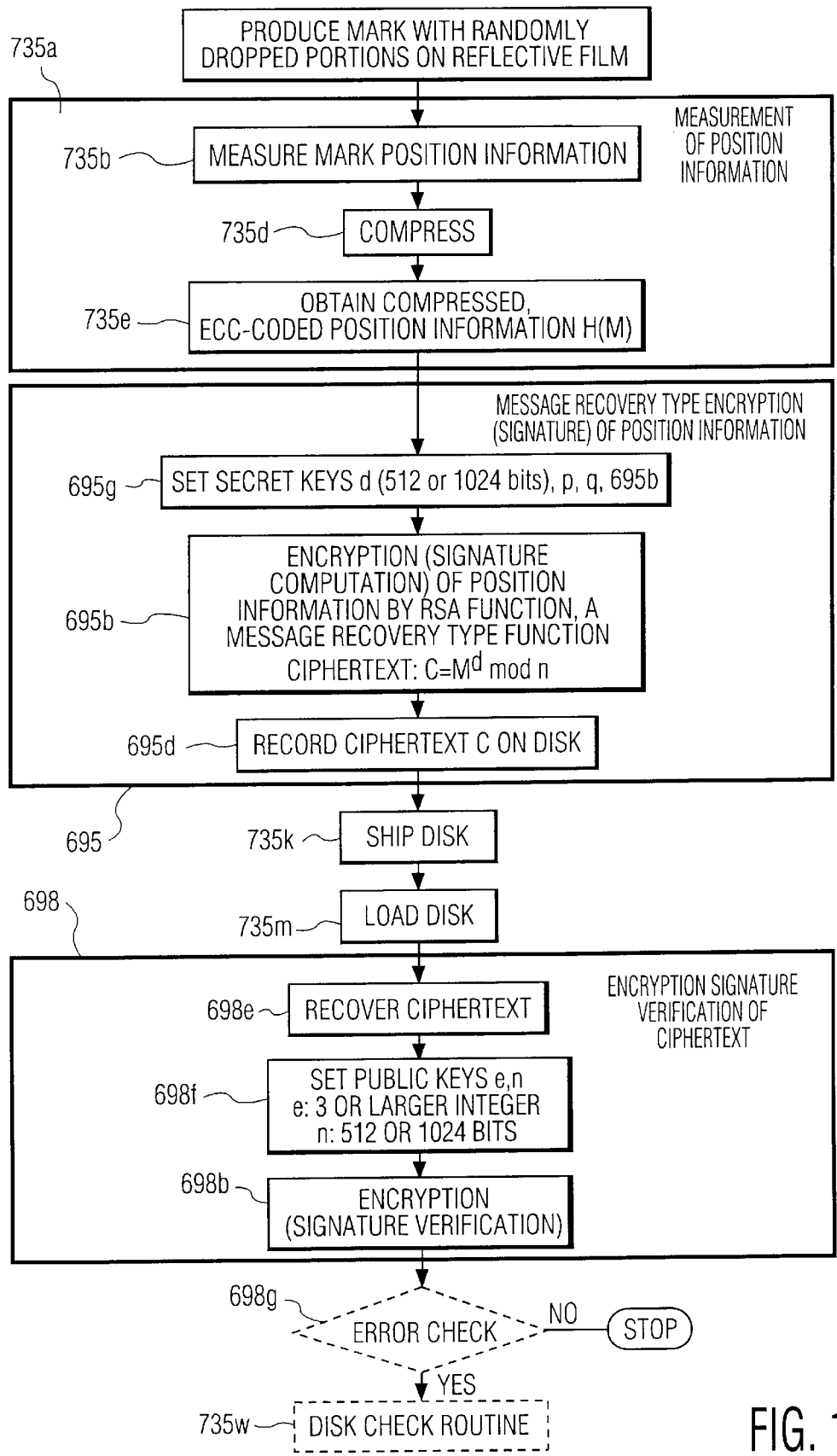
FIG. 18A is a flowchart illustrating a procedure for encryption, etc. using an RSA function according to the embodiment.
Figure 18B:
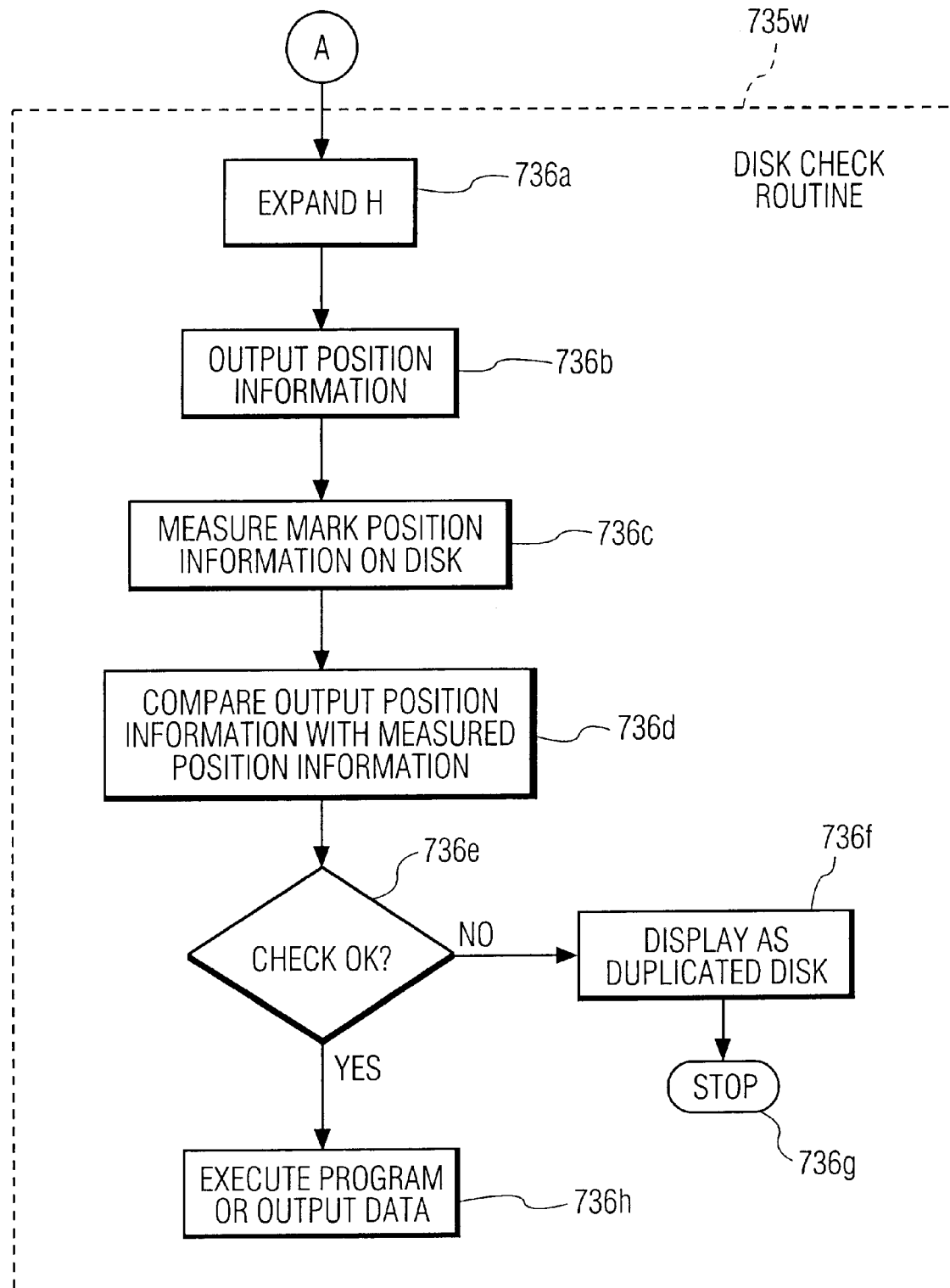
FIG. 18B is a flowchart illustrating a position information check process according to the embodiment.

As shown in FIG. 18A, the process consists of the following major routines: step 735a where marking position information is measured at the optical disk maker, step 695 where the position information is encrypted (or a digital signature is appended), step 698 where the position information is decrypted (or the signature is verified or authenticated). in the reproduction apparatus, and step 735w where a check is made to determine whether the disk is a legitimate optical disk or not.

First, in step 735a, the marking position information on the optical disk is measured in step 735b. The position information is then compressed in step 735d, and the compressed position information H is obtained in step 735e.

In step 695, the ciphertext of the compressed position information H is constructed. First, in step 695, a secret key, d, of 512 or 1024 bits, and secret keys, p and q, of 256 or 512 bits, are set, and in step 695*b*, encryption is performed using an RSA function. When the position information H is denoted by M, M is raised to d-th power and mod n is calculated to yield ciphertext C. In step 695*d*, the ciphertext C is recorded on the optical disk. The optical disk is thus completed and is shipped (step 735*k*).

In the reproduction apparatus, the optical disk is loaded in step 735*m*, and the ciphertext C is decrypted in step 698. More specifically, the ciphertext C is recovered in step 698*e*, and public keys, e and n, are set in step 698*f*; then in step b, to decrypt the ciphertext C, the ciphertext C is raised to e-th power and the mod n of the result is calculated to obtain plaintext M. The plaintext M is the compressed position information H. An error check may be performed in step 698*g*. If no errors, it is decided that no alterations have been made to the position information, and the process proceeds to the disk check routine 735*w* shown in FIG. 18B. If an error is detected, it is decided that the data is not legitimate one, and the operation is stopped.

In the next step 736*a*, the compressed position information H is expanded to recover the original position information. In step 736*c*, measurements are made to check whether the marking is actually located in the position on the optical disk indicated by the position information. In step 736*d*, it is checked whether the difference between the decrypted position information and the actually measured position information falls within a tolerance. If the check is OK in step 736*e*, the process proceeds to step 736*h* to output software or data or execute programs stored on the optical disk. If the check result is outside the tolerance, that is, if the two pieces of position information do not agree, a display is produced to the effect that the optical disk is an illegally duplicated one, and the operation is stopped in step 736*g*. RSA has the effect of reducing required capacity since only the ciphertext need be recorded.

Figure 44:
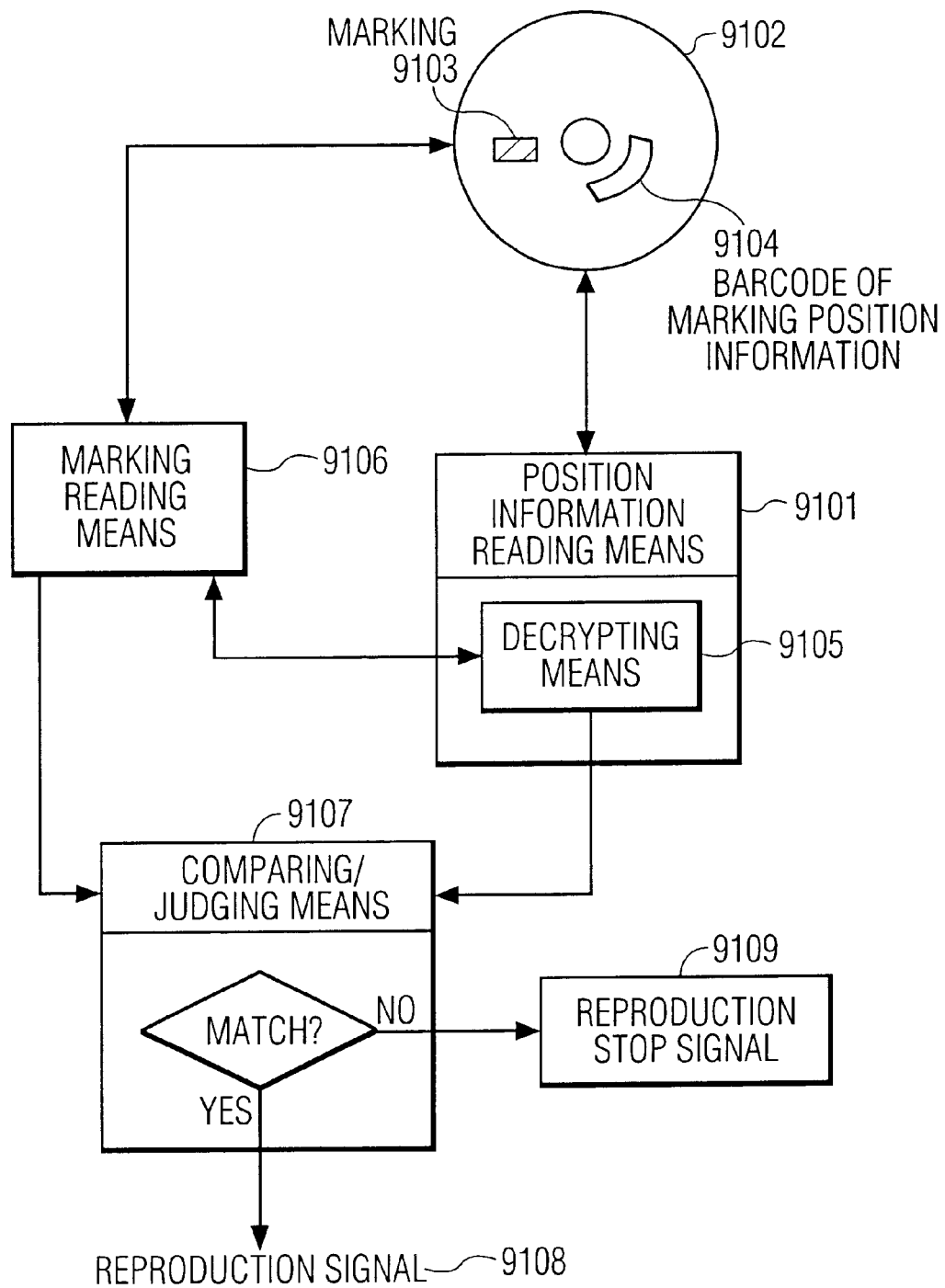
FIG. 44 is a diagram illustrating a piracy prevention algorithm according to the embodiment.

(E)The processing steps in the optical disk manufacturing process have been described above. Next, the constitution and operation of a reproduction apparatus (player) for reproducing the thus completed optical disk on a player will be described with reference to FIG. 44.

In the figure, the construction of an optical disk 9102 will be described first. A marking 9103 is formed on a reflective layer (not shown) deposited on the optical disk 9102. In the manufacturing process of the optical disk, the position of the marking 9103 was detected by position detecting means, and the detected position was encrypted as marking position information and written on the optical disk in the form of a barcode 9104.

Position information reading means 9101 reads the barcode 9104, and decrypting means 9105 contained therein decrypts the contents of the barcode for output. Marking reading means 9106 reads the actual position of the marking 9103 and outputs the result. Comparing/judging means 9107 compares the decrypted result from the decrypting means 9105 contained in the position information reading means 9101 with the result of reading by the marking reading means 9106, and judges whether the two agree within a predetermined allowable range. If they agree, a reproduction signal 9108 for reproducing the optical disk is output; if they do not agree, a reproduction stop signal 9109 is output. Control means (not shown) controls the reproduction operation of the optical disk in accordance with these signals; when the reproduction stop signal is output, an indication to the effect that the optical disk is an illegal duplicated disk is displayed on a display (not shown) and the reproduction operation is stopped. In the above operation, it will be recognized that it is also possible for the marking reading means 9106 to use the decrypted result from the decrypting means 9105 when reading the actual position of the marking 9103.

Namely in this case, the marking reading means 9106 checks whether the marking is actually located in the position on the optical disk indicated by the position information which is decrypted by the decrypting means 9105.

Thus the reproduction apparatus of the above construction can detect an illegally duplicated optical disk and stop the reproduction operation of the disk, and can prevent illegal duplicates practically (II)

We finish here the description of the first-half part (I), and now proceed to the description of the second-half past (II). This part focuses particularly on techniques, including a barcode formation method, used when barcoding the above marking position information (ID information) as a disk-unique ID.

(A) Features of the optical disk of the present invention will be described.

When a barcode is recorded by laser trimming on the above-described single-plate disk, the protective layer 862 is destroyed, as explained in connection with FIG. 10(*b*). Therefore, after laser trimming at a press factory, the destroyed protective layer 862 has to be reformed at the press factory.

This means that a barcode cannot be recorded on the optical disk at a software company or a dealer that does not have the necessary equipment. The problem expected here is that the application of barcode recording is greatly limited.

On the other hand, when the marking position information was recorded as a barcode by laser trimming on the laminated-type disk of the invention formed from two transparent substrates laminated together, it was confirmed that the protective layer 804 remained almost unchanged, as already explained in connection with FIG. 10(*a*). This was confirmed by experiment by observing the disk under an optical microscope of 800× magnification. It was also confirmed that no change had occurred to the reflective film in the trimmed portion after an environmental test of 96 hours at a temperature of 85° C. and a humidity of 95%.

In this way, when the laser trimming of the present invention is applied to a laminated disk such as a DVD, there is no need to reform the protective layer at the factory. This offers a great advantage in that a barcode can be recorded by trimming on the optical disk at a place other than the press factory, for example, at a software company or a dealer. The usefulness of barcode recording on the laminated-type optical disk was thus confirmed.

In this case, since the secret key information for encryption that the software company keeps need not be delivered to a party outside the company, security increases greatly, particularly when security information such as a serial number for copy prevention is recorded as a barcode in addition to the above-described position information. Furthermore, in the case of a DVD, since the barcode signal can be separated from DVD pit signals by setting the trimming line width at a value greater than 14T or 1.82 microns, as will be described later, the barcode signal can be recorded in the pit recording area on the DVD in superimposing fashion. The barcode formed in this way offers the effect that the barcode can be read by the optical pickup used to read the pit signal. This effect can be obtained not only with the laminated-type disk but also with the previously described single-plate disk.

Thus, by applying the barcode forming method and modulation recording method of the invention to a laminated-type disk such as a DVD, a laminated-type optical disk can be provided that permits secondary recording after shipment from the factory. The above description has dealt mainly with a case in which the barcode is formed by laser trimming on a laminated-type disk of a two-layer, single-sided structure (with two reflective layers formed on one side). This single-sided, two-layered optical disk is the type of disk that permits playback of both sides from one side of the disk without having to turn over the disk.

On the other hand, when trimming is performed on a double-sided, laminated-type optical disk that needs turning over when playing back the reverse side, the laser light passes through the two reflective films each formed on one side of the disk. Therefore, the barcode can be formed simultaneously on both sides. This provides an advantage for media fabrication in that the barcode can be recorded simultaneously on both sides in a single step.

In this case, when the optical disk is turned over to play back the reverse side on a playback apparatus, the barcode signal is played back in just the opposite direction to the direction that the barcode signal on the front side is played back. A method for identifying the reverse side is therefore needed. This will be described in detail later.

(B) Referring now to FIGS. 23 to 26, etc., we will describe the construction and operation of an optical disk barcode forming apparatus for converting the marking position information (ID number) into a barcode as a disk-unique ID and for recording the barcode in a prescribed region of a pre-pit area. A barcode recording method, etc., will also be described.

(a) First, the optical disk barcode recording apparatus will be described with reference to FIG. 23.

Figure 23:
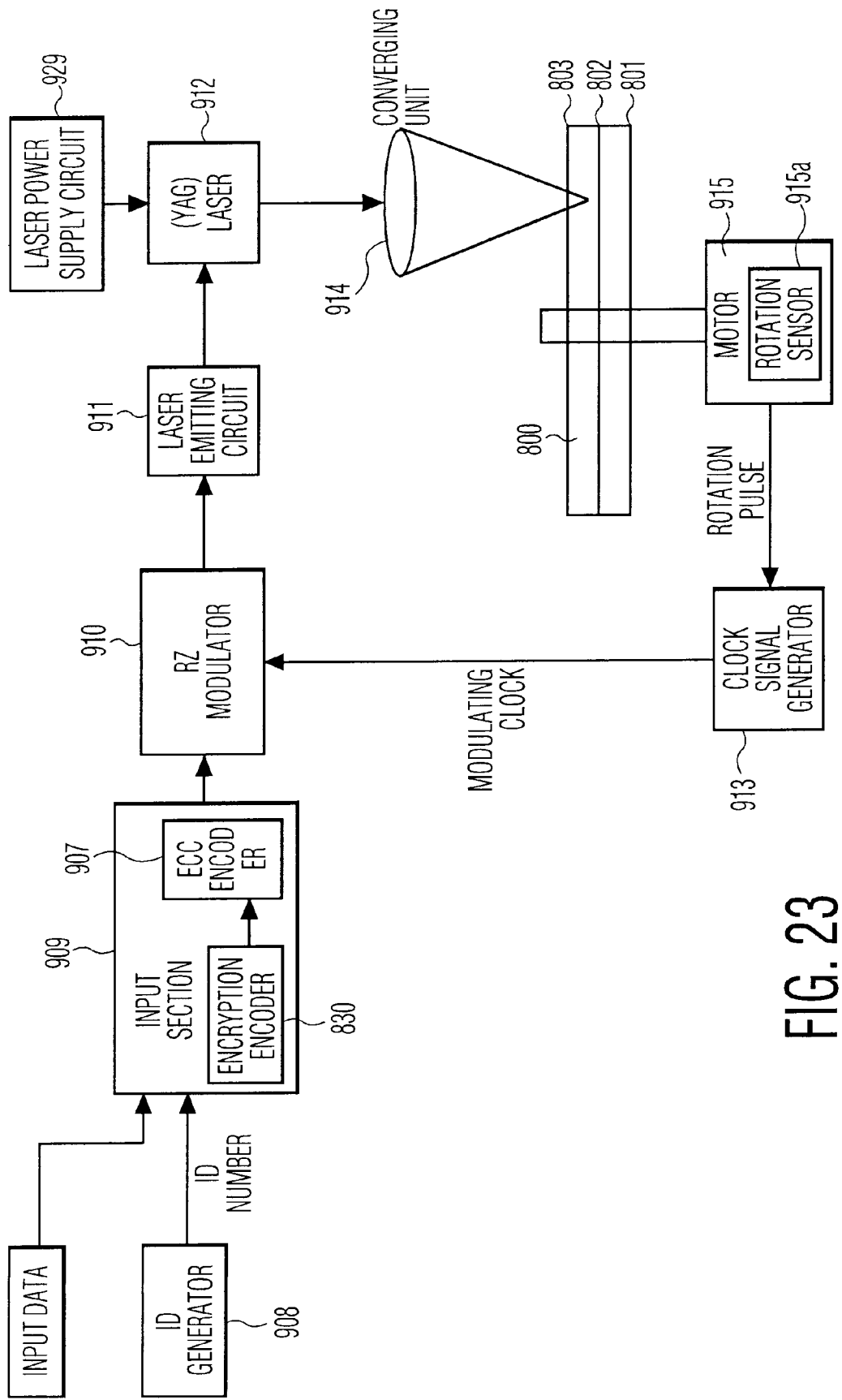
FIG. 23 is a block diagram of a stripe recording apparatus according to the embodiment.
Figure 25A:
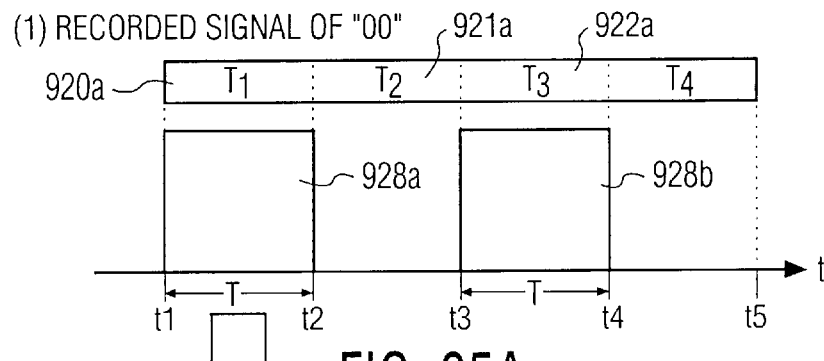
FIG. 25 is a diagram showing a signal waveform and a trimming pattern in NRZ recording.
Figure 25B:
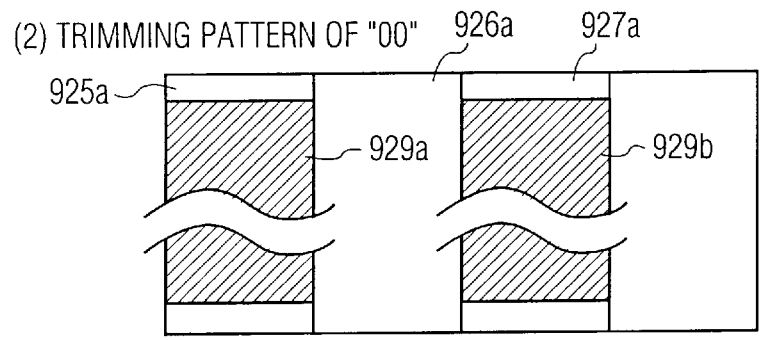
Figure 25C:
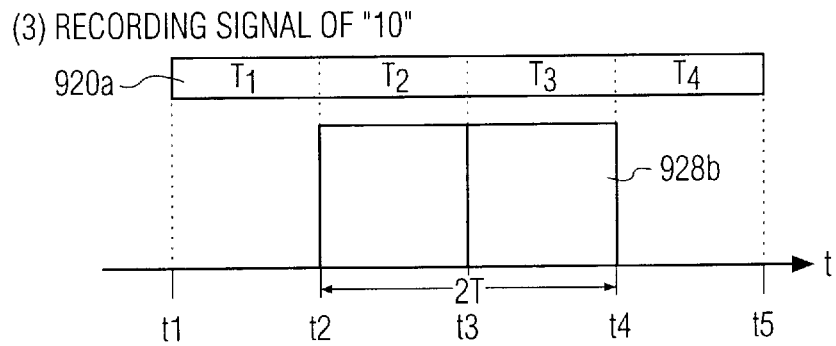
Figure 25D:
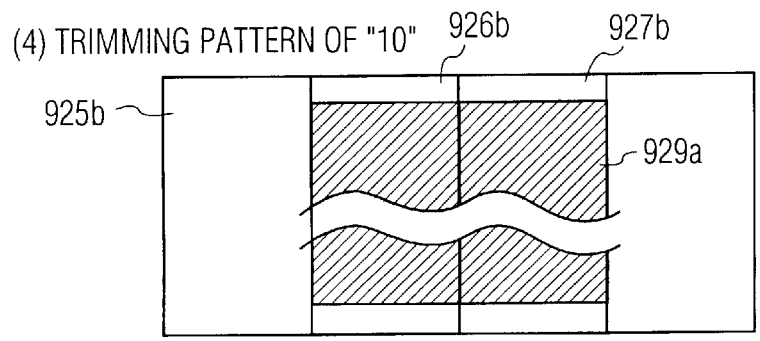
Figure 26A:
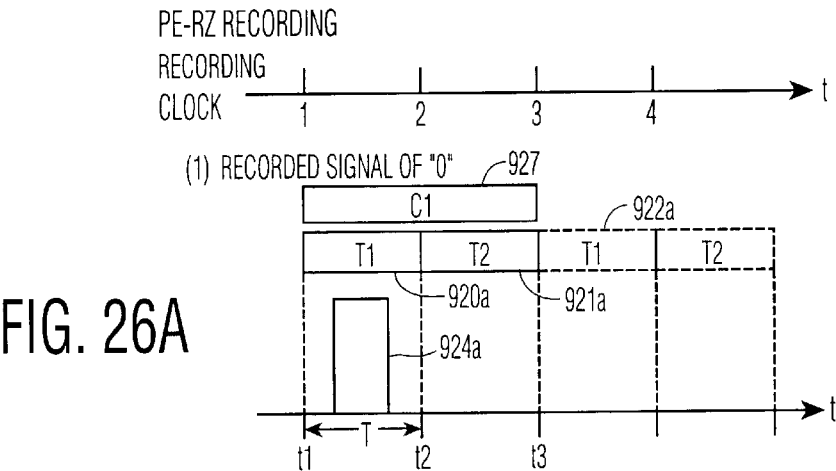
FIG. 26 is a diagram showing a signal waveform and a trimming pattern in PE-RZ recording according to the embodiment.
Figure 26B:
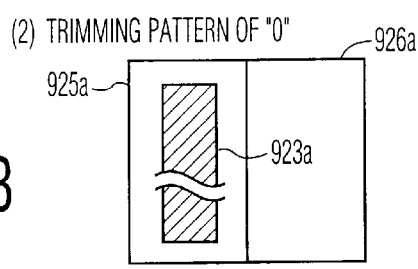
Figure 26C:
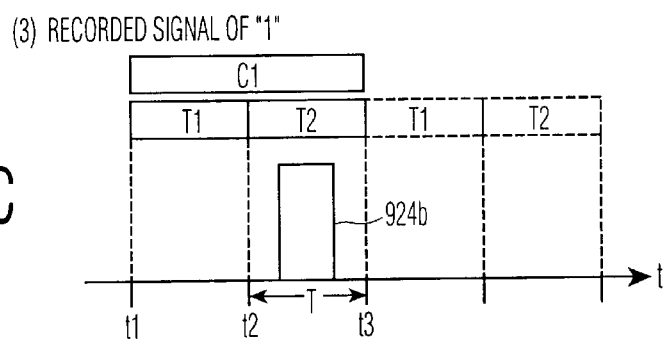
Figure 26D:
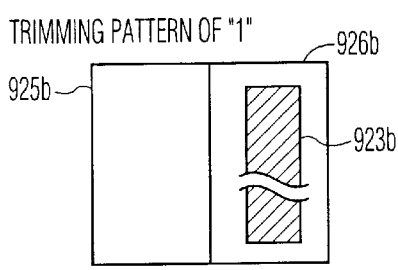
Figure 26E:
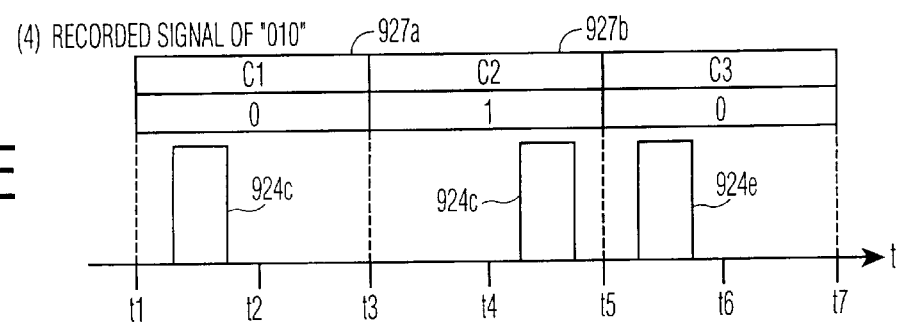

FIG. 23 is a diagram showing the configuration of the barcode recording apparatus for implementing an optical disk barcode forming method in one embodiment of the present invention. In the above mentioned embodiment, data to be barcoded is the data of encrypted version of marking position information. But the data to be barcode is not restricted to the above embodiment. It may include, for example, input data and an ID number issued from an ID generator 908, as shown in FIG. 23, or any other kind of data.

In FIG. 23, the input data and the ID number issued from the ID generator 908 are combined together in an input section 909; in an encryption encoder 830, the combined data is subjected to signature or encryption using an RSA function, etc. as necessary, and in an ECC encoder 907, error-correction coding and interleaving are applied. The encryption process and the playback process will be described in detail later by way of example with reference to FIG. 45.

The data is then fed into an RZ modulator 910 where phase-encoding (PE) RZ modulation to be described later is performed. The modulating clock used here is created by a clock signal generator 913 in synchronism with a rotation pulse from a motor 915 or a rotation sensor 915a.

Based on the RZ-modulated signal, a trigger pulse is created in a laser emitting circuit 911, and is applied to a laser 912 such as a YAG laser established by a laser power supply circuit 929. The laser 912 thus driven emits pulsed laser light which is focused through a converging unit 914 onto the reflective film 802 on the laminated disk 800, removing the reflective film in a barcode pattern. The error-correction method will be described in detail later. For encryption, a public key cipher, such as the one shown in FIG. 18, is appended as a signature to the serial number with a secret key that the software company has. In this case, since no one other than the software company has the secret key and therefore cannot append a legitimate signature to a new serial number, this has an enormous effect in preventing illegal manufacturers from issuing a serial number. Since the public key cannot be deciphered, as previously described, the security is greatly enhanced. Disk piracy can thus be prevented even when the public key is recorded on the disk for delivery.

The converging unit 914 in the optical disk barcode forming apparatus of the present embodiment will be described below in more detail.

Figure 28A:
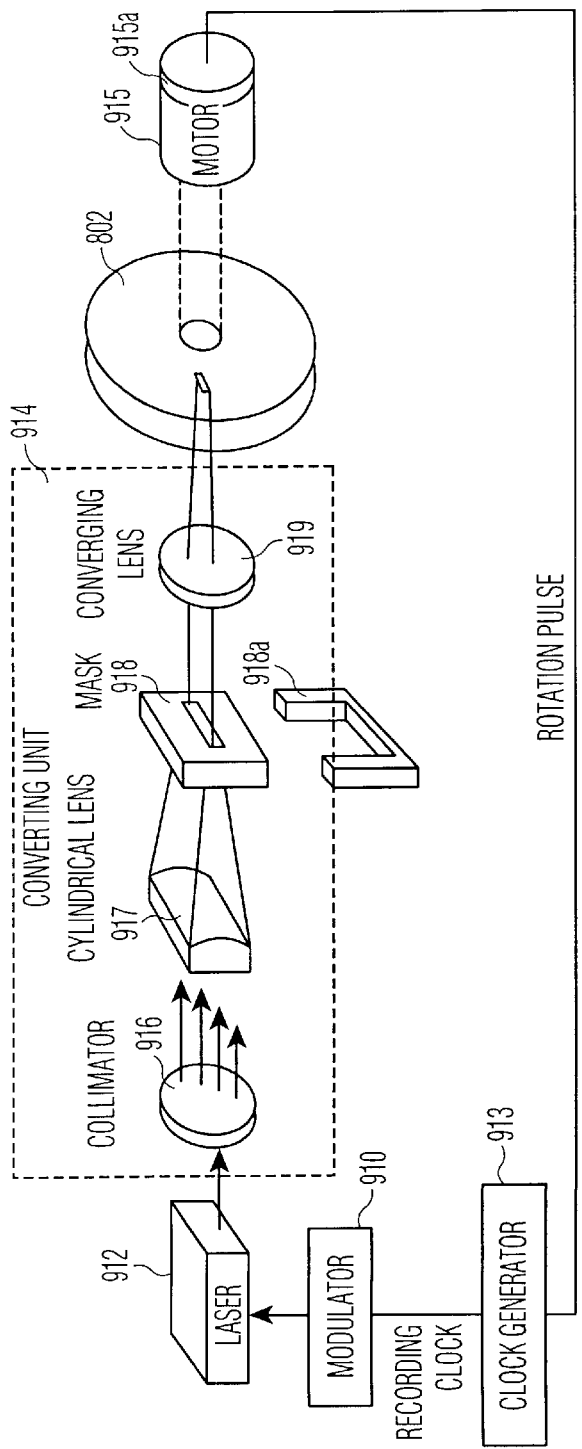
FIG. 28(a) is a perspective view of a converging unit according to the embodiment, and (b) is a diagram showing a stripe arrangement and an emitting-pulse signal.
Figure 28B:
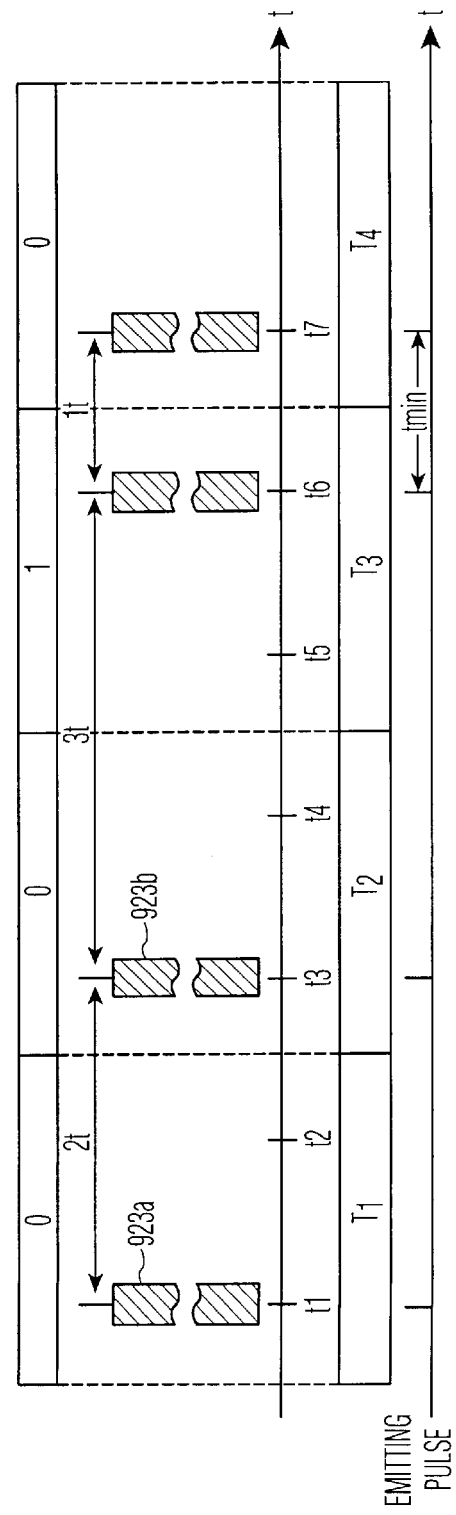

As shown in FIG. 28(a), light emitted from the laser 912 enters the converging unit 914 where the entering light is converted by a collimator 916 into a parallel beam of light which is then converged in only one plane by a cylindrical lens 917, thus producing a stripe of light. This light is limited by a mask 918, and is focused through a converging lens 919 onto the reflective film 802 on the optical disk to remove the film in a stripe pattern. A stripe such as shown in FIG. 28(b) is thus formed. In PE modulation, stripes are spaced apart at three different intervals, 1T, 2T, and 3T. If this spacing is displaced, jitter occurs and the error rate rises. In the present invention, the clock generator 913 generates a modulating clock in synchronism with a rotation pulse from the motor 915, and supplies this modulating clock to the modulator 910 to ensure that each stripe 923 is recorded at a correct position in accordance with the rotation of the motor 915, that is, with the rotation of the disk 800. This has the effect of reducing jitter. Alternatively, a laser scanning means 950, such as shown in FIG. 3(1), may be provided by which a continuous-wave laser is scanned in a radial direction to form a barcode.

(b) Next, a barcode recording method, etc., for forming a barcode using the above-described barcode recording apparatus, will be described with reference to FIG. 24 to 26.

FIG. 24 shows signals coded with RZ recording (polarity return-to-zero recording) of the invention and trimming patterns formed corresponding to them. FIG. 25 shows signals coded with a conventional barcode format and trimming patterns formed corresponding to them.

The present invention uses RZ recording, as shown in FIG. 24. In this RZ recording, one unit time is divided into a plurality of time slots, for example, a first time slot 920a, a second time slot 921, a third time slot 922, and so on. When data is "00", for example, a signal 924a of a duration shorter than the period of the time slot, that is, the period T of a channel clock, is recorded in the first time slot 920a, as shown in part (1) in FIG. 26. The pulse 924a whose duration is shorter than the period T of the recording clock is output between t=T1 and t=T2. In this case, using a rotation pulse from the rotation sensor 915a on the motor 915, the clock signal generator 913 generates a modulation clock pulse as shown in part (1) of FIG. 24; by performing the recording in synchronism with the clock pulse, the effects of rotational variation of the motor can be eliminated. In this way, as shown in part (2) of FIG. 24, a stripe 923a indicating "00" is recorded on the disk within a recording region 925a, the first of the four recording regions shown, and a circular barcode such as shown in part (1) of FIG. 27 is formed.

Next, when data is "01", a pulse 924b is recorded in the second time slot 921b between t=T2 and t=T3, as shown in part (3) in FIG. 24. In this way, a stripe 923b is recorded on the disk within a recording region 926b, the second region from the left, as shown in part (4) of FIG. 24.

Next, when recording data "10" and "11", these data are recorded in the third time slot 922a and fourth time slot, respectively.

Here, for comparison purposes, NRZ recording (nonreturn-to-zero recording) used for conventional barcode recording will be described with reference to FIG. 25.

In NZR recording, pulses 928a and 928b, each having a width equal to the period T of time slot 920a, are output, as shown in part (1) of FIG. 25. In RZ recording, the width of each pulse is 1/nT; on the other hand, in the case of NZR recording, a pulse as wide as T is needed, and furthermore, when T appears successively, a pulse of double or triple width, 2T or 3T, becomes necessary, as shown in part (3) of FIG. 25. In the case of laser trimming such as described in the present invention, changing the laser trimming width is practically difficult since it necessitates changing settings, and therefore, NRZ is not suitable. As shown in part (2) of FIG. 25, stripes 929a and 929b are respectively formed in the first and third recording regions 925a and 927a from the left, and in the case of data "10", a stripe 929b of width 2T is recorded in the second and third recording regions 929b and 927b from the left, as shown in part (4) of FIG. 25.

In the conventional NRZ recording, the pulse widths are 1T and 2T, as shown in parts (1) and (3) of FIG. 25; it is therefore apparent that NRZ recording is not suitable for the laser trimming of the present invention. According to the laser trimming of the present invention, a barcode is formed as shown in the experiment result shown in FIG. 8(a), but since trimming line width differs from disk to disk, it is difficult to precisely control the line width; when trimming the reflective film on a disk, the trimming line width varies depending on variations in laser output, thickness and material of the reflective film, and thermal conductivity and thickness of the substrate. Further, forming slots of different line widths on the same disk will result in an increased complexity of the recording apparatus. For example, in the case of the NZR recording used for product barcode recording, as shown in parts (1) and (2) of FIG. 25, the trimming line width must be made to precisely coincide with the period 1T of the clock signal, or 2T or 3T, that is, with nT. It is particularly difficult to record various line widths such as 2T and 3T by varying the line width for each bar (each stripe). Since the conventional product barcode format is an NRZ format, if this format is applied to the laser-recorded barcode of the present invention, the fabrication yield will decrease because it is difficult to precisely record varying line widths such as 2T and 2T on the same disk; furthermore, stable recording cannot be done since the laser trimming width varies. This makes demodulation difficult. Using RZ recording, the present invention has the effect of achieving stable digital recording even if the laser trimming width varies. Further, the invention offers the effect of simplifying the construction of the recording apparatus since RZ recording requires only one kind of line width and the laser power therefore need not be modulated.

As described, by employing the above RZ recording for optical disk barcode recording according to the invention, there is offered the effect of ensuring stable digital recording.

An example of the phase-encoding (PE) modulation of RZ recording will be described with reference to FIG. 26.

FIG. 26 shows signals and an arrangement of stripes when the RZ recording shown in FIG. 24 is PE-modulated. As shown, data "0" is recorded in the left-hand time slot 920a of the two time slots 920a and 921a; on the other hand, data "1" is recorded in the right-hand time slot 921a, as shown in part (3) of FIG. 26. On the disk, data "00" is recorded as a stripe 923a in the left-hand recording region 925a and data "1" as a stripe 923b in the right-hand recording region 926b, as shown in parts (2) and (4) of FIG. 26, respectively. Thus, for data "010", a pulse 924c is output in the left-hand time slot for "0", a pulse 924d is output in the right-hand time slot for "1", and a pulse 924e is output in the left-hand time slot for "0", as shown in part (5) of FIG. 26; on the disk, the first stripe is formed in the left-hand position, the second stripe in the right-hand position, and the third stripe in the left-hand position, by laser trimming. FIG. 26(5) shows signals modulated with data "010". As can be seen, a signal is always available for every channel bit. That is, since the signal density is constant, the DC component does not vary. Since the DC component does not vary, PE modulation is resistant to variation in low-frequency components even if a pulse edge is detected during playback. This has the effect of simplifying playback demodulator circuitry of the disk playback apparatus. Furthermore, since one signal 923 is always available for every channel clock 2T, this has the effect of being able to reproduce a synchronization clock for a channel clock without using a PLL.

Figure 35A:
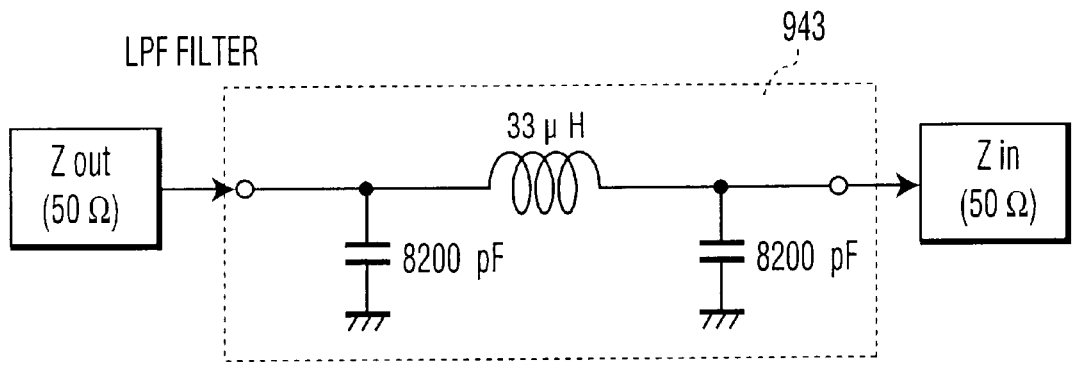
FIG. 35(a) is a diagram showing the configuration of an LPF, and (b) is a diagram showing a waveform filtered through the LPF.

A circular barcode, such as shown in FIG. 27(1), is thus formed on the disk. When data "01000", shown in part FIG. 27(4), is recorded, in the PE-RZ modulation of the invention a barcode 923a having the same pattern as the recorded signal shown in part (3) is recorded as shown in part (2). When this barcode is played back by an optical pickup, a signal waveform, such as shown in part (5) REPRODUCED SIGNAL, is output with portions thereof dropped corresponding to missing portions of a pit-modulated signal where no reflection signals are obtained due to removal of the reflective film, as explained with reference to part FIG. 5(6). By passing this reproduced signal through the second-order or third-order LPF filter 934 shown in FIG. 35(a), the filtered signal waveform shown in FIG. 27(6) is obtained. By slicing this signal by a level slicer, reproduced data "01000" of part (7) is demodulated.

(C) We will next describe features of the optical disk format with a barcode formed in the above manner, tracking control methods, and rotational speed control methods that can be used when playing back the optical disk.

Figure 40:
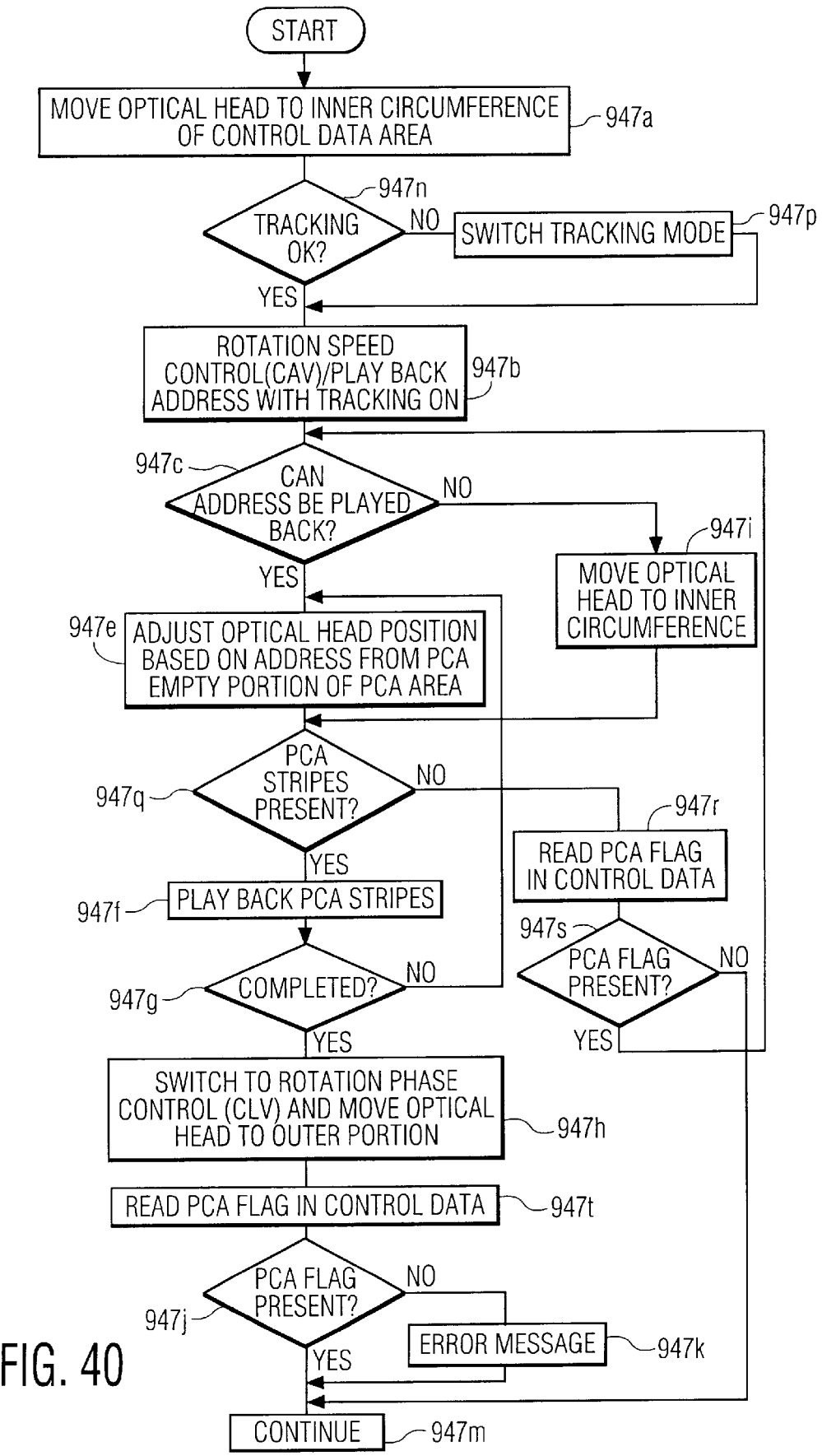
FIG. 40 is a diagram showing a procedure for playing back a PCA area in a tracking ON condition according to the embodiment.

(a) We will first describe the features of the optical disk format with a barcode formed according to the present embodiment, while dealing with an example of a condition that permits tracking control during playback (this condition is also referred to as the tracking ON condition). A playback operation using tracking control is shown in FIG. 40, and its details will be given later.

In the case of a DVD disk in the present embodiment, all data are recorded in pits with CLV, as shown in FIG. 30. Stripes 923 (forming a barcode) are recorded with CAV. CLV recording means recording with constant linear velocity, while CAV recording means recording with constant angular velocity.

Figure 32:
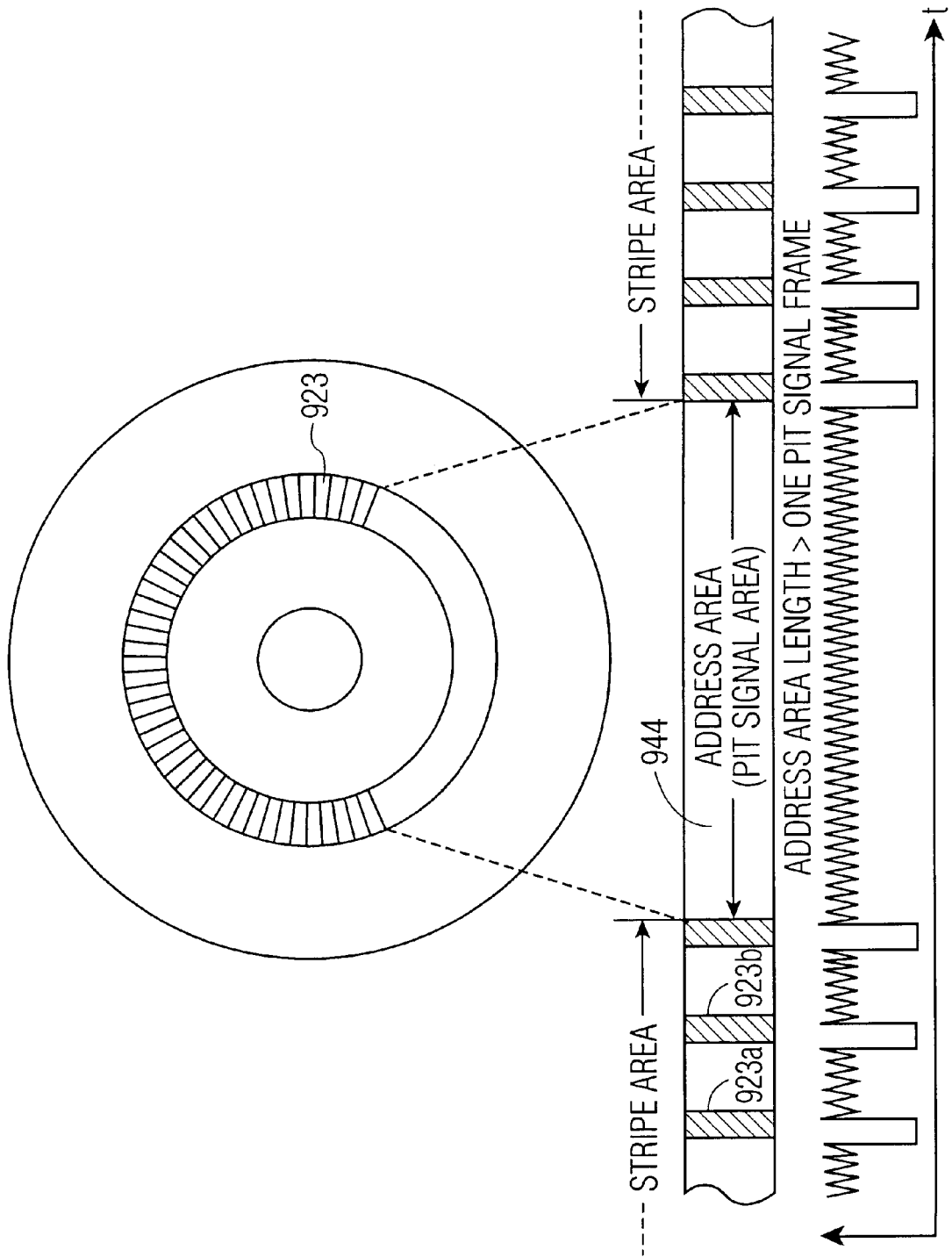
FIG. 32 is a diagram showing a stripe area and an address area on a disk according to the embodiment.

In the present invention, the stripes 923 are recorded with CAV, superimposed on a pre-pit signal in a lead-in data area holding an address which is recorded with CLV. That is, the data is overwritten with the stripes. In the present invention, the pre-pit signal area maps into all the data areas where pits are formed. The prescribed region of the pre-pit signal area, as mentioned in the present invention, corresponds to an inner portion of the optical disk; this region is also called a post-cutting area (PCA). In this PCA area, the barcode is recorded with CAV, superimposed on pre-bit signals. In this way, the CLV data is recorded with a pit pattern from the master disk, while the CAV data is recorded with laser-removed portions of the reflective film. Since the barcode data is written in overwriting fashion, pits are recorded between the barcode stripes 1T, 2T, and 3T. Using this pit information, optical head tracking is accomplished, and Tmax or Tmin of the pit information can be detected;

therefore, motor rotational speed is controlled by detecting this signal. To detect Tmin, the relation between the trimming width t of stripe 923a and the pit clock T (pit) should be t>14T (pit), as shown in FIG. 30, to achieve the above effect. If t is shorter than 14T, the pulse width of the signal from the stripe 923a becomes equal to the pulse width of the pit signal, and discrimination between them is not possible, so that the signal from the stripe 923a cannot be demodulated. To enable pit address information to be read at the same radius position as the stripes, an address area 944 is provided longer than a unit of one address of pit information, as shown in FIG. 32; address information can thus be obtained, making it possible to jump to the desired track. Furthermore, the ratio of the stripe area to the non-stripe area, that is, the duty ratio, is made less than 50%, i.e., T(S)<T(NS); since the effective reflectivity decreases only by 6 dB, this has the effect of ensuring stable focusing of the optical head.

Next, we will describe an example of a condition in which tracking control cannot be applied during playback (this condition is also referred to as the tracking OFF condition).

Since the stripes 923 are written over pits, interrupting pit signals and preventing correct playback of the pit data, tracking control may not be possible on some players. In such players, the strips 923, which are CAV data, can be read by the optical pickup by applying rotational control using a rotational pulse from a Hall element, etc. in the motor 17.

Figure 31:
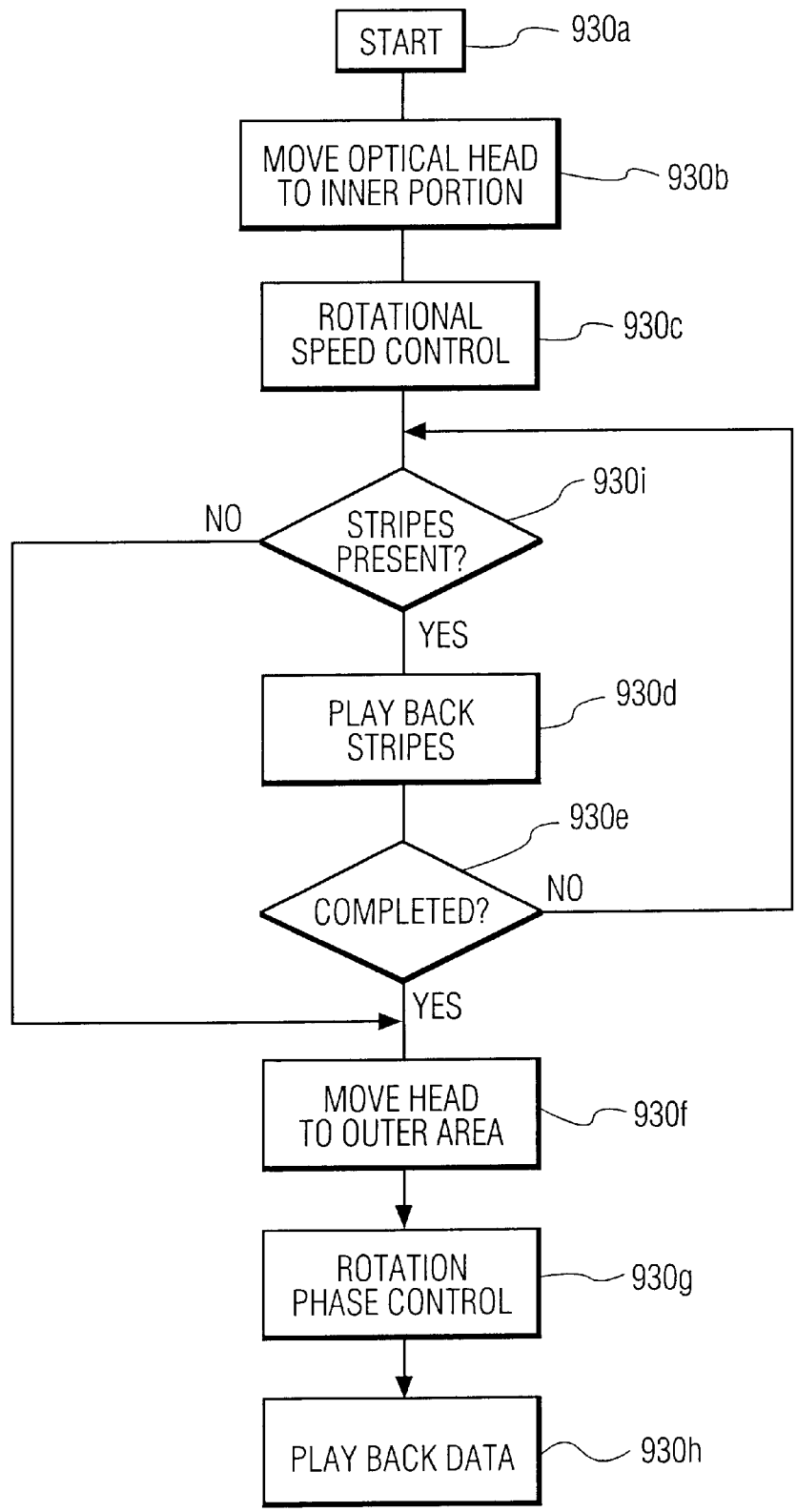
FIG. 31 is a flowchart illustrating how control mode is switched between CAV and CLV when playing back stripes according to the embodiment.

FIG. 31 shows a flowchart illustrating a procedure for operations in a playback apparatus when pit data in the optical tracks in the stripe area cannot be correctly played back.

In FIG. 31, when a disk is inserted in step 930a, the optical head is moved by a prescribed distance to the inner portion in step 930b. The optical head is thus positioned on the area where the stripes 923 of FIG. 30 are recorded.

Here, it is not possible to correctly playback data from all the pits recorded in the stripe area 923. In this case, therefore, usual rotation phase control cannot be applied for the playback of the pit data recorded with CLV.

In step 930c, rotational speed control is applied by using a rotational sensor of a Hall element in the motor or by measuring the T(max) or T(min) or frequency of a pit signal. If it is determined in step 930i that there are no stripes, the process jumps to step 930f. If there are stripes, the barcode is played back in step 930d, and when playback of the barcode is completed in step 930e, the optical head is moved in step 930f to an outer area where no stripes are recorded. In this area, since no stripes are recorded, the pits are played back correctly and accurate focus and tracking servo are achieved. Since the pit signal can be played back, usual rotation phase control can be performed to rotate the disk with CLV. As a result, in step 930h, the pit signal is played back correctly.

By switching between the two rotation control modes, i.e., the rotational speed control and the rotation phase control by pit signals, the effect is obtained that two different kinds of data, barcode stripe data and pit-recorded data, can be played back. Since the stripes are recorded in the innermost area, switching means measures the radius position of the optical head from the optical head stopper or from the address of a pit signal, and based on the result of the measurement, correctly performs switching between the two rotation control modes.

Figure 41:
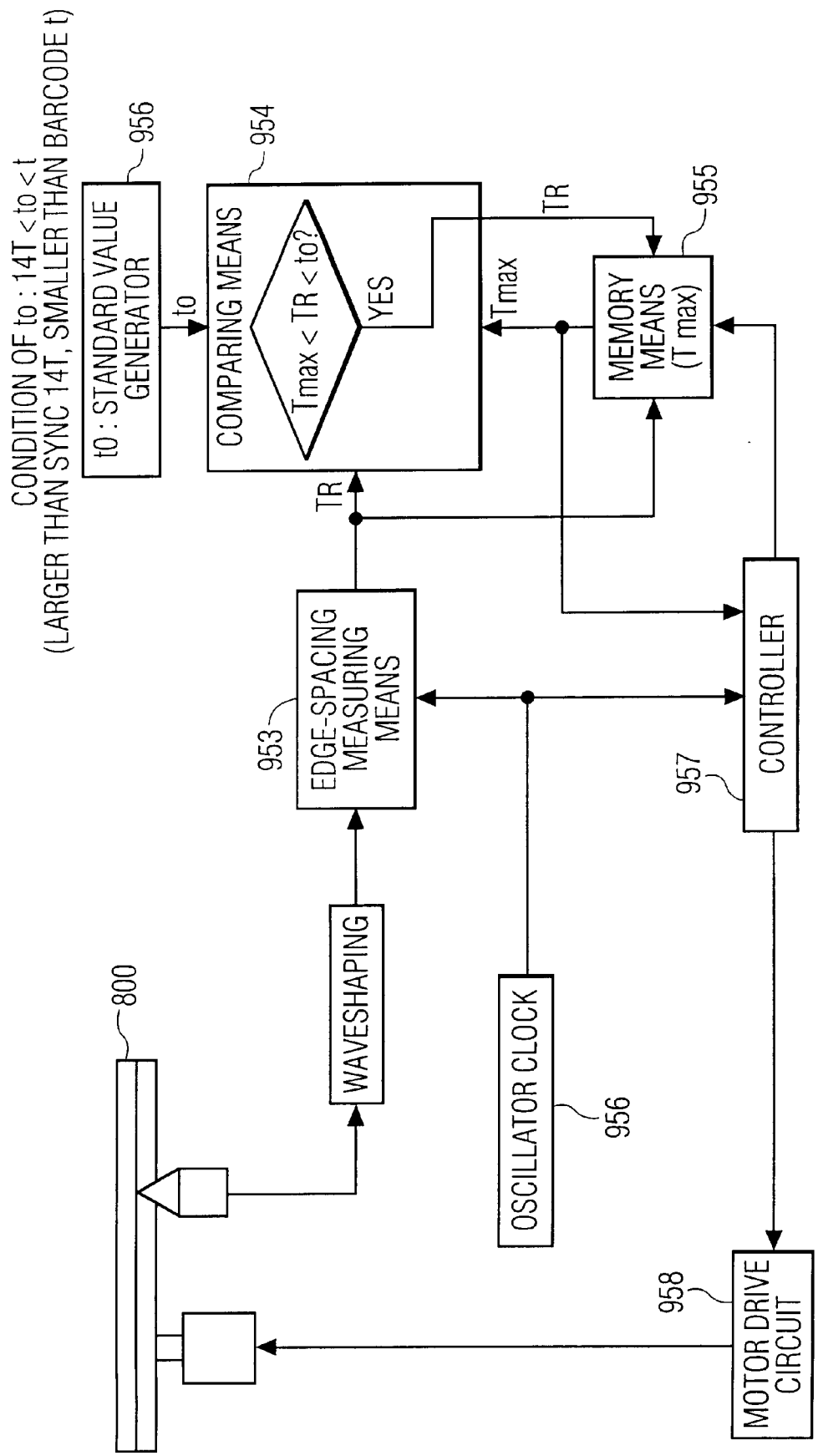
FIG. 41 is a block diagram of a playback apparatus implementing rotational speed control according to the embodiment.
Figure 42:
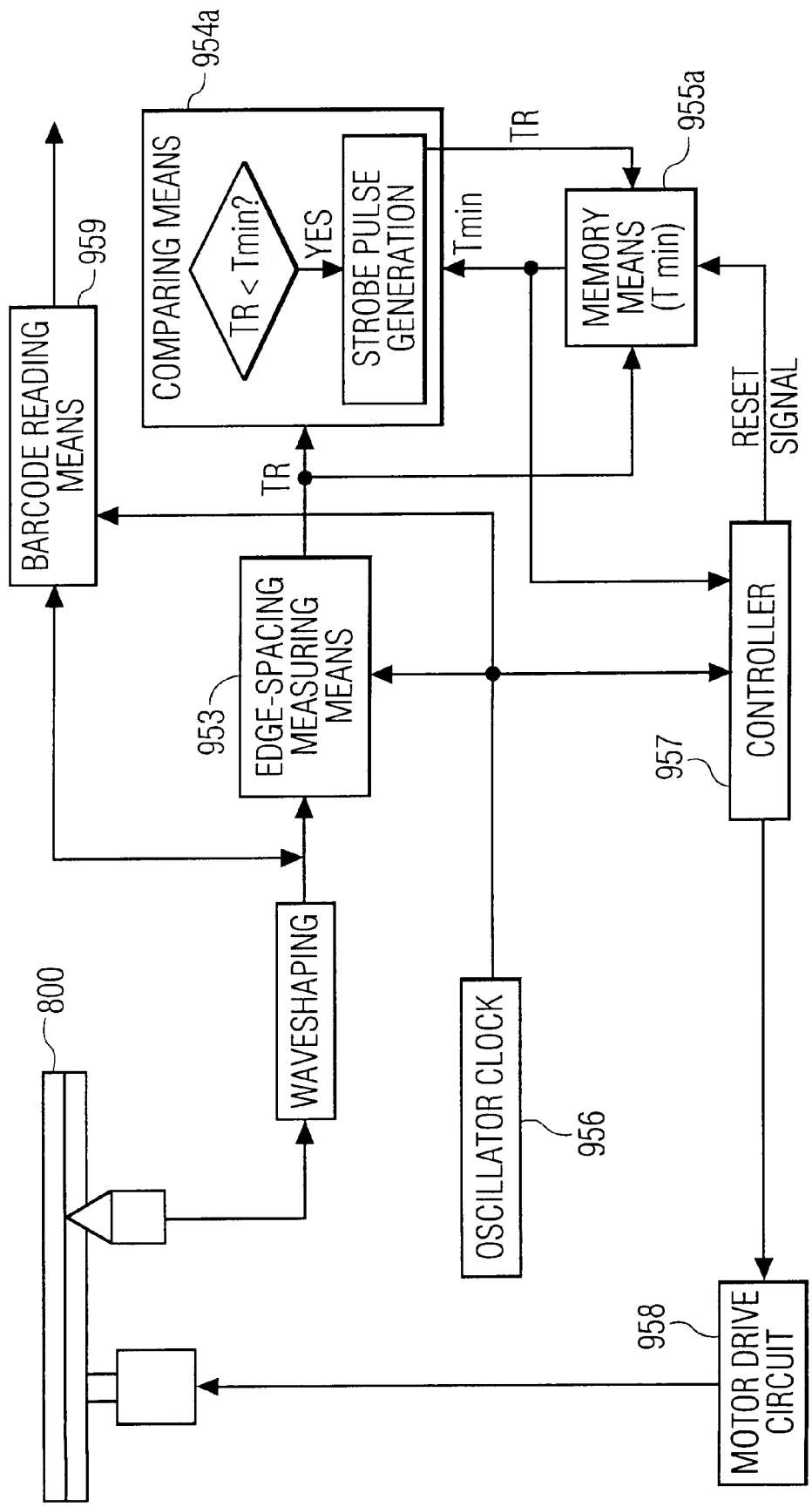
FIG. 42 is a block diagram of a playback apparatus implementing rotational speed control according to the embodiment.

(b) Referring next to FIGS. 41 and 42, we will describe two control methods for controlling the rotational speed when playing back the barcode according to the present embodiment.

FIG. 41 shows the first rotational speed control method wherein rotational speed control is applied by detecting Tmax of a bit signal (Tmax means measuring time for a pit having the largest pit length of various pit lengths).

A signal from the optical head is first subjected to waveshaping, and then the pulse spacing of the pit signal is measured by an edge-spacing measuring means 953. A t0 reference value generating means 956 generates reference value information t0 whose pulse width is larger than the pulse width 14T of the sync signal but smaller than the pulse width t of the barcode signal. This reference value information t0 and the pulse width TR of the reproduced signal are compared in a comparing means 954; only when TR is smaller than the reference value t0 and larger than Tmax held in a memory means 955, TR is supplied to the memory means 955 where TR is set as Tmax. By reference to this Tmax, a controller 957 controls a motor drive circuit 958, achieving motor rotational speed control based on Tmax. In the case of the present invention, numerous pulses at cycles of 3 to 10 µs are generated by barcode stripes, as shown in FIG. 9(a). In the case of a DVD, the sync pulse width is 14T, that is, 1.82 µm. On the other hand, the barcode stripe width is 15 µm. In Tmax-based control, the barcode pulse longer than the pulse width 14T of the synch pulse will be erroneously judged and detected as Tmax. Therefore, by removing barcode signals larger than the reference value to by comparison with the reference value t0, as shown in FIG. 41, it becomes possible to perform rotational speed control for normal rotational speed during the playback of the barcode stripe area.

Next, the second rotational speed control method will be described with reference to FIG. 42. This method performs rotational speed control by detecting Tmin (Tmin means measuring time for a pit having the smallest pit length of various pit lengths).

In the Tmin-based control shown in FIG. 42, the pulse information TR from the edge-spacing detecting means 953 is compared in a comparing means 954a with Tmin held in a memory means 955a; if TR<Tmin, a strobe pulse occurs and the Tmin in the memory is replaced by TR.

In this case, the barcode pulse width t is 3 to 10 µm, as noted above, while Tmin is 0.5 to 0.8 µm. As a result, if the barcode area is played back, the condition TR<Tmin is not satisfied since the barcode pulse width t is always greater than Tmin. That is, there is no possibility of erroneously judging a barcode pulse as Twin. Therefore, when the Tmin-based rotational speed control is combined with a barcode reading means 959, the effect is that rotational speed control based on Tmin can be applied more stably while playing back the barcode, compared to the Tmax-based method. Further, an oscillator clock 956 creates a reference clock for demodulation in the barcode reading means 959, while detecting the edge spacing; this has the effect of being able to demodulate the barcode in synchronism with rotation.

(D) Next, a series of optical disk reproduction operations (playback operations) using the above control methods, etc. will be described.

Figure 43:
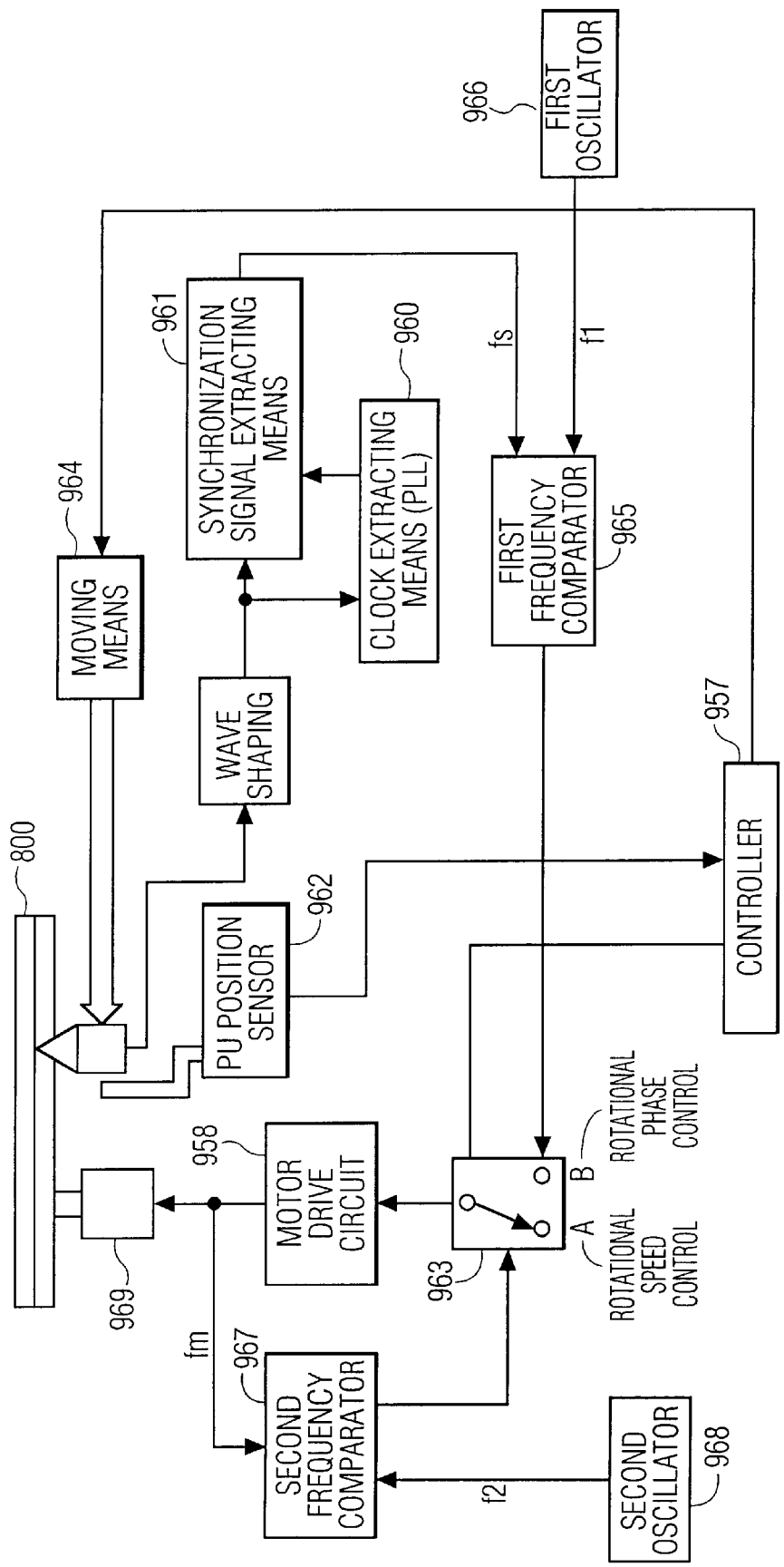
FIG. 43 is a block diagram of a playback apparatus implementing rotational speed control according to the embodiment.

Referring first to FIGS. 31 and 43, a first playback method will be described in conjunction with a method for switching between rotation phase control mode and rotational speed control mode by a mode switch 963. Then, a second and a third playback method for playing back the optical disk of the present embodiment will be described with reference to FIGS. 38, 40, etc. The first and second playback methods hereinafter described are each concerned with a case where tracking control cannot be performed, while the third playback method is concerned with a case where tracking control can be performed.

At the same time that the optical head is moved to the inner portion of the disk in steps 930*b* and 930*c* in FIG. 31, the mode switch 963 shown in FIG. 43 is switched to A. Alternatively, the mode switch 963 may be switched to A when it is detected by a pickup (PU) position sensor 962, etc. that the optical head being moved by a moving means 964 has reached the inner portion of the disk.

Next, an operation when the rotational speed control mode (step 930*c* in FIG. 31) is entered will be described with reference to FIG. 43.

A motor rotation frequency, fm, from a motor 969 and a frequency, f2, of a second oscillator 968 are compared in a second frequency comparator 967, and a difference signal is fed to the motor drive circuit 958 to control the motor 969, thus achieving rotational speed control. In this case, since the disk is rotating with CAV, the barcode stripe can be played back.

When the barcode playback is completed in step 930*e* in FIG. 31, the head is moved to an outer area by the moving means 964, and at the same time, by a signal from the PU position sensor 962, etc., the mode switch 963 is switched to B for rotation phase control mode.

In the rotation phase control mode, PLL control is applied to the pit signal from the optical head by a clock extracting means 960. The frequency f1 of a first oscillator 966 and the frequency fS of a reproduced synchronization signal are compared in a first frequency comparator 965, and a difference signal is fed to the motor drive circuit 958. The rotation phase control mode is thus entered. Because of PLL phase control by the pit signal, data synchronized to the synchronization signal of f1 is played back. If the optical head were moved to the barcode stripe area by rotation phase control, without switching between rotational phase control for the motor and rotational speed control for the motor, phase control could not be performed because of the presence of the stripes, and trouble would occur, such as, the motor running out of control or stopping, an error condition occurring, etc. Therefore, as shown in FIG. 43, switching to the appropriate control mode not only ensures stable playback of the barcode but has the effect of avoiding troubles relating to motor rotation.

The second method for playing back the optical disk of the present embodiment will be described with reference to FIG. 38 which shows a flowchart illustrating the operation.

The second playback method is an improved version of the first playback method.

More specifically, the first playback method is a method for playing back an optical disk on which a stripe presence/absence identifier 937 is not defined. Since tracking is not applied in the stripe area on an optical disk of this type, it takes time to distinguish between a stripe pattern legally formed on the disk and an irregular pattern caused by scratches on the disk surface. Therefore, regardless of whether the stripes are recorded or not, the playback procedure has to perform a stripe reading operation first, to check the presence or absence of stripes or whether the stripes are recorded in the inner portion of the optical disk. This may cause a problem in that an extra time is required before the data can be actually played back. The second playback method improves on this point.

Figure 38:
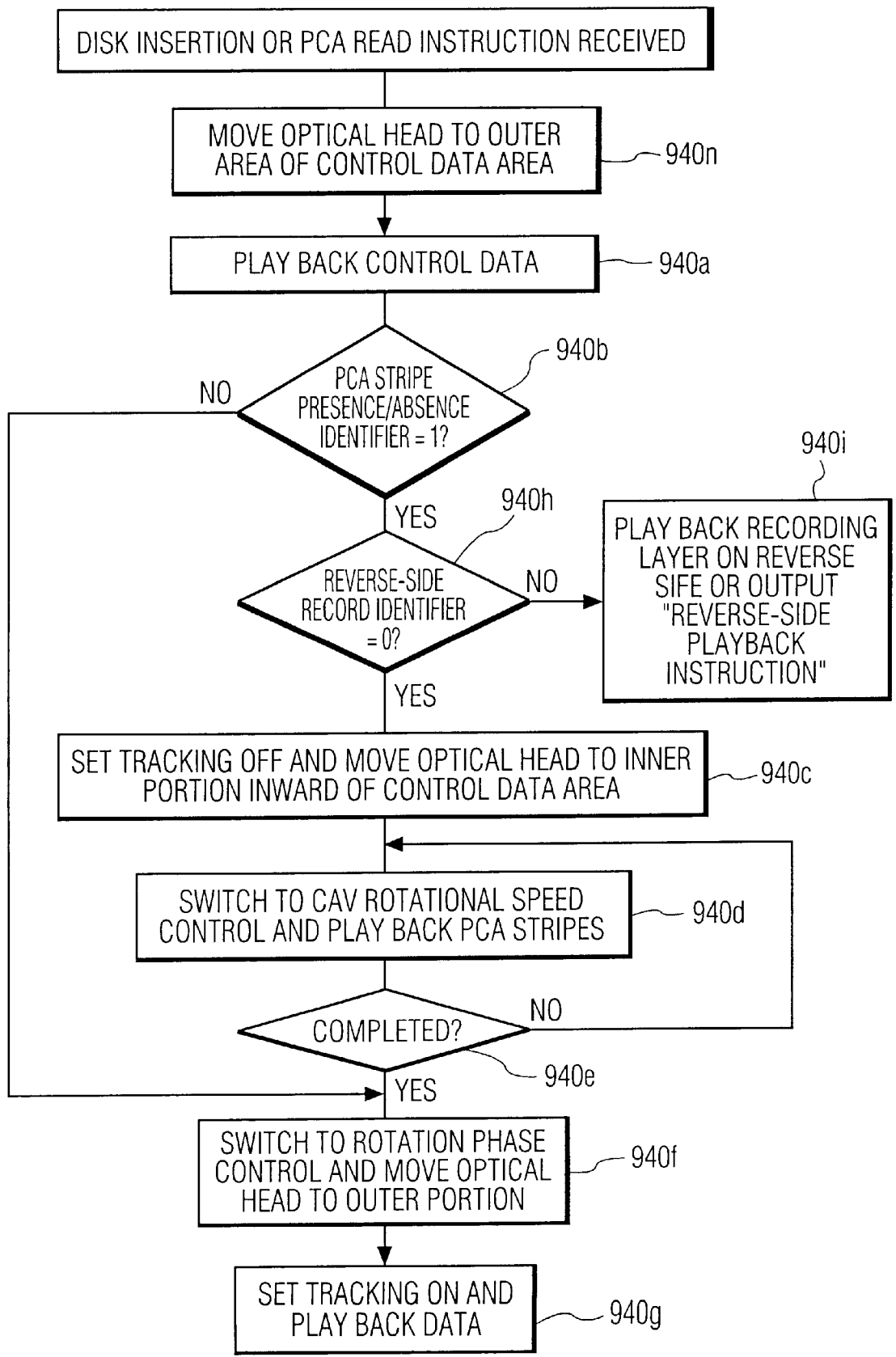
FIG. 38 is a diagram showing a procedure for reading control data for playback according to the embodiment.

First, as shown in FIG. 38, when an optical disk is inserted, control data is played back in step 940*a*. Usually, physical feature information and attribute information of the optical disk are recorded as control data in a control data area. The physical feature information includes, for example, information indicating that the optical disk is a laminated-type disk of a two-layer, single-sided structure.

In the present invention, as shown in FIG. 30, the control data recorded in the control data area 936 of the optical disk contains a PCA stripe presence/absence identifier 937 recorded as a pit signal. Therefore, the optical head is first moved, in step 940*n*, to an outer area where the control data is recorded. And then the optical head moves inwardly jumping across a plurality of tracks until reaching the control data area 436. And then in step 940*a*, the control data is played back. It can thus be checked whether the stripes are recorded or not. If, in step 940*b*, the stripe presence/absence identifier is 0, the process proceeds to step 940*f* to initiate rotation phase control for normal playback with CLV. On the other hand, if, in step 940*b*, the presence/absence identifier 937 is 1, then the process proceeds to step 940*h* to check the presence or absence of a reverse-side record identifier 948 which indicates that the stripes are recorded on the side opposite from the side being played back, that is, on the reverse side. If the stripes are recorded on the reverse side, the process proceeds to step 940*i* to play back the recording surface on the reverse side of the optical disk. If the reverse side cannot be automatically played back, an indication is output for display, to urge the user to turn over the disk. If it is determined in step 940*h* that the stripes are recorded on the side being played back, the process proceeds to step 940*c*, where the head is moved to the stripe area 923 in the inner portion of the disk, and in step 940*d*, the control mode is switched to rotational speed control to play back the stripes 923 with CAV rotation. If the playback is completed in step 940*e*, then in step 940*f* the control mode is switched back to rotation phase control for CLV playback and the optical head is moved to the outer portion of the disk to play back pit signal data.

Since the stripe presence/absence identifier 937 is recorded in the pit area holding the control data, etc., as described above, the second method has the effect of being able to play back the stripes more reliably and more quickly compared to the first playback method described with reference to FIG. 31.

Then the PCA area is with tracking OFF, level of the noise signal which is generated by the pits drops. PCA signal level remains unchanged if tracking is set OFF. Therefore, in the filtered waveform shown in FIG. 35(*b*), the pit signal drops, making it easier to distinguish between the PCA signal and the pit signal. This has the effect of simplifying the circuitry and reducing the error rate.

Furthermore, the provision of the stripe reverse-side record identifier 948 makes it possible to identify that the stripes are recorded on the reverse side of the disk; the effect is that the barcode stripes can be played back reliably in the case of a double-sided DVD optical disk. According to the present invention, since the stripes are recorded penetrating through the reflective films on both sides of a disk, the stripe pattern can also be read from the reverse side of the disk. The stripes can be played back from the reverse side of the disk by checking the stripe reverse-side identifier 948 and by playing back the code in the reverse direction when reading the stripes. The present invention uses a bit string "010010110" as the synchronization code, as shown in FIG. 34(*a*). When played back from the reverse side, the synchronization code is played back as "01100010", from which it can be detected that the barcode is being played back from the reverse side. In this case, by demodulating the code in reverse direction in the demodulator 942 in the playback apparatus of FIG. 15, the barcode recorded in penetrating fashion can be correctly played back even if played back from the reverse side of a double-sided disk. The playback apparatus of FIG. 15 will be described in more detail later.

Further, if, as shown in FIG. 30, a 300 µm wide guard-band area 999, where only address information is recorded but no other data is recorded, is provided between the PCA area 998 and the control data area 936, access to the control data can be made more stable.

The guard-band area 999 will be described in more detail below.

When the optical head accesses the control data from the outer portion of the disk, the optical head moves inwardly jumping across a plurality of tracks until reaching the control data area 936. In some cases, the optical head may be moved past the destination control data area 936, landing at a portion further inward of the control data area. At this time, if the PCA area 998 exists directly adjacent to the inner circumference of the control data area, the optical head will lose its own position since an address cannot be played back in the PCA area 998. It, then, becomes impossible to control the optical head.

Accordingly, when the guard-band area with a width, for example, 300 µm, greater than one jump width of the optical head, is provided in the above-noted portion, if the optical head is moved past the control data area 936 the optical head will always land within the guard-band area. Then, by reading an address in the guard-band area, the optical head knows its own position and can thus be repositioned on the destination control data area. In this way, the optical head can be controlled more reliably and more quickly.

Further, as shown in FIG. 30, the control data also contains an additional stripe data presence/absence identifier and a stripe recording capacity. That is, after recording first stripes on an optical disk, additional stripes can be recorded in an empty, unrecorded portion of the area. The first recorded stripes will be referred to as the first set of stripes, and the additionally recorded stripes as the second set of stripes. With this configuration, when the first set of stripes 923 is already recorded by trimming, as shown in FIG. 30, the capacity of the available space for trimming the second set of stripes 938 can be calculated. Accordingly, when the recording apparatus of FIG. 23 performs trimming to record the second set of stripes, the control data provides an indication of how much space is available for additional recording; this prevents the possibility of destroying the first set of stripes by recording more than 360° over the area. Furthermore, as shown in FIG. 30, a gap 949 longer than one pit-signal frame length is provided between the first set of stripes 923 and the second set of stripes 938; this serves to prevent the previously recorded trimming data from being destroyed.

Moreover, as shown in FIG. 34(b) to be described later, a trimming count identifier 947 is recorded in a synchronization code area. This identifier is used to distinguish between the first set of stripes and the second set of stripes. Without this identifier, discrimination between the first set of stripes 923 and the second set of stripes 938 in FIG. 30 would become impossible.

Finally, the third playback method will be described with reference to FIG. 40.

When the duty ratio of the stripe on the optical disk, that is, its area ratio, is low, almost correct tracking can be maintained in the stripe area, as shown in FIG. 32. Therefore, the address information in the address area 944 at the same radius position of the disk can be played back. This has the effect of quickening the disk rise time after disk insertion since the address can be played back while playing back the stripes without changing the optical head position.

In this case, the address area, an area where no stripes are recorded, should be formed continuously along a length longer than one frame in the same radium portion of the disk.

The operation steps for this method will be described with reference to FIG. 40.

When a disk is inserted, the optical head is moved to the inner circumferential portion in step 947a. If no tracking is achieved in step 947n, the tracking mode is switched from phase control to push-pull mode in step 947p. In step 947b, rotational speed control (CAV control) is performed to play back address information. If an address cannot be played back in step 947c, the process proceeds to step 947i to move the optical head inward to play back the PCA stripes. If an address can be played back from an empty portion of the PCA area (a portion not overwritten), the process proceeds to step 947e where, based on the address, the optical head is moved in a radial direction to the address area where stripes are recorded. In step 947q, the presence or absence of PCA stripes is checked. If it is judged that there are no PCA stripes, the process proceeds to step 947r to try to read a PCA flag in the control data. Then, in step 947s, the presence or absence of the PCA flag is checked. If the presence of the PCA flag is detected, the process returns to step 947c; otherwise, the process jumps to step 947m.

On the other hand, if it is judged in step 947q that there are PCA stripes, the process proceeds to step 947f to play back the PCA stripes. When the playback is completed in step 947g, then the mode is switched to rotation phase control and the optical head is moved to the outer area to play back a pit signal. In step 947t, the PCA flag in the control data is read; if there is no PCA flag, an error message is issued in step 947k, and the process returns to 947m to continue the process.

(E) Next, manufacturing techniques for implementing the optical disk barcode forming method of the invention will be described in further detail. A barcode playback apparatus will also be described briefly.

(a) First, manufacturing techniques for implementing the barcode recording method will be described.

Figure 29A:
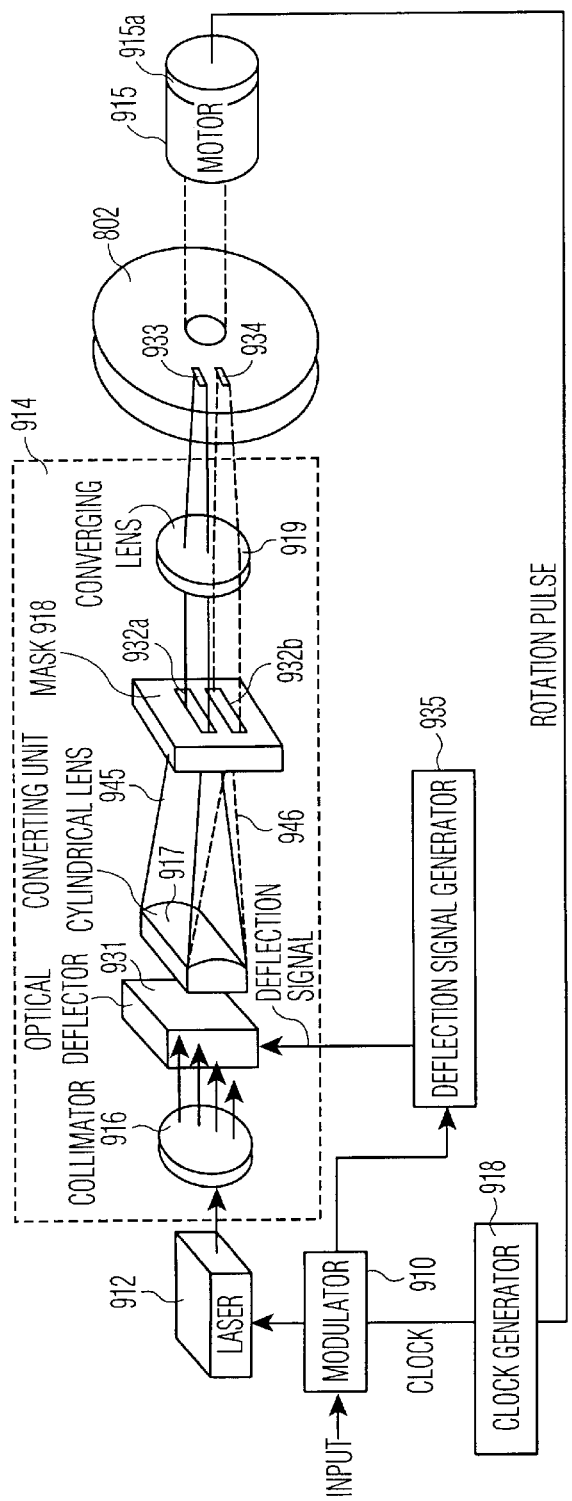
FIG. 29(a) is a perspective view of the converging unit, with a beam deflector appended thereto, according to the embodiment, and (b) is a diagram showing a stripe arrangement and an emitting-pulse signal.

In the case of the barcode recording method previously explained with reference to FIG. 28, the minimum emitting-pulse spacing is 1t; therefore, a laser with a pulse repetition period of $f_C = 1/f_L$ is required, where $f_L$ is the frequency of the laser. In this case, the number, $f_L/2$, of barcode bars can be recorded per second. However, if a beam deflector 931 is used, as shown in FIG. 29, a minimum emitting-pulse spacing of 2t is allowed, so that the pulse repetition period is $f_L = \frac{1}{2}t$, which means that the laser frequency can be reduced by a factor of 2. This also means that, when a laser of the same frequency is used, the number of barcode bars that can be recorded per second can be doubled to $f_L$ by using the beam deflector 931. This has the effect of reducing the productive tact (processing tact) by a factor of 2.

The operation of a double-efficiency apparatus (referred to as "switch recording") using the beam deflector 931 will be described below with reference to FIG. 29, focusing on differences from the configuration of FIG. 28.

Figure 29B:
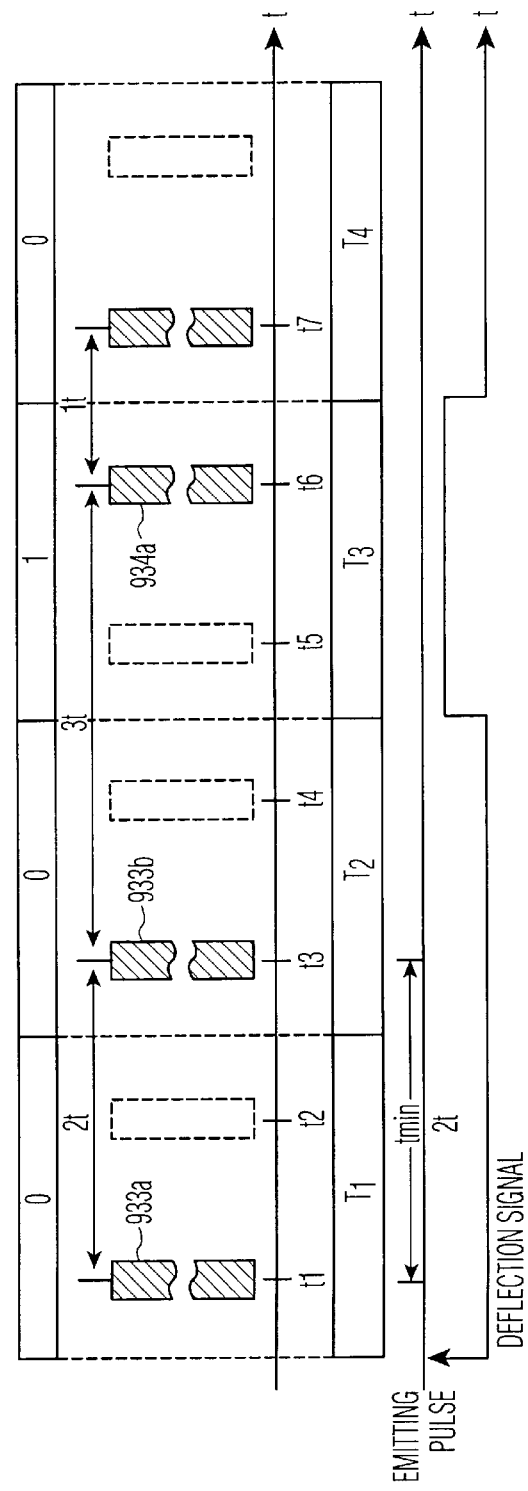

The beam deflector 931, formed from an acousto-optical modulator or the like, is supplied with a deflection signal for switching the beam between a main beam 945 and a sub-beam 946; when the deflection signal is ON, the beam is switched to the sub-beam 946 which is passed through a sub-slit 932b and forms a sub-stripe 934. More specifically, for data "0" a normal stripe 933 is formed; only when recording data "1" is the deflection signal set to ON, as shown in FIG. 29(b), in response to which the beam deflector 931 switches the beam to the sub-beam 946 to record a stripe at the position of the sub-stripe 934. In this manner, stripes 933a and 933b, each for "0", and a stripe 934a for "1", as shown in part (b), are formed on the disk. In this configuration, since a laser pulse need only be produced at intervals of 2t, a laser with a frequency half that required in the configuration of FIG. 28 can be used. In other words, when a laser of the same frequency is used, since the stripes can be formed at twice the clock frequency, this has the effect of increasing the productivity by a factor of 2, as already described.

Next, referring to the data structure of the synchronization code shown in FIG. 34, a format suitable for the switch recording explained with reference to FIG. 29 will be described below. The synchronization code data structure also constitutes a technique for improving productivity.

As shown in FIG. 34(a), a fixed pattern of "01000110" is used here. Conventionally, a bit string consisting of the same number of 0s and 1s, such as "01000111", is used, but the present invention deliberately avoids this and uses the illustrated data structure for the reason explained below.

Figures 33A, 33B, 33C:
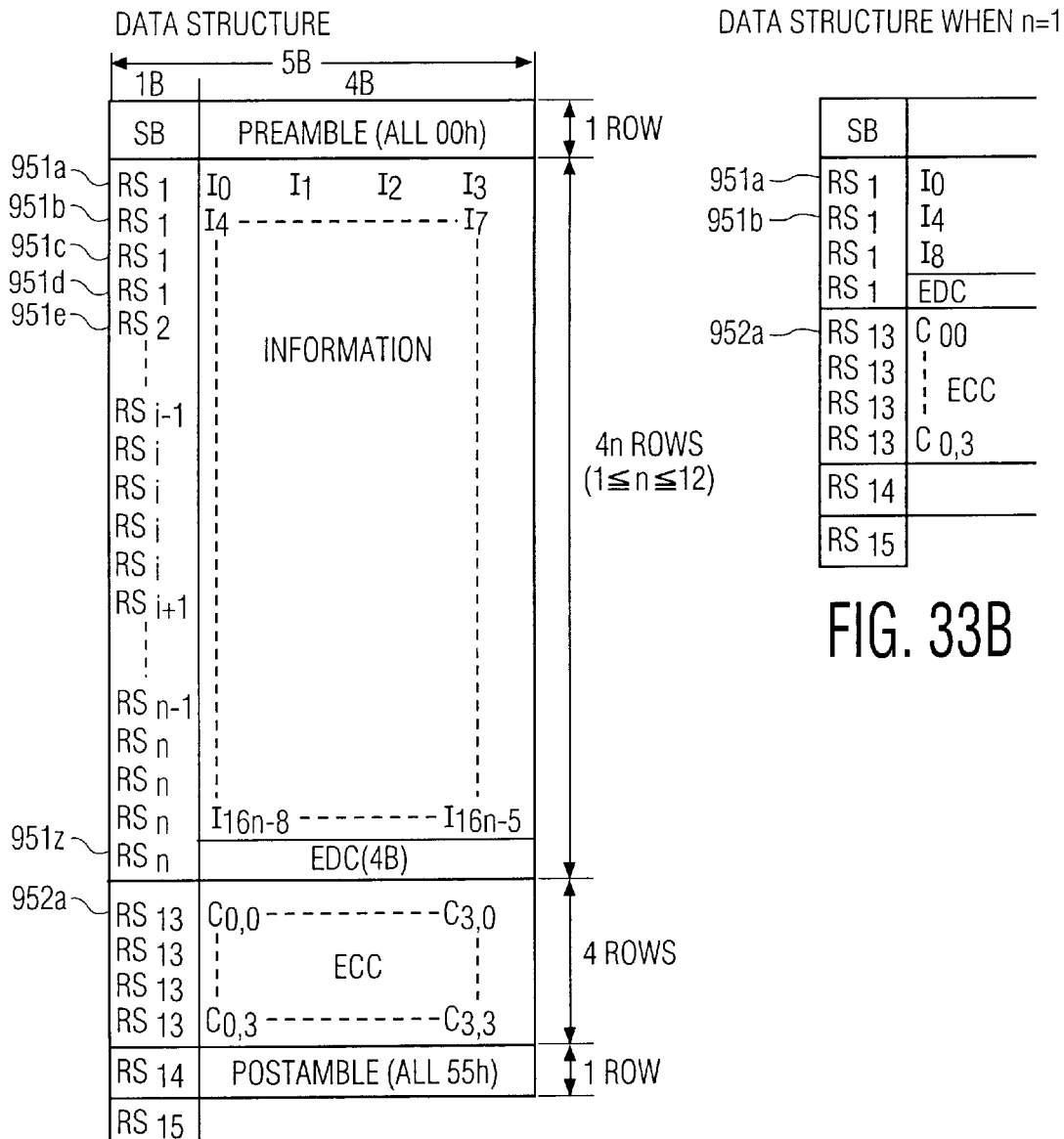
FIG. 33(a) is a diagram showing a data structure after ECC encoding according to the embodiment, (b) is a diagram showing a data structure after ECC encoding according to the embodiment (when n=1), and (c) is a diagram showing an ECC error-correction capability according to the embodiment.

First, to achieve the switch recording of FIG. 29, provisions must be made so that two or more pulses will not occur within one time slot, that is, within 1T interval. Switch recording is possible in the data area because data is recorded there with a PE-RZ code, as shown in FIG. 33(a). However, in the case of the synchronization code of FIG. 34(a), since irregular channel bits are arranged, with the usual method two pulses may occur within 1T, in which case the switch recording of the invention is not possible. To address this problem, the invention employs, for example, the bit pattern "01000110" as shown in FIG. 37. With this bit pattern, in T1 a pulse occurs for the "1" on the right, in T2 no pulses occur, in T3 a pulse occurs for the "1" on the right, and in T4 a pulse occurs for the "1" on the left; in this way, two or more pulses cannot occur within one time slot. Thus, the synchronization code structure of the invention has the effect of achieving switch recording, increasing the production rate by a factor of 2.

(b) Next, referring to FIG. 15, a brief description will be given of a playback apparatus for playing back the barcode recorded on an optical disk by the above method. The description will also touch on productivity increases.

FIG. 15 is a block diagram of the playback apparatus already described in (I).

In the first-half part (I), the apparatus has been described as an apparatus for reading the position of a marking formed on the reflective film of an optical disk, but hereinafter, the apparatus of FIG. 15 will be described as a barcode reading apparatus, that is, a playback apparatus.

An explanation will be given again referring to FIG. 15. this time focusing on the demodulation operation. First, high-frequency components generated by pits are removed by a low-pass filter (LPF filter) 94 from a stripe signal output.

Figure 35B:

In the case of a DVD, there is a possibility that a maximum 14T signal may be played back, where T=0.13 $\mu$m. In this case, it has been confirmed by experiment, a stripe signal and a high-frequency component generated by a pit can be separated by using the second-order or third-order Chevihov low-pass filter shown in FIG. 35(a). That is, the use of a second- or higher-order LPF has the effect of being able to separate a pit signal and a barcode signal, thus ensuring stable playback of a barcode. FIG. 35(b) shows the simulation waveform which is generated when the signal of the maximum 14T pit length is recorded continuously.

Figure 36A:
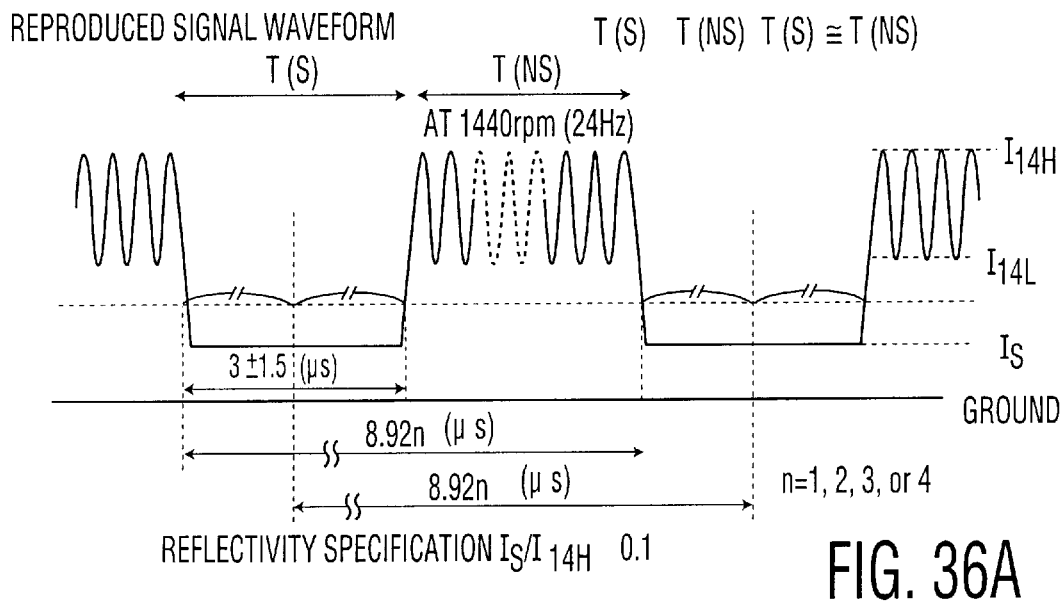
FIG. 36(a)–(d) illustrate diagram, showing a reproduced signal waveform according to the embodiment, and (b) is a diagram for explaining a dimensional accuracy of a stripe according to the embodiment.
Figure 36B:
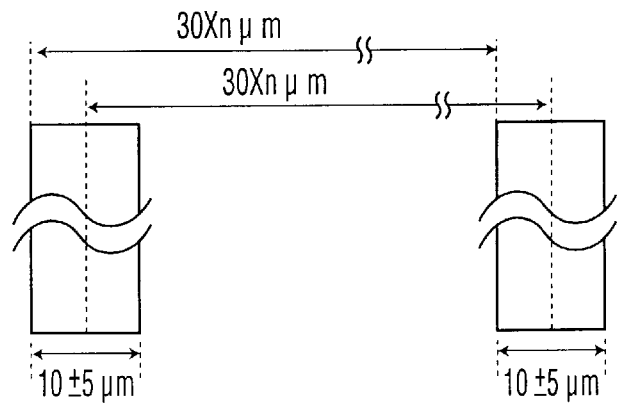
Figure 36C:
Figure 36D:
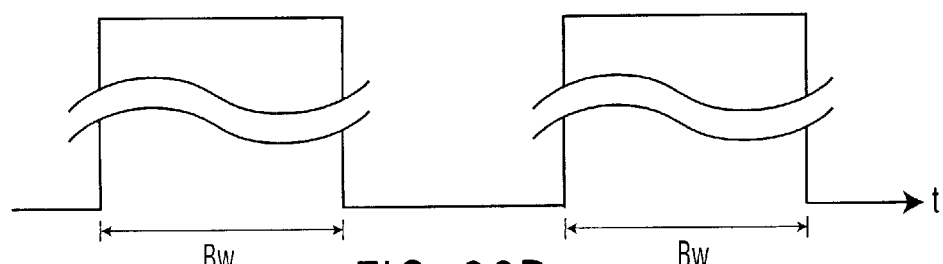
Figure 37A:
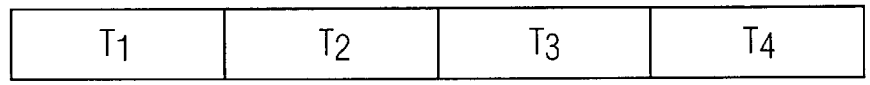
FIG. 37 is a diagram showing a synchronization code and a laser emitting pulse signal waveform.
Figure 37B:
Figure 37C:
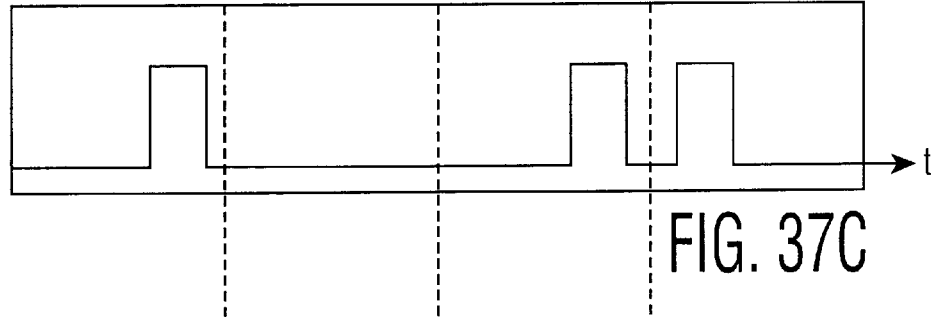
Figure 37D:
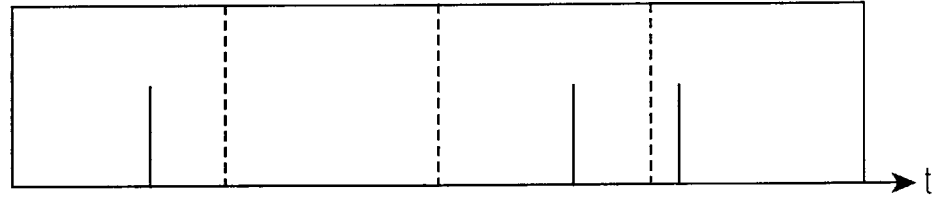

In this way, by using the second- or higher-order LPF 943, the stripe playback signal can be output after substantially removing the pit playback signal; this ensures reliable demodulation of stripe signals. However, if the width of a stripe signal thus demodulated (the stripe signal width shown as 15 $\mu$m in FIG. 36(b)) is smaller than the sampling interval width tm (see FIG. 36(c)) of a microcomputer, the stripe signal may not be measured accurately. For example, of the stripe signals shown in FIG. 36(b), the stripe signal on the left is located inside of the microcomputer sampling interval width, and therefore, is not detected. To avoid this, a stripe signal obtained by reading a stripe is waveshaped using a flip-flop circuit so that the signal width becomes greater than the microcomputer sampling interval width tm, as shown in FIG. 36(d). FIG. 36(d) shows a waveform after the stripe signal width was increased to a width Bw. The waveshaped signal is then detected with sampling pulses (see FIG. 36(c)) from the microcomputer. This ensures accurate measurement of the stripe signal.

Referring back to FIG. 15, a further description will be given. Digital data is demodulated by the PE-RZ demodulator 942 in the above manner. The data is then fed to an ECC decoder 928 for error correction. That is, deinterleaving is performed in a deinterleaver 928a, and Reed-Solomon code computation is performed in an RS decoder 928b for error correction.

A brief description will now be given in relation to productive tact.

FIG. 33(a) shows the data structure after the barcode is ECC encoded according to the present embodiment. FIG. 33(b) shows the data structure after ECC encoding when n=1 according to the present embodiment. FIG. 33(c) shows an ECC error-correction capability according to the present embodiment.

In the present invention, the interleaving and Reed-Solomon error-correction coding shown in the data structure of FIG. 33(a) are performed using the ECC encoder 927 shown in FIG. 1 when recording stripes on an optical disk. With this error-correction method, a read error occurs in only one disk out of $10^7$=10 million optical disks under the condition of that Byte error rate of $10^{-4}$ occurs, as shown in FIG. 33(c). In this data structure, to reduce the code data length the same sync code is assigned to four rows, reducing the number of sync codes by a factor of 4 and thus increasing efficiency. With further reference to FIG. 33, the scalability of the data structure will be described. In the present invention, the recording capacity can be varied freely, for example, within a range of 12B (12 Byte) to 188B in increments of 16B, as shown in the example of FIG. 34(c). That is, n can be changed within a range of n=1 to n=12, as shown in FIG. 33(c).

As shown in FIG. 33(b) and FIG. 14(a), for example, in the data structure when n=1, there are only four data rows 951a, 951b, 951c, and 951d, followed by ECC rows 952a, 952b, 952c, and 952d. FIG. 14(a) is a diagram showing FIG. 33(b) in further detail. The data row 951 constitutes EDC of 4B. FIG. 14(b) shows this in an equivalent form. Error-correction encoding computation is performed, assuming that data rows from 951e to 951z all contain 0s. Mathematical equations for EDC and ECC computations are shown in FIGS. 14(c) and 14(d), respectively. In this way, the data is ECC-encoded by the ECC encoder 927 in the recording apparatus of FIG. 1 and recorded as a barcode on the disk. When n=1, data of 12B is recorded over an angle of 51 degrees on the disk. Likewise, when n=2, data of 18B can be recorded; when n=12, data of 271B can be recorded over an angle of 336 degrees on the disk. In the present invention, by encoding and decoding the data using the EDC and FCC computation equations shown in FIGS. 14(c) and 14(d), when the data amount is smaller than 188B, the computation is performed assuming all remaining bits are 0s, so that the data is stored with a small recording capacity. This serves to shorten the productive tact. When performing laser trimming, as in the present invention, the above-described scalability has a significant meaning. More specifically, when performing laser trimming at a factory, it is important to shorten the productive tact. With a slow-speed apparatus which trims one stripe at a time, it will take more than 10 seconds to record a few thousand stripes to the full capacity. The time required for disk production is 4 seconds per disk; if full-capacity recording has to be done, the productive tact increases. On the other hand, for the moment, disk ID number will be a main application area of the present invention; in this application, the PCA area capacity can be as low as 10B. If 271B are recorded when only 10B need to be written, the laser processing time will increase by a factor of 6, leading to a production cost increase. The scalability method of the present invention achieves reductions in production cost and time.

In the playback apparatus shown in FIG. 15, when n=1 as in FIG. 33(b), for example, the ECC decoder 928 performs the EDC and ECC error-correction computations shown in FIGS. 14(c) and 14(d), assuming that the data rows 951e to 951z all contain 0s as shown in FIG. 14(b); the effect of this is that data of 12 to 271B can be corrected for errors by using the same program. In this case, the number of program steps decreases, permitting the use of a small-capacity ROM in the microcomputer.

Furthermore, the pulse width reproduced from each stripe width is made less than ½ of one pulse period, as shown in FIG. 36. Since there are three difference pulse spacings, 1T, 2T, and 3T, the ratio of the sum of all the stripe areas in one track to the total area of the track is less than ⅓. With this arrangement, in the case of a disk of standard reflectivity of 70% the reflectivity of the stripe area is ⅔ of that, i.e., about 50%. Since this value is enough for focus control, the PCA area can be played back on a conventional ROM disk player.

(F) Next, an example of the above-described barcode encryption (including digital signature) will be described with reference to drawings, followed by a description of another application example of the barcode.

(a) First, the barcode encryption process and playback process will be described by way of example with reference to FIG. 45.

Figure 45:
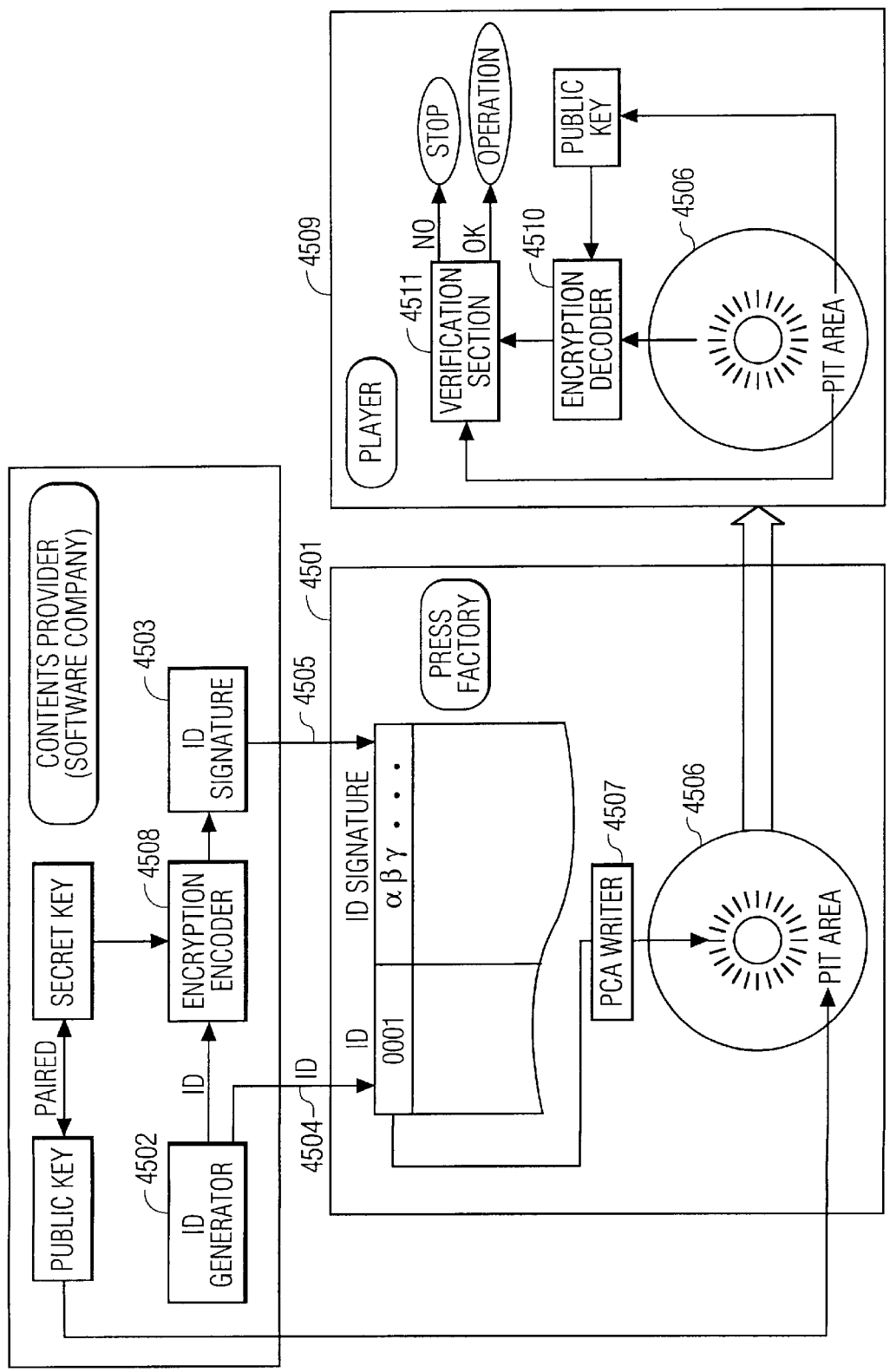
FIG. 45 is a diagram for explaining barcode encryption according to the embodiment.

As shown in FIG. 45, an ID number 4504 unique to each individual optical disk is generated by an ID generator 4502. At the same time, an ID signature section 4503 applies a digital signature to the ID number by using a specific secret key corresponding to a specific public key, and the thus applied digital signature 4505 and its associated ID number 4504 are sent together as a series of data to a press factory 4501. This digital signature is applied to the ID number encrypted in an encryption encoder 4508 using a secret key of a public key encryption function. The public key corresponding to this secret key is sent to the press factory 4501. At the press factory 4501, the ID number and its corresponding digital signature 4505 are recorded as a barcode in the PCA area of an optical disk 4506 by using a PCA writer 4507. The public key is prerecorded on the master disk, that is, in a pit portion of the disk. When the thus manufactured optical disk 4506 is loaded into a playback apparatus (player) 4509, the public key is read from the pit portion, and the ID number and the digital signature appended to it are read from the PCA area and decrypted with the public key. The result of the decryption is passed to a verification section 4511; if the digital signature data is found legitimate as the result of the verification, the playback operation of the optical disk is allowed to continue. If the digital signature data is found illegitimate as the result of the verification, the operation is stopped. Here, if the digital signature data is recorded in the PCA area together with the plaintext of the ID, the result of the decryption is checked against the plaintext of the ID to see if they match. If the digital signature data only is recorded in the PCA area, an error check is performed for verification. When the data is encrypted with public key cipher, as described above, only the software manufacturer that has the secret key can issue a new ID number. Accordingly, if pirated disks were made, the encrypted ID of the same number would be recorded in the PCA area of every disk; therefore, the use of such pirated disks would be greatly limited. The reason is that, in such cases, the illegal use of the software having the same number can be prevented by applying network protection. Needless to say, the above method described with reference to FIG. 45 can also be used in the Internet.

(b) Another application example of the barcode will be described with reference to FIG. 46 as another mode of embodiment.

This mode of embodiment is concerned with an example in which an encryption key to be used during communication is recorded as the above-described barcode in the PCA area.

Figure 46:
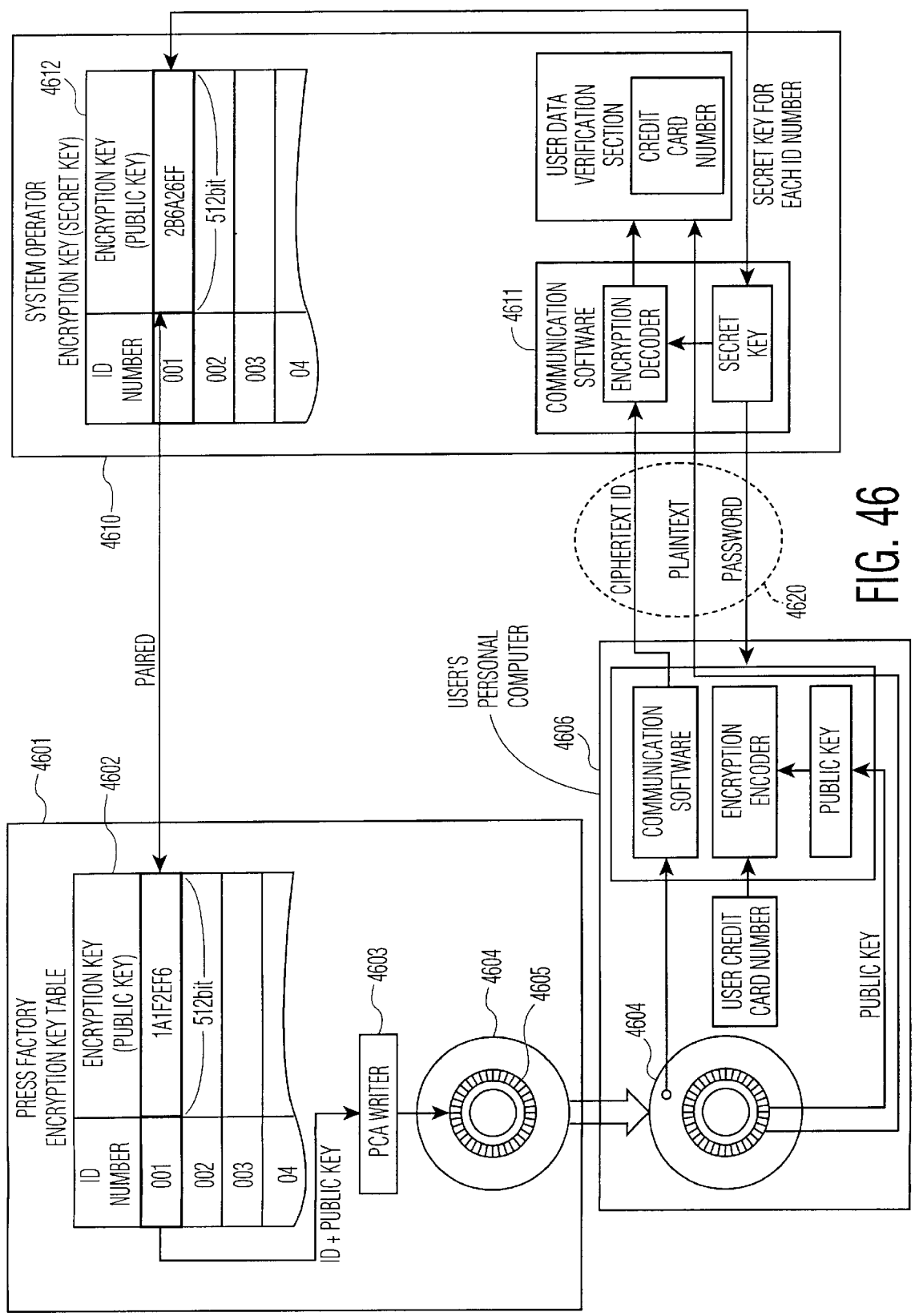
FIG. 46 is a diagram showing another application example of the barcode according to the embodiment.

As shown in FIG. 46, a press factory 4601 keeps each ID number and its corresponding encryption key, a public key of a public key encryption function, in the form of a table 4602. At the press factory 4601, an ID number and its corresponding public key are recorded in the PCA area 4605 of an optical disk 4604 by using a PCA writer 4603.

Next, we will describe how the user who purchased the thus completed optical disk 4604 can play it back on his player. Consider, for example, a case in which he desires to watch movie software recorded on the optical disk. Before the user can play back the movie contained on the optical disk 4604, he has to arrange for payment to a system management center 4610 and have a password issued to enable playback.

First, the user sets the optical disk 4604. With communication software run on a personal computer 4606, the PCA area, etc. are played back and the public key is read out. When the user enters his credit card number and personal code number, an encryption encoder 4607 encrypts the entered data with the public key, and the encrypted data is transmitted to the system management center 4610 by using the communications channel 4620. At the system management center 4610, a communication section 4611 reads the ID number in plaintext from the received data, and decrypts the received data by retrieving a secret key corresponding to the ID number from an encryption key table 4612. That is, the system management center 4610 keeps the encryption key table 4612 containing mapping information for each ID number and a secret key corresponding to the public key. Based on the user's credit card number and personal code number retrieved from the decrypted data, the system management center 4610 charges the user, and at the same times, issues a password to the user. This password corresponds to the disk ID and user-specified movie or computer software contained on the disk 4604. Using the password thus issued, the user can play back the desired movie or install the desired computer software.

Since the public key can be prerecorded as a barcode on the optical disk, this mode of embodiment has the effect of saving time and labor taken in a previous system that required the system management center to send the public key to the user separately. Furthermore, even if the communication key (public key) is delivered to a press factory where no particular security measures are implemented, security can be maintained. Furthermore, since a different public key is used for each individual disk, if security of one particular disk, that is, one user, is broken, the security of other users can be protected. Furthermore, using different public keys for different disks has the effect of reducing the possibility of a third party placing an illegal order. If the communication public key were recorded on the master disk, it would not be possible to prevent a third party from placing an illegal order. In the example of FIG. 46, a public key is used as the communication key, but it will be appreciated that similar effects can be obtained if a secret key is used. In this case, however, the security level is a little lower than when a public key is used. Needless to say, the method described with reference to FIG. 46 can also be used in the Internet.

Figure 22:
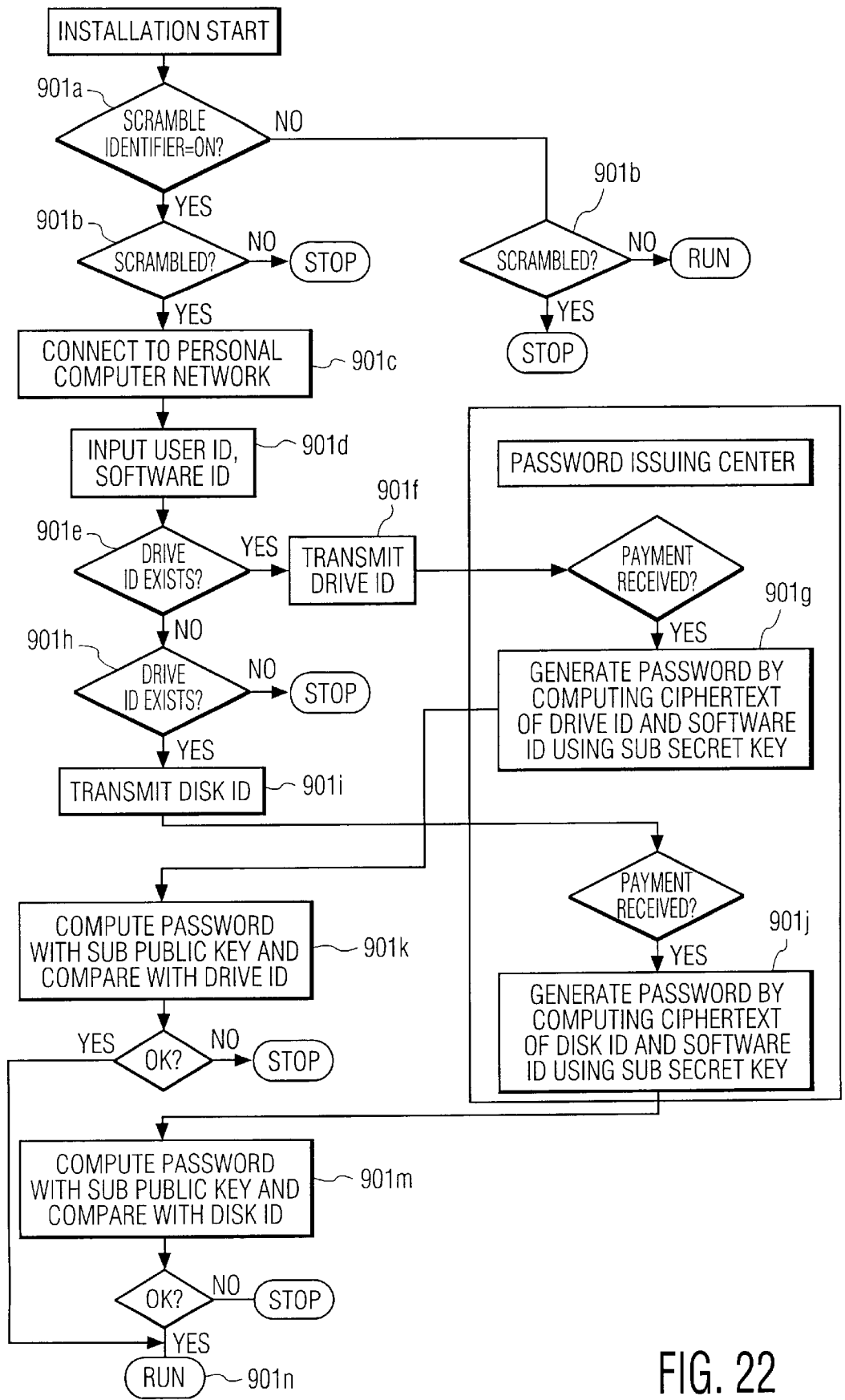
FIG. 22 is a flowchart illustrating the function of a scramble identifier and the switching between drive ID and disk ID in a program installation process according to the present embodiment.

Referring to FIG. 22, we will now describe in detail a method of descrambling and decrypting data using a password via the network described with reference to FIG. 46. In the flowchart of FIG. 22, first in step 901a the software on the disk checks the scramble identifier to see if the identifier is ON. If the answer is NO, the process proceeds to step 901b; if the software is not scrambled, the installation is allowed to continue. On the other hand, if the answer is YES, it is checked in step 901b whether the software is scrambled or not; if YES, a connection is made to the personal computer network in step 901c, which is followed by step 901d where the user enters the user ID and software ID. If, in step 901c, there is a drive ID, then in step 901f the drive ID data is transmitted to the password issuing center. After confirming payment, in step 901g the password issuing center performs encryption computation on the drive ID and software ID by using a sub secret key, and generates a password which is transmitted to the user. The process then proceeds to step 901h. The personal computer at the user end computes the password by a sub public key and compares it with the drive ID. If the result is OK, the process proceeds to step 901n where the software scramble or encryption is unlocked.

Turning back to step 901e, if the answer is NO, then in step 901h it is checked whether there is a disk ID. If there is a disk ID, then in step 901i the disk ID data is transmitted to the password issuing center. After confirming payment, in step 900j the password issuing center performs encryption computation on the disk ID and software ID by using a sub secret key, and generates a password which is transmitted to the user. In step 901m, the personal computer at the user end computes the password by a sub public key and compares it with the drive ID. If the result is OK, the process proceeds to step 901n where the software scramble is unlocked.

In this way, by communicating with the password issuing center via the network by using a disk ID, the software scramble or encryption on the disk can be unlocked. In the case of the disk ID of the present invention, since the ID varies from disk to disk, the password is also different; this has the effect of enhancing security. In FIG. 22, ciphertext communication is omitted, but by encrypting data using a public key recorded in the PCA area, such as shown in FIG. 46, during the communication performed in steps 901i and 901j, data security during communication can be further enhanced. This has the effect of ensuring safe transmission of personal billing information via a communication means such as the Internet where the security level is low.

We will finish here the descriptions of the first-half part (I) and the second-half part (II), and now proceed to a description of appertaining matters relating to the process from optical disk manufacturing to the playback operation of the player.

(A) A low reflectivity portion address table, which is a position information list for the low reflectivity portion, will be explained.

Figure 13A:
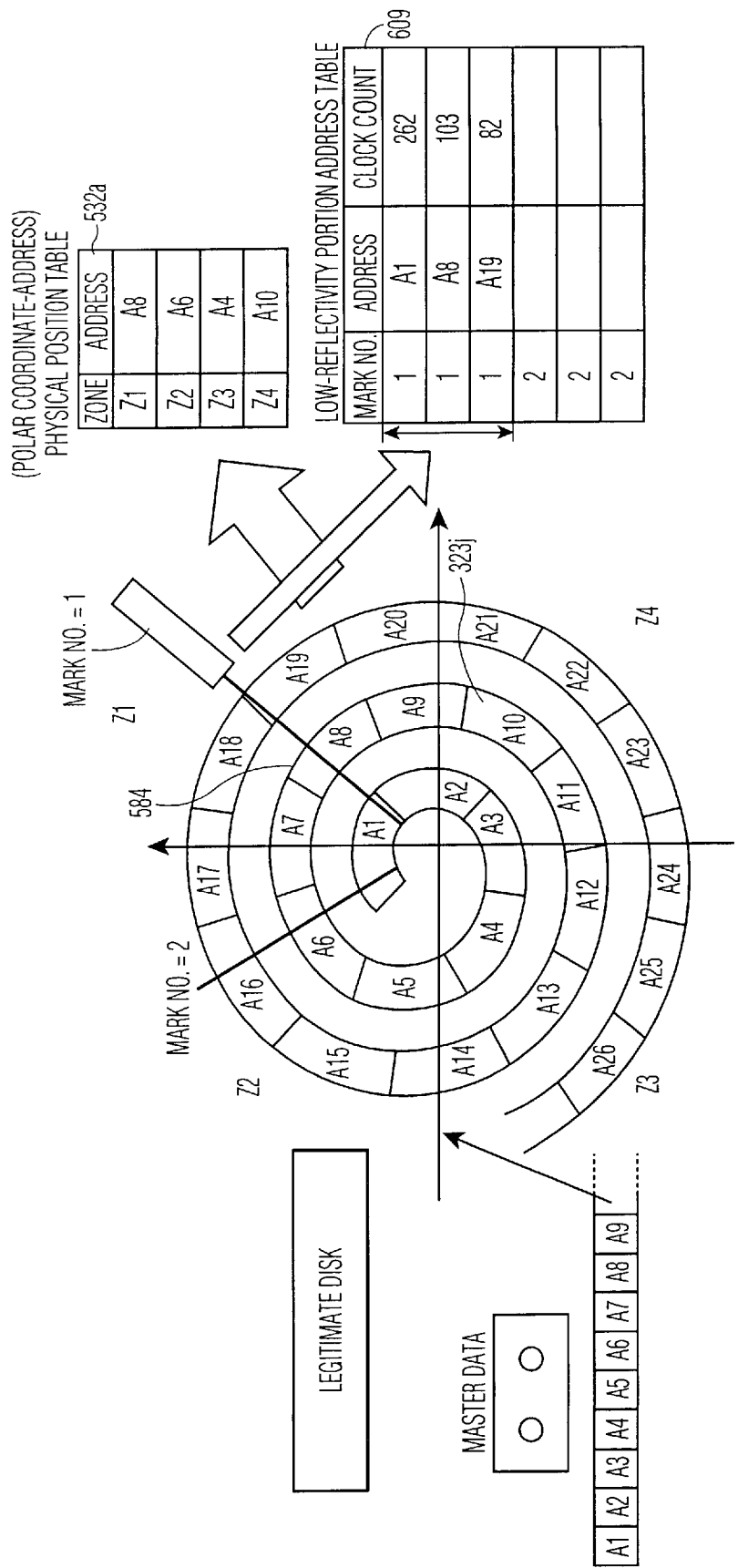
FIG. 13(a) is a diagram showing a physical arrangement of addresses on a legitimate CD according to the embodiment, and (b) is a physical arrangement of addresses on an illegally duplicated CD according to the embodiment.
Figure 13B:
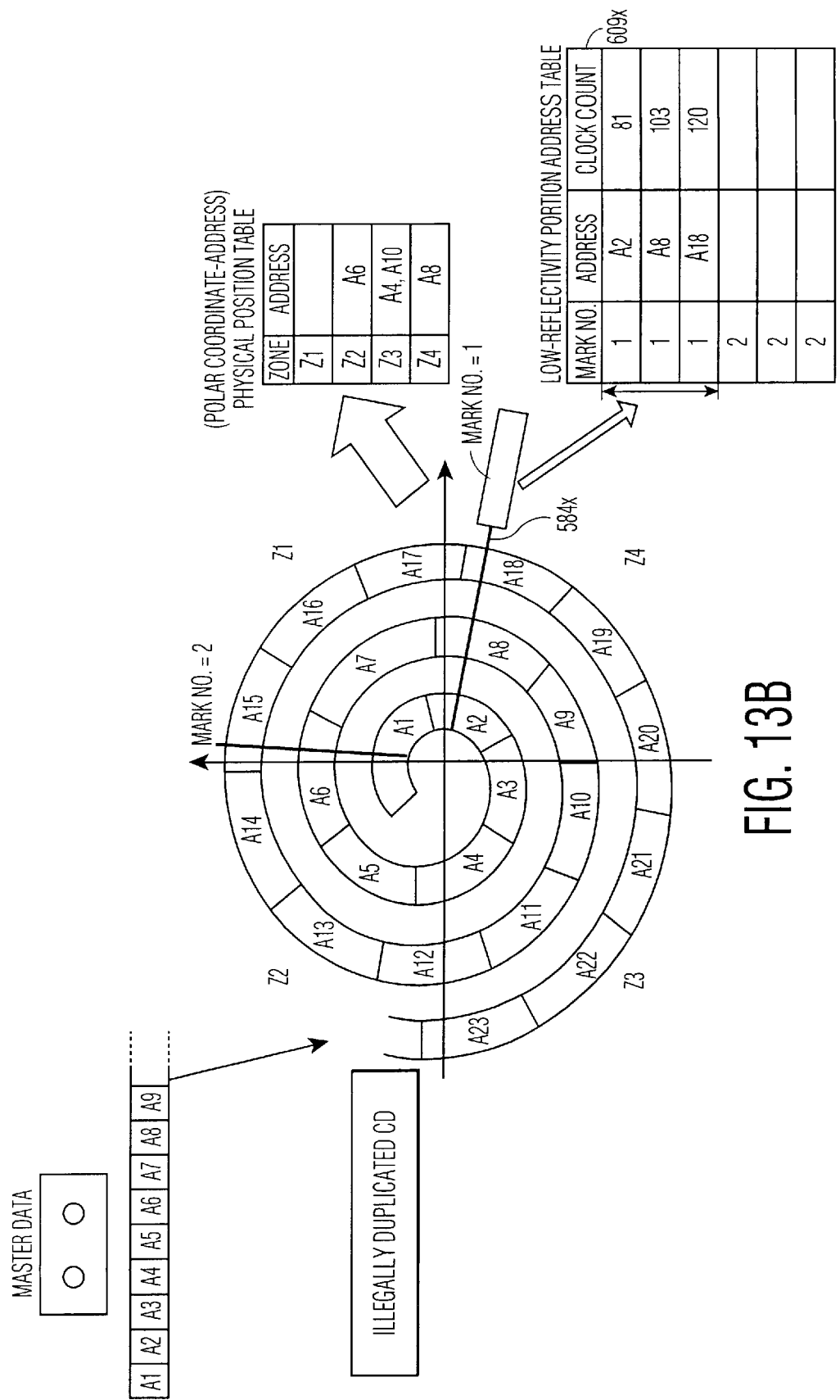

(a) Laser markings are formed at random in the antipiracy mark formation process at the factory. No laser markings formed in this manner can be identical in physical feature. In the next process step, the low reflectivity portion 584 formed on each disk is measured with a resolution of 0.13 $\mu$m in the case of a DVD, to construct a low reflectivity portion address table 609 as shown in FIG. 13(a). Here, FIG. 13(a) is a diagram showing a low reflectivity portion address table, etc. for a legitimate CD manufactured in accordance with the present embodiment, and FIG. 13(b) is concerned with an illegally duplicated CD. The low reflectivity portion address table 609 is encrypted using a one-direction function such as the one shown in FIG. 18, and in the second reflective-layer forming step, a series of low reflectivity portions 584c to 584e, where the reflective layer is removed, is recorded in a barcode-like pattern on the innermost portion of the disk, as shown in FIG. 2. FIG. 18 is a flowchart illustrating a disk check procedure by the one-way function used for the encryption. As shown in FIG. 13, the legitimate CD and the illegally duplicated CD have the low reflectivity portion address tables 609 and 609x, respectively, which are substantially different from each other. One factor resulting in this difference is that laser markings identical in physical feature cannot be made, as earlier noted. Another factor is that the sector address preassigned to the disk is different if the master disk is different.

Figure 17:
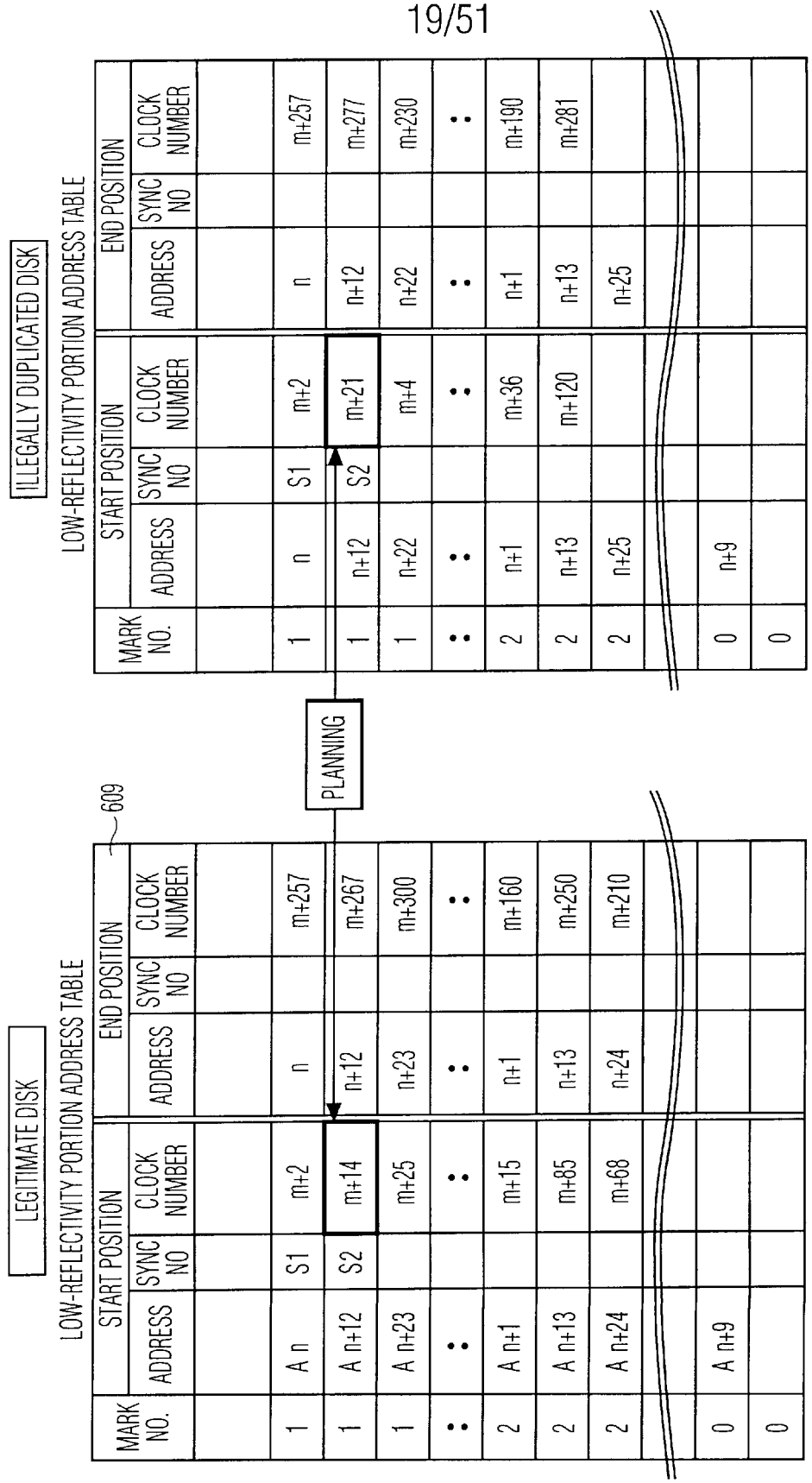
FIG. 17 is a diagram showing a comparison of low-reflectivity portion address tables for a legitimate disk and a duplicated disk.

Referring now to FIG. 13, we will describe how the marking position information differs between the legitimate disk and pirated disk. The figure shows an example in which the above two factors are combined. In the example shown, two markings are formed on one disk. In the case of the legitimate CD, the first marking of mark number 1 is located at the 262nd clock position from the start point of the sector of logical address A1, as shown in the address table 609. In the case of a DVD, one clock is equivalent to 0.13 $\mu$m, and the measurement is made with this accuracy. On the other hand, in the case of the pirated CD, the first marking is located at the 81st clock position in the sector of address A2, as shown in the address table 609x. By detecting this difference of the first marking position between the legitimate disk and pirated disk, the pirated disk can be distinguished. Likewise, the position of the second marking is also different. To make the position information match that of the legitimate disk, the reflective film at the 262nd position in the sector of address A1 must be formed with an accuracy of one clock unit, i.e., 0.13 $\mu$m; otherwise, the pirated disk cannot be run. In the example of FIG. 16, the legitimate disk and illegally duplicated disk have low reflectivity portion address tables 609 and 609x respectively, where values are different as shown in FIG. 17. In the case of the legitimate disk, in the track following the mark 1 the start and end positions are m+14 and m+267, respectively, as shown in FIG. 16(8), whereas in the case of the illegally duplicated disk these are m+24 and m+277, respectively, as shown in FIG. 16(9). Therefore, the corresponding values in the low reflectivity portion address tables 609 and 609x are different, as shown in FIG. 17, thus making it possible to distinguish the duplicated disk. If an illegal manufacturer desires to make a copy of the disk having the low reflectivity portion address table 609, they will have to perform a precise laser trimming operation with the resolution of the reproduced clock signal as shown in FIG. 16(8).

Figure 20:
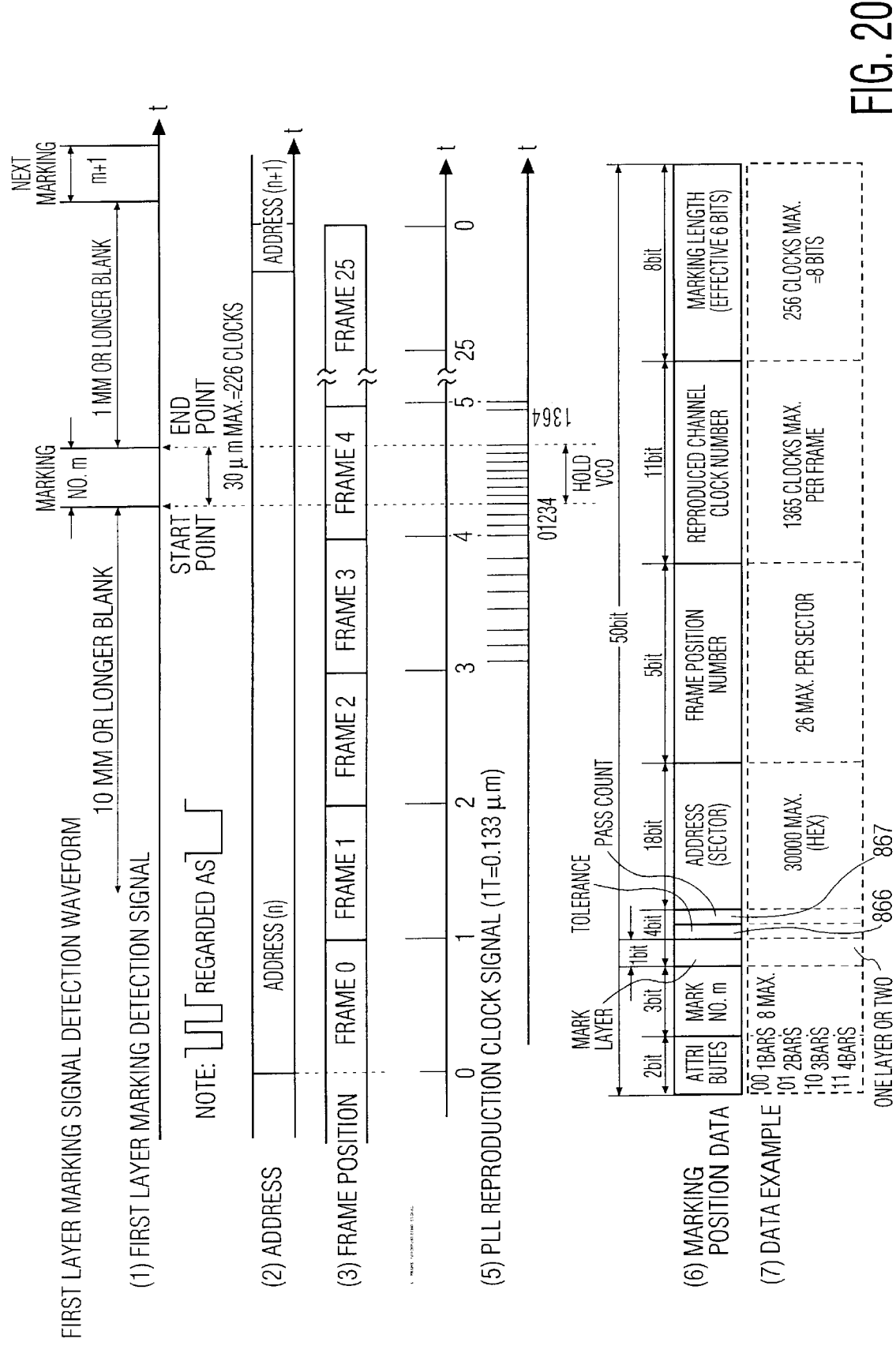
FIG. 20 is a diagram showing a detected waveform of a first-layer marking signal according to the present embodiment.

As shown in FIG. 20(5) showing the waveform of a PLL reproduced clock signal out of reproduced optical signals, in the case of a DVD disk the period T of one reproduced clock pulse, when converted to a distance on the disk, that is, one pulse spacing on the disk, is 0.13 μm. Accordingly, to make an illegal copy, the reflective film will have to be removed with a submicron resolution of 0.1 μm. It is true that when an optical head designed for an optical disk is used, a recording can be made on a recording film such as a CD-R with a submicron resolution. But in this case, the reproduced waveform will be as shown in FIG. 9(c), and the distinct waveform 824 as shown in FIG. 9(a) cannot be obtained unless the reflective film is removed.

(b) A first method of achieving mass production of pirated disks by removing the reflective film may be by laser trimming using a high output laser such as a YAG laser. At the present state of technology, even the most highly accurate machining laser trimming can only achieve a processing accuracy of a few microns. In the laser trimming for semiconductor mask corrections, it is said that 1 μm is the limit of the processing accuracy. This means that it is difficult to achieve a processing accuracy of 0.1 μm at the mass production level.

(c) As a second method, X-ray exposure equipment for processing semiconductor masks for VLSIs and ion beam processing equipment are known at the present time as equipment that can achieve a processing accuracy of the order of submicrons, but such equipment is very expensive and furthermore, it takes much time to process one piece of disk, and if each disk were processed using such equipment, the cost per disk would be very high. At the present time, therefore, the cost would become higher than the retail price of most legitimate disks, so that making pirated disks would not pay and meaningless.

(d) As described above, with the first method that involves laser trimming, it is difficult to process with a submicron accuracy, and therefore, it is difficult to mass produce pirated disks. On the other hand, with the second method using the submicron processing technology such as X-ray exposure, the cost per disk is so high that making pirated disks is meaningless from an economic point of view. Accordingly, making illegal copies can be prevented until some day in the future when low-cost submicron processing technology for mass production becomes practical. Since practical implementation of such technology will be many years into the future, production of pirated disks can be prevented. In the case of a two-layer disk with a low reflectivity portion formed on each layer as shown in FIG. 33, an illegally duplicated disk cannot be manufactured unless the pits on top and bottom are aligned with good accuracy when laminating, and this enhances the effectiveness in preventing piracy.

(B) Next, we will describe how the arrangement angle of the low reflectivity portion on the disk can be specified.

In the present invention, sufficient effectiveness in piracy prevention is provided by the reflective layer level mechanism, that is, by the low reflective marking alone. In this case, the prevention is effective even if the master disk is a duplicate.

However, the effectiveness can be enhanced by combining it with the piracy prevention technique at the master disk level. If the arrangement angle of the low reflectivity portion on the disk is specified as shown in Table 532a and Table 609 in FIG. 13(a), an illegal manufacturer would have to accurately duplicate even the arrangement angle of each pit on the master disk. This would increase the cost of pirated disks and hence enhance the capability to deter piracy.

(C) A further description will be given of the operation of reading the nonreflective optical marking portion of the two-disk laminated optical disk, focusing on points that were not touched on in the foregoing description of the operating principle.

Figure 21:
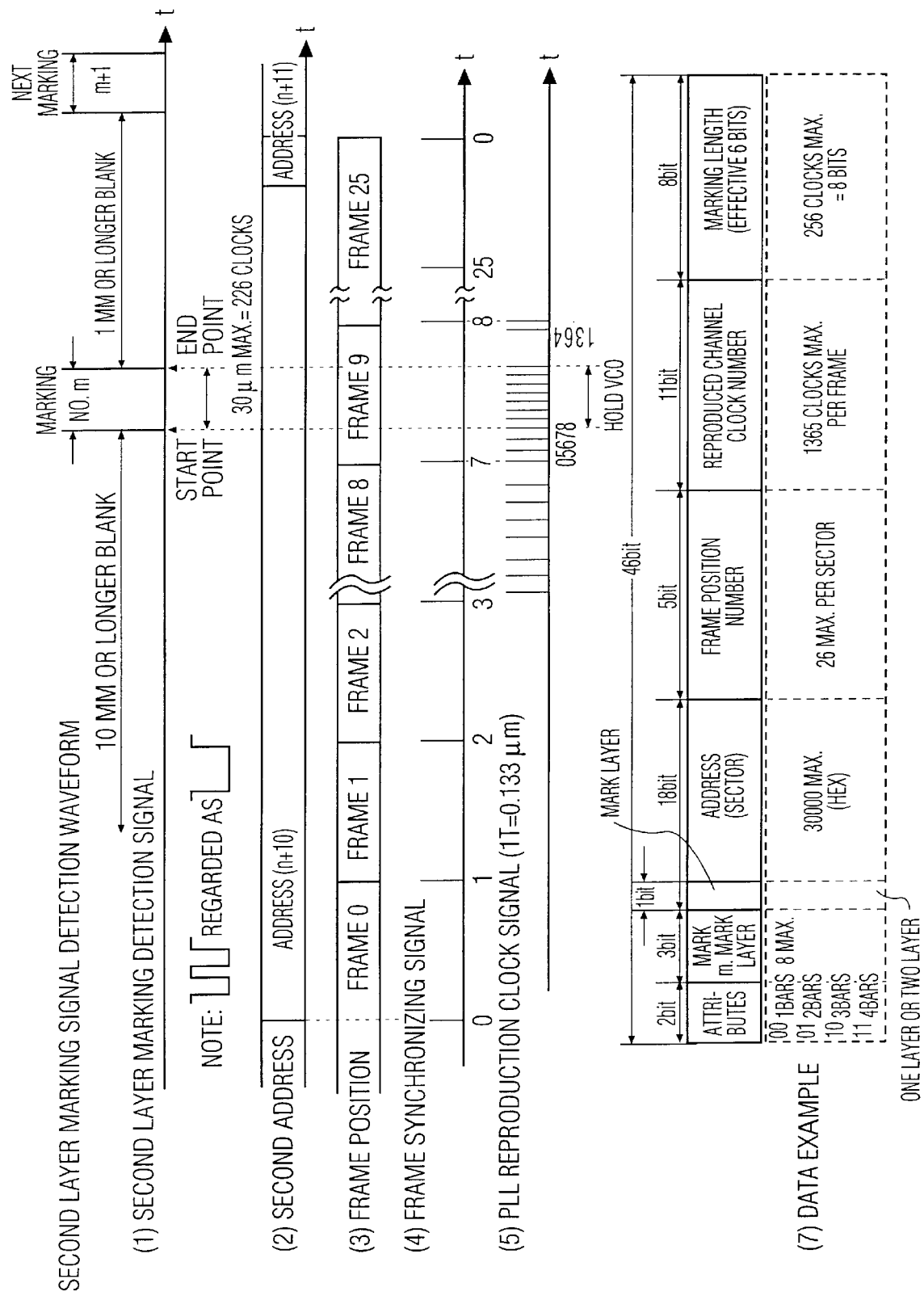
FIG. 21 is a diagram showing a detected waveform of a second-layer marking signal according to the present embodiment.

That is, as shown in FIG. 16, the start position address number, frame number, and clock number can be measured accurately with a resolution of 1T unit, that is, with a resolution of 0.13 μm in the case of the DVD standard, by using a conventional player, thereby to accurately measure the optical mark of the present invention. FIGS. 20 and 21 show the optical mark address reading method of FIG. 16. Explanation of signals (1), (2), (3), (4), and (5) in FIGS. 20 and 21 will not be given here since the operating principle is the same as that shown in FIG. 16.

The correspondence between FIG. 16, which illustrates the principle of the detection operation for detecting the position of a low reflectivity portion on a CD, and FIGS. 20 and 21, which are concerned with a DVD, is given below.

FIG. 16(5) corresponds to FIGS. 20(1) and 21(1). The reproduced clock signal in FIG. 16(6) corresponds to that shown in FIGS. 20(5) and 21(5). Address 603 in FIG. 16(7) corresponds to that shown in FIGS. 20(2) and 21(2).

Frame synch 604 in FIG. 16(7) corresponds to that shown in FIGS. 20(4) and 21(4). Starting clock number 605a in FIG. 16(8) corresponds to reproduced channel clock number in FIG. 20(6). Instead of the end clock number 606 in FIG. 16(7), in FIGS. 20(7) and 21(7) data is compressed using a 6-bit marking length.

As illustrated, the detection operation is fundamentally the same between CD and DVD. A first difference is that a 1-bit mark layer identifier 603a as shown in FIG. 20(7) is included for identifying whether the low reflectivity portion is of the one-layer type or two-layer type. The two-layer DVD structure provides a greater anti-piracy effect, as previously described. A second difference is that since the line recording density is nearly two times as high, 1T of the reproduced clock is as short as 0.13 μm, which increases the resolution for the detection of the position information and thus provides a greater anti-piracy effect.

Shown in FIG. 20 is the signal from the first layer in a two-layer optical disk having two reflective layers. The signal (1) shows the condition when the start position of an optical mark on the first layer is detected. FIG. 21 shows the condition of the signal from the second layer.

To read the second layer, a first/second layer switching section 827 in FIG. 15 sends a switching signal to a focus control section 828 which then controls a focus driving section 829 to switch the focus from the first layer to the second layer. From FIG. 20. it is found that the mark is in address (n), and by counting the frame synchronizing signal (4) using a counter, it is found that the mark is in frame 4. From signal (5), the PLL reproduced clock number is found, and the optical marking position data as shown by the signal (6) is obtained. Using this position data, the optical mark can be measured with a resolution of 0.13 μm on a conventional consumer DVD player.

(D) Additional matters relating to the two-disk laminated optical disk will be further described below.

Figure 47:
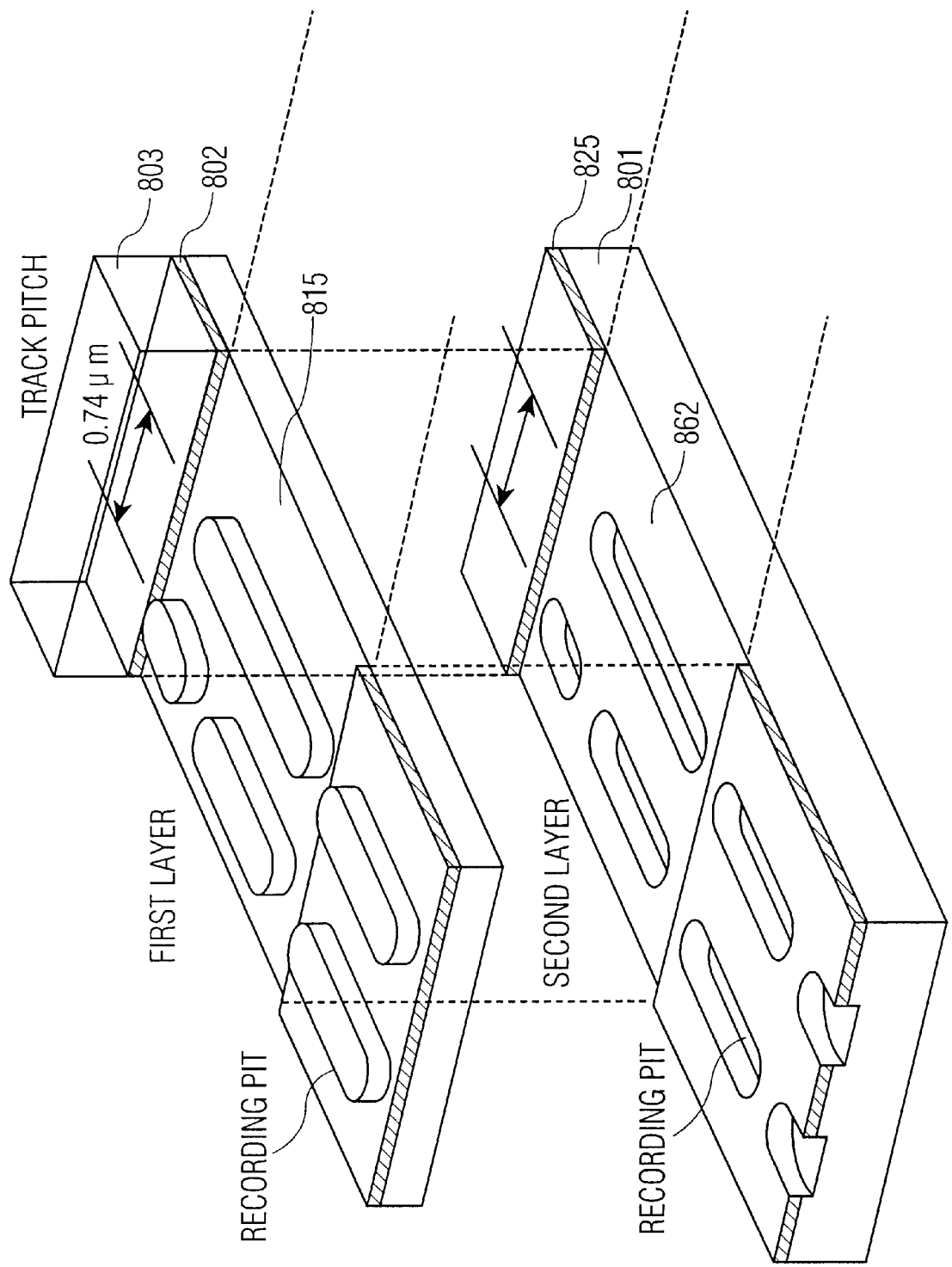
FIG. 47 is a perspective view showing a nonreflective portion formed in a two-layer disk according to the embodiment.

FIG. 2 1 shows address position information pertaining to the optical marking formed on the second layer. Since laser light penetrates the first and second layers through the same hole, as shown in the process step (6) in FIG. 7, the nonreflective portion 815 formed on the first reflective layer 802 and the nonreflective portion 826 formed on the second reflective layer 825 are identical in shape. This is depicted in the perspective view of FIG. 47. In the present invention, after the transparent substrate 801 and the second substrate 803 are laminated together, laser light is applied penetrating through to the second layer to form an identical mark thereon. In this case, since coordinate arrangements of pits are different between the first and second layers, and since the positional relationship between the first and second layers is random when laminating them together, the pit positions where the mark is formed are different between the first and second layers, and entirely different position information is obtained from each layer. These two kinds of position information are encrypted to produce an anti-piracy disk If it is attempted to duplicate this disk illegally, the optical marks on the two layers would have to be aligned with a resolution of about 0.13 μm. As previously described, at the present state of technology it is not possible to duplicate the disk by aligning the optical marks with the pits with an accuracy of 0.13 μm, that is, with an accuracy of the order of 0.1 μm, but there is a possibility that mass production technology may be commercially implemented in the future that enables large quantities of single-layer disks to be trimmed with a processing accuracy of 0.1 μm at low cost. Even in that case, since the top and bottom disks are trimmed simultaneously in the case of the two-layer laminated disk 800, the two disks must be laminated together with the pit locations and optical marks aligned with an accuracy of a few microns. However, it is next to impossible to laminate the disks with this accuracy because of the temperature coefficient, etc. of the polycarbonate substrate. When optical marks were formed by applying laser light penetrating through the two-layer disk 800, the resulting anti-piracy mark is extremely difficult to duplicate. This provides a greater anti-piracy effect. The optical disk with an anti-piracy mechanism is thus completed. For piracy prevention applications, in cases where the disk process and laser cut process are inseparable as in the case of the single-plate type, the encryption process, which is an integral part of the laser cut process, and processing involving a secret encryption key have to be performed at the disk manufacturing factory. This means that in the case of the single-plate type the secret encryption key maintained in the software company have to be delivered to the disk manufacturing factory. This greatly reduces the security of encryption. On the other hand, according to the method involving laser processing of laminated disks, which constitutes one aspect of the invention, the laser trimming process can be completely separated from the disk manufacturing process. Therefore, laser trimming and encryption operations can be performed at a factory of the software maker. Since the secret encryption key that the software maker keeps need not be delivered to the disk manufacturing factory, the secret key for encryption can be kept in the safe custody of the software maker. This greatly increases the security of encryption.

(E) As described above, in the present invention, a legitimate manufacturer can make a legitimate disk by processing the disk using a general-purpose laser trimming apparatus having a processing accuracy of several tens of microns. Though a measuring accuracy of 0.13 μm is required, this can be achieved by conventional circuitry contained in a consumer DVD player. By encrypting the measured result with a secret encryption key, a legitimate disk can be manufactured. That is, the legitimate manufacturer need only have a secret key and a measuring apparatus with a measuring accuracy of 0.13 μm, while the required processing accuracy is two or three orders of magnitude lower, that is, several tens of microns. This means that a convectional laser processing apparatus can be used. On the other hand, an illegal manufacturer, who does not have a secret key, will have to directly copy the encrypted information recorded on the legitimate disk. This means that a physical mark corresponding to the encrypted position information, that is, the position information on the legitimate disk, must be formed with a processing accuracy of 0.13 μm. That is, the low reflective mark has to be formed using a processing apparatus having a processing accuracy two orders of magnitude higher than that of the processing apparatus used by the legitimate manufacturer. Volume production with an accuracy higher by two orders of magnitude, i.e., with an accuracy of 0.1 μm, is difficult both technically and economically, even in the foreseeable future. This means that production of pirated disks can be prevented during the life of the DVD standard. One point of the invention is to exploit the fact that the measuring accuracy is generally a few orders of magnitude higher than the processing accuracy.

Figure 48:
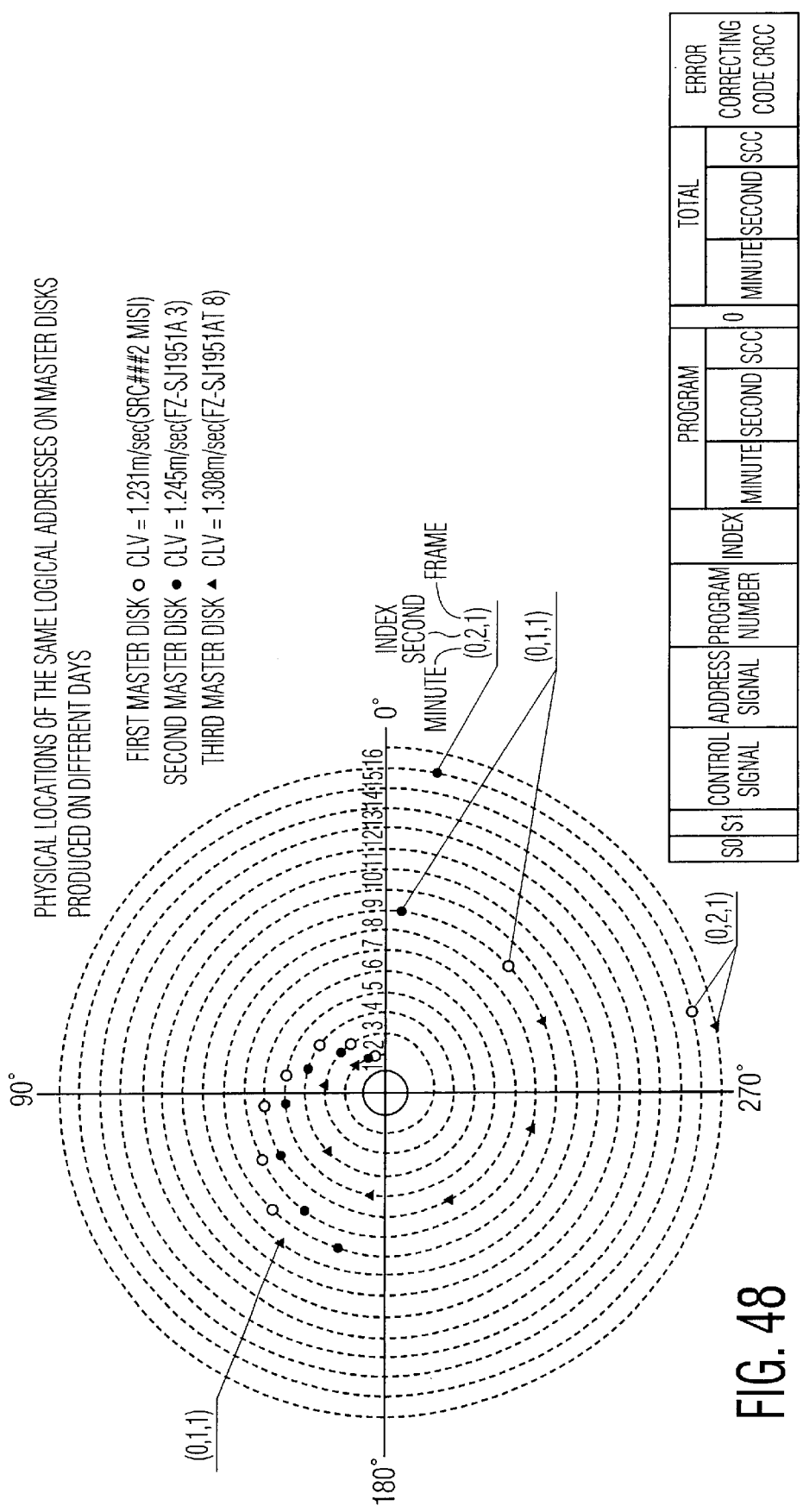
FIG. 48 is a diagram showing a comparison of address coordinate positions on different master disks according to the embodiment.

In the case of CLV, the above method exploits the fact that the address coordinate arrangement differs from one master disk to another, as previously noted. FIG. 48 shows the result of the measurement of address locations on actual CDs. Generally, there are two types of master disk, one recorded by rotating a motor at a constant rotational speed, i.e., with a constant angular velocity (CAV), and the other recorded by rotating a disk with a constant linear velocity (CLV). In the case of a CAV disk, since a logical address is located on a predetermined angular position on the disk, the logical address and its physical angular position on the disk are exactly the same no matter how many master disks are made. On the other hand, in the case of a CLV disk, since only the linear velocity is controlled, the angular position of the logical address on the master disk is random. As can be seen from the result of the measurement of logical address locations on actual CDs in FIG. 48, the tracking pitch, start point and linear velocity vary slightly from disk to disk even if exactly the same data is recorded using the same mastering apparatus, and these errors accumulate, resulting in different physical locations. In FIG. 48, the locations of each logical address on a first master disk are indicated by white circles, and the locations on second and third master disks are indicated by black circles and triangles, respectively. As can be seen, the physical locations of the logical addresses vary each time the master disk is made. FIG. 17 shows the low reflectivity portion address tables for a legitimate disk and an illegally duplicated disk for comparison.

The method of piracy prevention at the master disk level has been described above. This is, when master disks of CLV recording, such as a CD or DVD, are made from the same logic data by using a mastering apparatus, as shown in FIG. 48, the physical location of each pit on the disk varies between master disks, that is, between the legitimate disk and pirated disk. This method distinguishes a pirated disk from a legitimate disk by taking advantage of this characteristic. The piracy prevention technology at the master disk level can prevent pirated disks at the logic level made by simply copying data only from the legitimate disk. However, recent years have seen the emergence of pirate manufacturers equipped with more advanced technologies, who can make a master disk replica identical in physical feature to a legitimate disk by melting the polycarbonate substrate of the legitimate disk. In this case, the piracy prevention method at the master disk level is defeated. To prevent this new threat of pirated disk production, the present invention has devised the piracy prevention method at the reflective layer level wherein a marking is formed on a reflective film.

According to the method of the present invention, the marking is formed on each disk pressed from a master disk, even if disks are pressed from the master disk, by removing a portion of the reflective film in the reflective film formation process. As a result, the position and shape of the resulting low reflective marking is different from one disk to another. In a usual process, it is next to impossible to part-ally remove the reflective film with an accuracy of submicrons. This serves to enhance the effectiveness in preventing duplication since duplicating the disk of the invention does not justify the cost.

Figure 19:
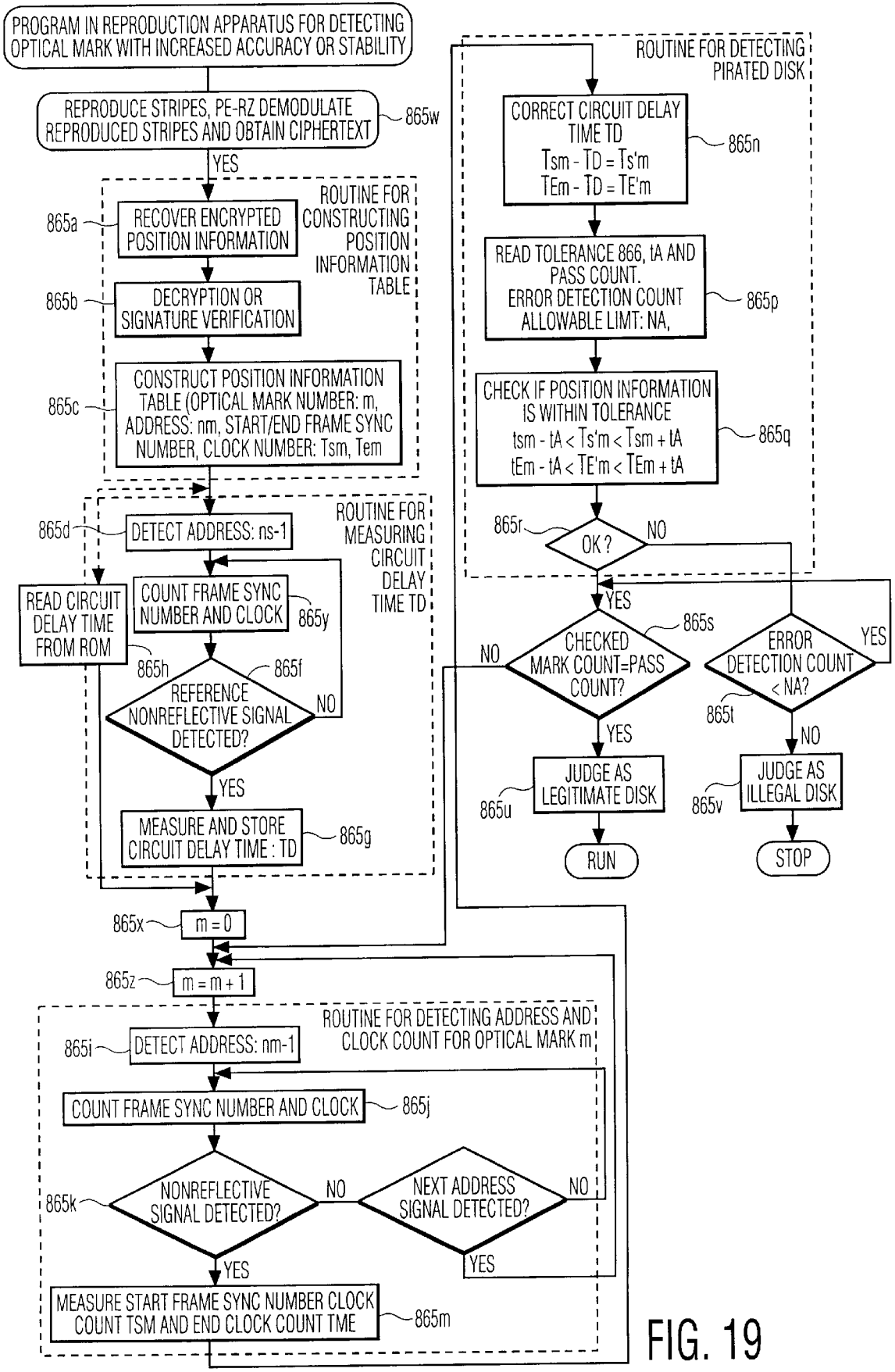
FIG. 19 is a flowchart illustrating a low-reflectivity position detecting program according to the embodiment.

FIG. 19 shows a flowchart for detecting a duplicated CD by using the low reflectivity portion address table. The delay time needed to detect the optical mark varies only slightly due to the optical head and circuit designs of the reproduction apparatus used. This of the delay time TD circuit can be predicted at the design stage or at the time of mass production. The optical mark position information is obtained by measuring the number of clocks, that is, the time, from the frame synchronizing signal. Due to the effect of the circuit delay time, an error may be caused to detected data of the optical mark position information. As a result, a legitimate disk may be erroneously judged as being a pirated disk, inconveniencing a legitimate user. A measure to reduce the effect of the circuit delay time TD will be described below. Further, a scratch made on a disk after purchase may cause an interruption in the reproduced clock signal, causing an error of a few clocks in the measurement of the optical mark position information. To address this problem, a tolerance 866 and a pass count 867, shown in FIG. 20, are recorded on a disk, and while allowing a certain degree of tolerance on the measured value according to the actual situation at the time of reproduction, the reproduction operation is permitted when the pass count 867 is reached; the margin allowed for an error due to a surface scratch on the disk can be controlled by the copyright owner prior to the shipment of the disk. This will be described with reference to FIG. 19.

In FIG. 19, the disk is reproduced in step 865a to recover the encrypted position information from the barcode recording portion or pit recording portion of the present invention. In step 865b, decryption or signature verification is performed, and in step 865c, a list of optical mark position information is recovered. Next, if the delay time TD of a reproduction circuit is stored in the circuit delay time storing section 608a in the reproduction apparatus of FIG. 15, TD is read out in step 865h and the process proceeds to step 865x. If TD is not stored in the reproduction apparatus, or if a measurement instruction is recorded on the disk, the process proceeds to step 865d to enter a reference delay time measurement routine. When address Ns−1 is detected, the start position of the next address Ns is found. The frame synchronizing signal and the reproduced clock are counted, and in step 865f, the reference optical mark is detected. In step 865g, the circuit delay time TD is measured and stored. This operation is the same as the operation to be described later with reference to FIG. 16(7). In step 865x, the optical mark located inside address Nm is measured. In steps 865i, 865j, 865k, and 865m, the optical mark position information is detected with a resolution of one clock unit, as in steps 865d, 865y, 865f, and 865y. Next, in step 865n, a pirated disk detection routine is entered. First, the circuit delay time TD is corrected. In step 865p, the tolerance 866, i.e., tA, and pass count 867 recorded on the disk, as shown in FIG. 20, are read to check whether or not the position information measured in step 865g falls within the tolerance tA. If the result is OK in step 865r, then in step 865s it is checked whether the checked mark count has reached the pass count.

If the result is OK, then in step 865u the disk is judged as being a legitimate disk and reproduction is permitted. If the pass count is not reached yet, the process returns to step 865z. If the result is NO in step 865r, then it is checked in step 865f whether the error detection count is smaller than NA, and only when the result is OK, the process returns to step 865s. If it is not OK, then in step 865v the disk is judged as being an illegal disk and the operation is stopped.

As described, since the circuit delay time TD of the reproduction apparatus is stored in the IC ROM, optical mark position information can be obtained with increased accuracy. Furthermore, by setting the tolerance 866 and pass count for the software on each disk, the criteria for pirated disk detection can be changed according to the actual condition to allow for a scratch made on the disk after purchase. This has the effect of reducing the probability of a legitimate disk being erroneously judged as an illegal disk.

As described in the above mode of embodiment, the piracy prevention method at the reflective layer level forms a physical mark in the pre-pit area of the reflective film on the disk, instead of the previously practiced physical marking at the master disk level. Pirated disk production can thus be prevented even if the disk is duplicated at the master disk level.

In the above mode of embodiment, a new optical-disk recording means was used that performs secondary recording on a two-disk laminated optical disk by using a laser. In the first step, physical marks were randomly formed, and in the second step, the physical marks were measured with a measuring accuracy as high as 0.13 $\mu$m. In the third step, their position information was encrypted and, using the secondary recording means, the encrypted information was recorded as a barcode on the optical disk with an accuracy of several tens of microns which was the usual processing accuracy. In this way, optical mark position information was obtained with an accuracy of, for example, 0.1 $\mu$m, much higher than the processing accuracy of a conventional apparatus. Since such optical marks cannot be formed with the accuracy of 0.1 $\mu$m by using commercially available equipment, production of pirated disks can be prevented.

In the above mode of embodiment, the position information of the anti-piracy mark of the invention, which differs from one disk to another, was used as a disk identifier. The position information and the disk serial number, i.e., the disk ID, were combined together and encrypted with a digital signature; the thus encrypted information was converted into a barcode and written in overwriting fashion to the prescribed region of the pre-pit area, thus appending an unalterable disk ID to each disk. Since each completed disk has a different ID, the password is also different. The password for one disk does not work on other disks. This enhances password security. Furthermore, using the secondary recording technique of the invention, the password is secondary-recorded on the disk, permanently making the disk an operable disk.

Figure 39:
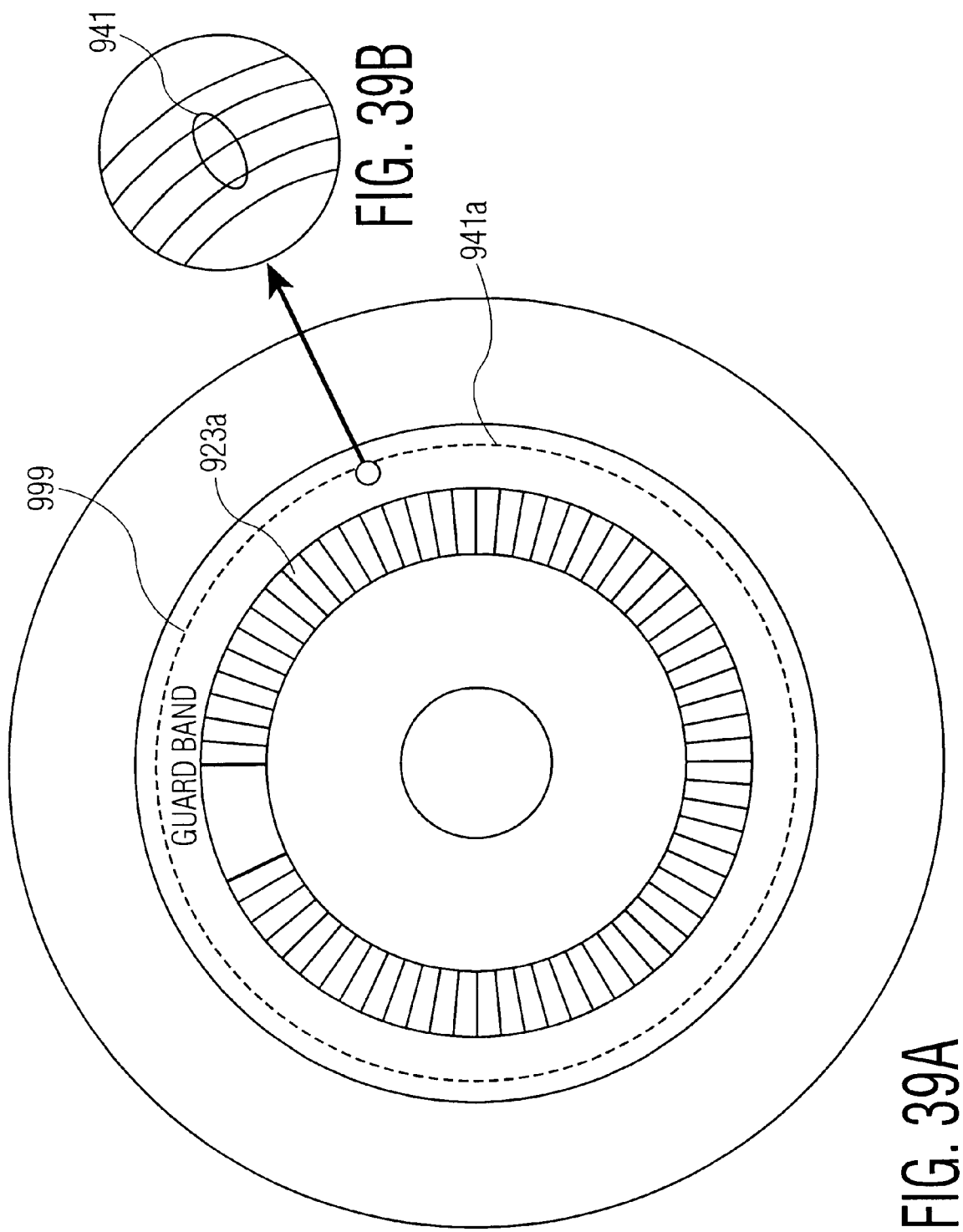
FIG. 39 is a diagram showing a top plan view of a disk having a pinhole-like optical marking as a physical feature according to the embodiment.

The first-half part (I) has dealt mainly with one application mode of the barcode in which the barcode is used for a pirated-disk prevention method. In this case, as shown in FIG. 2, the barcode (stripes) 584c–584e are written over the prescribed region (stripe area) of the pre-pit area; therefore, the tracking is disturbed in that prescribed region. If a marking 584 by laser light is formed in the prescribed region where the barcode, 584c–584e, is recorded, as shown in FIG. 2, it becomes difficult to accurately measure the address/clock position of the marking. To avoid this problem, if, as shown in FIG. 39, the marking 941 is formed in a pit area 941a at a radius position different from the radius position of the stripe area 923a, the position of the marking 941 can be measured stably with an accuracy of one clock, as shown in FIG. 20(5). This has the effect of being able to identify pirated disks more stably.

In this case, by forming a pinhole marking destroying only a few tracks, as shown in FIG. 39, not only errors can be minimized but piracy prevention can be accomplished within the scope of the current standard.

Alternatively, the marking 941 may be recorded in the guard-band area 999 shown in FIG. 30. Since the guard-band area 999 contains no data but address information, this has the effect of avoiding destroying already recorded data by recording the marking 941.

The optical disk of the invention has a structure such that a reflective film is sandwiched directly or indirectly between two members resistant to laser light and a marking is formed by laser on the reflective film. The above mode of embodiment has dealt with examples in which this structure is used for secondary recording of a barcode, etc. and a piracy prevention technique, but it will be appreciated that such a structure may also be applied to other techniques. In the above mode of embodiment, the optical disk of the invention has been described as being fabricated by laminating two substrates with an adhesive layer interposed therebetween. However, the adhesive layer may be omitted, or instead, a member made of a different material, such as a protective layer, may be used; that is, any suitable structure may be used as long as the reflective film is sandwiched directly or indirectly between two members resistant to laser light. Furthermore, in the above mode of embodiment, the optical disk of the invention has been described as comprising substrates as the members that are laminated together, but other members such as protective layers may be used; that is, any member that has resistance to laser light may be used.

As described, according to the present invention, since an ID unique to each individual disk, for example, is converted into a barcode and written in overwriting fashion to an ordinary pit area, both the pit data and barcode data can be read by using the same optical pickup. This has the effect of simplifying the construction of the playback apparatus, for example.

Furthermore, by barcoding the marking position information for use as a disk-unique ID, the invention provides a greatly improved pirated-disk and other illegal duplication prevention capability as compared to the prior art. A piracy prevention technique of the prior art, for example, employed a method that deliberately arranged pits in serpentine fashion when making a disk mold. Such a prior art method is not effective in piracy prevention, since a pirated disk can be easily made by exactly replicating the mold shape from a legitimate optical disk. On the other hand, according to the present invention, since the marking is formed on the reflective film by a laser and its position information is coded as a barcode, as described above, the contents of them cannot be made to coincide when making an illegal duplication. The above-described piracy prevention effect is thus accomplished.

What is claimed is:

1. An optical disk on which data is recorded, wherein in a prescribed region of said disk, an identifier is provided for indicating whether a barcode-like mark is present or not on said optical disk, said identifier and said barcode-like mark are in respectively different locations on said disk, said barcode-like mark disposed in a circumferential direction, and said barcode-like mark having a plurality of bars, each of said bars extending in a radial direction, and a mark is marked by laser beam on an information layer of said disk, information based on the position of said mark is encrypted and said encrypted information is included in said barcode-like mark.

2. An optical disk on which data is recorded, wherein in a prescribed region of said disk, an identifier is provided for indicating whether a barcode-like mark is present or not on said optical disk, said barcode-like mark disposed in a circumferential direction, and said barcode-like mark having a plurality of bars, each of said bars extending in a radial direction, and a mark is marked by laser beam on an information layer of said disk, information based on the position of said mark is applied with a digital signature and said information applied with said digital signature is included in said barcode-like mark.

3. An optical disk according to claim 1, wherein one of said bars has a lower reflectivity than an average reflectivity of an area between said one of said bars and another of said bars.

4. An optical disk according to claim 1, wherein one of said bars has a lower reflectivity than an average reflectivity of an area between said one of said bars and another of said bars.

5. An optical disk reproduction apparatus for use with a disk on which data is recorded, wherein in a prescribed region of said disk, an identifier is provided for indicating whether a barcode-like mark is present or not on said optical disk, said identifier and said barcode-like mark are in respectively different locations on said disk, said barcode-like mark disposed in a circumferential direction, and said barcode-like mark having a plurality of bars, each of said bars extending in a radial direction, and a mark is marked by laser beam on a information layer of said disk, information based on the position of said mark is encrypted and said encrypted information is included in said barcode-like mark, said apparatus comprising:

reproduction means for reproducing said barcode-like mark on said optical disk;

identifier detection means for detecting said identifier on said optical disk, and control means for controlling a prescribed operation based on said identifier detected by said identifier detection means, wherein said reproduction means includes an optical head for performing reproduction, positional information readout means for reproducing, from said barcode-like mark, information regarding the position of said mark, mark measurement means for determining an actual position of said mark, and reproducing means for reproducing data recorded on said optical disk based on a comparison of said information reproduced by said positional information readout means, and said actual position determined by said mark measurement means.

6. An optical disk reproduction apparatus according to claim 5, wherein said positional information reading means decrypts the reproduced information and obtains said reproduced information based on the position of said mark.

7. An optical disk according to claim 2, wherein one of said bars has a lower reflectivity than an average reflectivity of an area between said one of said bars and another of said bars.

8. An optical disk according to claim 2, wherein one of said bars has a lower reflectivity than an average reflectivity of an area between said one of said bars and another of said bars.

* * * * *